US012731361B2

(12) United States Patent
Choi et al.

(10) Patent No.: US 12,731,361 B2
(45) Date of Patent: Sep. 8, 2026

(54) ELECTRONIC DEVICE FOR PROCESSING IMAGE, AND OPERATION METHOD OF ELECTRONIC DEVICE

(71) Applicant: SAMSUNG ELECTRONICS CO., LTD., Suwon-si (KR)

(72) Inventors: Isak Choi, Suwon-si (KR); Dongchan Kim, Suwon-si (KR); Jinyoung Hwang, Suwon-si (KR); Dongnam Byun, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 558 days.

(21) Appl. No.: 18/137,266

(22) Filed: Apr. 20, 2023

(65) Prior Publication Data

US 2023/0343061 A1 Oct. 26, 2023

Related U.S. Application Data

(63) Continuation of application No. PCT/KR2023/005164, filed on Apr. 17, 2023.

(30) Foreign Application Priority Data

Apr. 20, 2022 (KR) ........................ 10-2022-0049149
Oct. 17, 2022 (KR) ........................ 10-2022-0133618

(51) Int. Cl.
*G06V 10/25* (2022.01)
*G06T 15/20* (2011.01)
(Continued)

(52) U.S. Cl.
CPC .............. *G06V 10/25* (2022.01); *G06T 15/20* (2013.01); *G06V 10/248* (2022.01); *G06V 10/46* (2022.01)

(58) Field of Classification Search
CPC ........... G06T 3/073; G06T 2207/20081; G06T 2207/30128; G06V 10/25
See application file for complete search history.

(56) References Cited

U.S. PATENT DOCUMENTS 8,468,013 B2 6/2013 Yang et al.
8,570,343 B2 10/2013 Halstead
(Continued)

FOREIGN PATENT DOCUMENTS

CN 104680152 A 6/2015
JP 6966749 B2 11/2021
(Continued)

OTHER PUBLICATIONS

Unwrap Labels, Apr. 2020, 3 pages. https://github.com/Nepherhotep/unwrap_labels/blob/master/README.md.
(Continued)

*Primary Examiner* — Sumati Lefkowitz
*Assistant Examiner* — Wayne Zhang
(74) *Attorney, Agent, or Firm* — Sughrue Mion, PLLC

(57) ABSTRACT

A method includes: obtaining a first image of an object including a surface having a non-flat shape; identifying a region corresponding to the surface as a region of interest by applying the first image to a first artificial intelligence model; obtaining data about a three-dimensional (3D) shape type of the object by applying the first image to a second AI model; obtaining a set of values of a 3D parameter related to the object, the surface, or the first camera, based on the region and the data; estimating the non-flat shape of the surface, based on the set of values of the 3D parameter; and obtaining a flat surface image in which the non-flat shape of the surface is flattened, by performing a perspective transformation on the surface.

18 Claims, 32 Drawing Sheets

(51) Int. Cl.

| | |
|---|---|
| ***G06V 10/24*** | (2022.01) |
| ***G06V 10/46*** | (2022.01) |

(56) References Cited

U.S. PATENT DOCUMENTS

| | | | | |
|---|---|---|---|---|
| 9,727,775 | B2 | 8/2017 | Ryu et al. | |
| 10,249,030 | B2 | 4/2019 | McCloskey et al. | |
| 10,592,724 | B2 * | 3/2020 | Tada | G06V 10/243 |
| 10,600,210 | B1 * | 3/2020 | Citraro | G06V 20/48 |
| 2007/0206877 | A1 | 9/2007 | Wu et al. | |
| 2011/0222743 | A1 * | 9/2011 | Tanaka | G06V 40/172 382/118 |
| 2012/0133779 | A1 | 5/2012 | Ma et al. | |
| 2012/0134588 | A1 * | 5/2012 | Zhang | G06V 30/1475 382/176 |
| 2018/0232568 | A1 * | 8/2018 | Kulkarni | G06V 40/20 |
| 2019/0147642 | A1 * | 5/2019 | Cole | G06V 20/64 345/419 |
| 2019/0384964 | A1 | 12/2019 | Ando | |
| 2020/0027237 | A1 * | 1/2020 | Baumgartner | G06T 7/73 |
| 2020/0151451 | A1 | 5/2020 | Lee et al. | |
| 2021/0011476 | A1 | 1/2021 | Ban et al. | |
| 2021/0064871 | A1 | 3/2021 | Sohn et al. | |
| 2021/0065360 | A1 * | 3/2021 | Laaksonen | G06T 7/12 |
| 2021/0124969 | A1 * | 4/2021 | Aller | G06N 3/08 |
| 2021/0299878 | A1 | 9/2021 | Konishi et al. | |
| 2022/0116742 | A1 * | 4/2022 | Tal | G08G 1/09623 |
| 2023/0062484 | A1 * | 3/2023 | Schaefer | G06V 10/44 |

FOREIGN PATENT DOCUMENTS

| | | | |
|---|---|---|---|
| JP | 7031540 | B2 | 3/2022 |
| KR | 10-0992858 | B1 | 11/2010 |
| KR | 10-1407508 | B1 | 6/2014 |
| KR | 10-2019-0106853 | A | 9/2019 |
| KR | 10-2020-0055980 | A | 5/2020 |
| KR | 10-2020-0080378 | A | 7/2020 |
| KR | 10-2211516 | B1 | 2/2021 |
| KR | 10-2254157 | B1 | 5/2021 |

OTHER PUBLICATIONS

PaddleOCRv2.1.1, May 2021, 1 page. (https://github.com/PaddlePaddle/PaddleOCR/releases/tag/v2.1.1).

3D Object Detection and Object Shape Categorization, Aug. 2011, 2 pages. (https://youtu.be/iM82GHeN4d4).

Xiang, Y., et al., "PoseCNN: A Convolutional Neural Network for 6D Object Pose Estimation in Cluttered Scenes", (May 26, 2018), 10 pages. https://rse-lab.cs.washington.edu/projects/posecnn/.

Du, G., et al., "Vision-based Robotic Grasping From Object Localization, Object Pose Estimation to Grasp Estimation for Parallel Grippers: A Review" (Aug. 19, 2020), 39 pages.

Zhang, X., et al., "A 6DoF Pose Estimation Dataset and Network for Multiple Parametric Shapes in Stacked Scenarios" Machines, (Nov. 2021), 9, 321, pp. 1-18, https://doi.org/10.3390/machines9120321.

Park, K., et al., "Neural Object Learning for 6D Pose Estimation Using a Few Cluttered Images" Vision for Robotics Group, (Aug. 21, 2020), 23 pages. https://github.com/kirumang/NOL.

Zankevich, A., "How to unwrap wine labels programmatically", (Sep. 28, 2018), 7 pages.

PaddleOCR Quick Start (Jul. 2020), 5 pages. https://github.com/PaddlePaddle/PaddleOCR/blob/release/2.6/doc/doc_en/quickstart_en.md#221-chinese--english-model-and-multilingual-model.

PaddleOCR_utility.py (Dec. 2021), 9 pages. https://github.com/PaddlePaddle/PaddleOCR/blob/7f6c9a7b99ea66077950238186137ec54f2b8cfd/tools/infer/utility.py#L356.

Communication dated Jul. 24, 2023, issued by the International Searching Authority in counterpart International Application No. PCT/KR2023/005164 (PCT/ISA/220, PCT/ISA/210, and PCT/ISA/237).

Extended European Search Report dated Mar. 18, 2025, issued by the European Patent Office in European Application No. 23792124.2.

Nakajima et al., "Video Mosaicing for Document Imaging", Proc. CBDAR, Demo Session, 2007, XP055106029, pp. 171-178 (8 pages total).

Zhang et al., "Research on cylindrical labels unfolding algorithm based on machine vision", IEEE, vol. 5, 2021, XP033895364, pp. 2568-2572 (5 pages total).

Das et al., "Learning an Isometric Surface Parameterization for Texture Unwrapping", 2022, XP047637177, pp. 580-597 (18 pages total).

* cited by examiner

LOSS FUNCTION:

y = min(f(C)−P) = min(C'−P), f = function including r, R, T, h, θ, and F as variableS

ELECTRONIC DEVICE FOR PROCESSING IMAGE, AND OPERATION METHOD OF ELECTRONIC DEVICE

CROSS-REFERENCE TO RELATED APPLICATIONS

This application is a by-pass continuation application of International Application No. PCT/KR2023/005164, filed on Apr. 17, 2023, which is based on and claims priority to Korean Patent Application Nos. 10-2022-0049149, filed on Apr. 20, 2022, and 10-2022-0133618, filed on Oct. 17, 2022, in the Korean Intellectual Property Office, the disclosures of which are incorporated by reference herein their entireties.

BACKGROUND

1. Field

The disclosure relates to an electronic device for removing distortion of a region of interest (ROI) in an image, and an operation method of the electronic device.

2. Description of Related Art

In a digital image obtained by photographing a three-dimensional (3D) object, physical distortion due to a non-flat (e.g., curved) surface of the 3D object, distortion due to a photographing perspective, and the like exist. Various technologies utilizing 3D information has been developed to remove a distortion caused by 3D characteristics. Operations for inferring 3D information of an object, operations for removing distortion in an image without hardware (such as a sensor), and obtaining 3D information have been developed and used.

SUMMARY

According an aspect of the disclosure, a method, performed by an electronic device, of processing an image, includes: obtaining a first image of a three-dimensional (3D) object including at least one surface by using a first camera, the at least one surface having a non-flat shape; identifying a region corresponding to the at least one surface as a region of interest (ROI) by applying the first image to a first artificial intelligence (AI) model; obtaining data about 3D shape type of the object by applying the first image to a second AI model; obtaining a set of values of a 3D parameter related to at least one of the object, the at least one surface, or the first camera, based on the region identified as the ROI and the data about the 3D shape type; estimating the non-flat shape of the at least one surface, based on the set of values of the 3D parameter; and obtaining a flat surface image in which the non-flat shape of the at least one surface is flattened, by performing a perspective transformation on the at least one surface.

According another aspect of the disclosure, an electronic device includes a first camera; a memory storing one or more instructions; and one or more processors configured to execute the one or more instructions stored in the memory. The one or more processors is configured to execute the one or more instructions to: obtain a first image of a 3D object comprising at least one surface by using the first camera, the at least one surface having a not-flat shape; identify a region corresponding to the at least one surface as a ROI by applying the first image to a first AI model; obtain data about a 3D shape type of the object by applying the first image to a second AI model; obtain a set of values of a 3D parameter related to at least one of the object, the at least one surface, or the first camera, based on the region identified as the ROI and the data about the 3D shape type; estimate the non-flat shape of the at least one surface, based on the set of values of the 3D parameter; and obtain a flat surface image in which the non-flat shape of the at least one surface is flattened, by performing a perspective transformation on the at least one surface.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
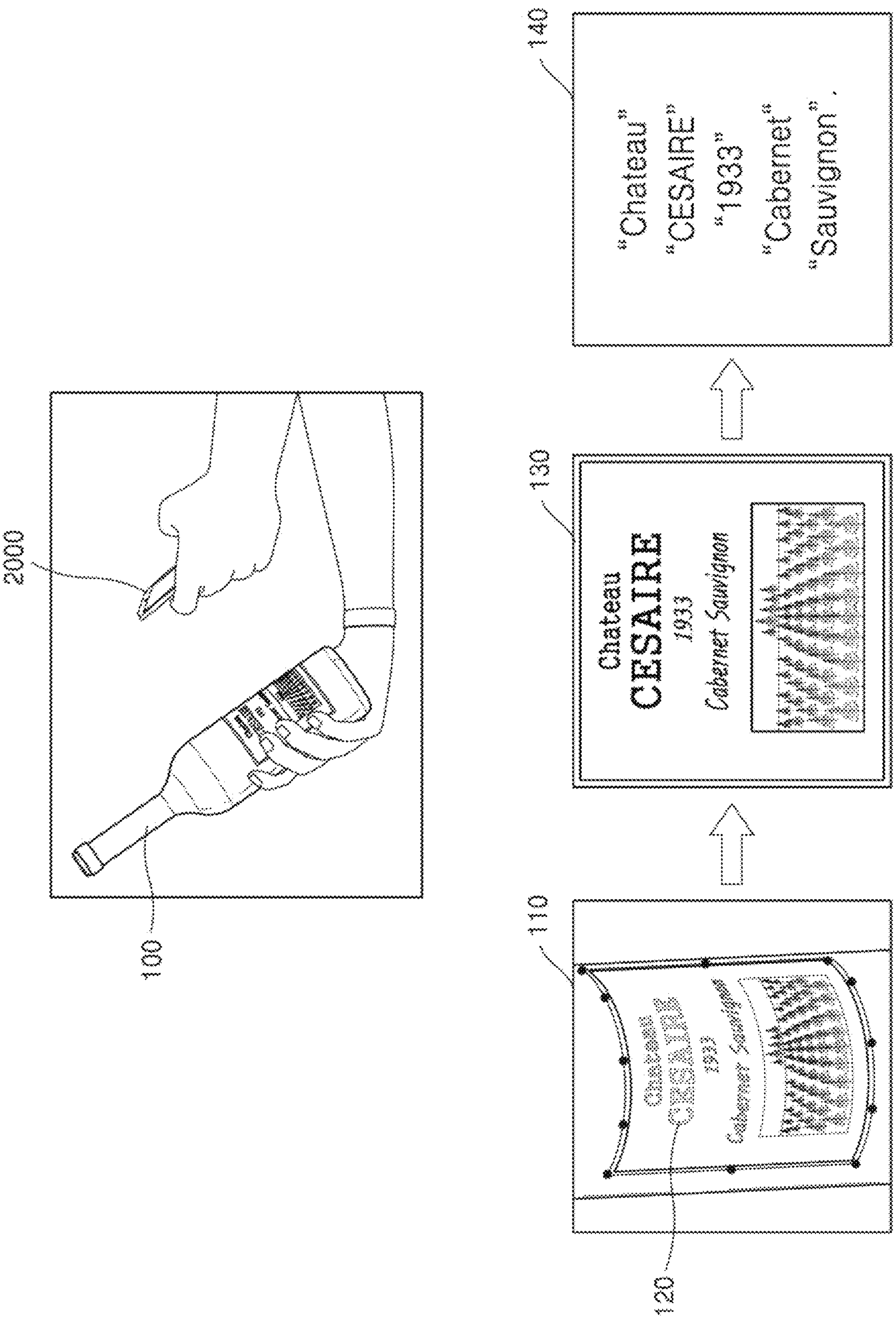
FIG. 1 illustrates an example in which an electronic device according to an embodiment of the disclosure removes distortion of an image.

Throughout the disclosure, the expression "at least one of a, b or c" indicates only a, only b, only c, both a and b, both a and c, both b and c, all of a, b, and c, or variations thereof.

Although general terms widely used at present were selected for describing the disclosure in consideration of the functions thereof, these general terms may vary according to intentions of one of ordinary skill in the art, case precedents, the advent of new technologies, and the like. Terms arbitrarily selected by the applicant of the disclosure may also be used in a specific case. In this case, their meanings are provided in the detailed description of the disclosure. Hence, the terms must be defined based on their meanings and the contents of the entire specification, not by simply stating the terms.

An expression used in the singular may encompass the expression of the plural, unless it has a clearly different meaning in the context. Unless otherwise defined, all terms (including technical and scientific terms) used herein have the same meaning as commonly understood by one of ordinary skill in the art to which this disclosure belongs. In the present specification, while such terms as "first", "second", etc., may be used to describe various components, such components must not be limited to the above terms. The above terms are used only to distinguish one component from another.

The terms "comprises" and/or "comprising" or "includes" and/or "including" when used in this specification, specify the presence of stated elements, but do not preclude the presence or addition of one or more other elements. The terms "unit", "-er (-or)", and "module" when used in this specification refer to a unit in which at least one function or operation is performed, and may be implemented as hardware, software, or a combination of hardware and software.

Embodiments of the disclosure are described in detail herein with reference to the accompanying drawings so that this disclosure may be easily performed by one of ordinary skill in the art to which the disclosure pertains. The disclosure may, however, be embodied in many different forms and should not be construed as being limited to the embodiments set forth herein. In the drawings, parts irrelevant to the description are omitted for simplicity of explanation, and like numbers refer to like elements throughout. In addition, reference numerals used in each drawing are only for describing each drawing, and different reference numerals used in different drawings do not indicate different elements. Embodiments of the disclosure will now be described more fully with reference to the accompanying drawings.

FIG. 1 is a diagram illustrating an example in which an electronic device according to an embodiment of the disclosure removes distortion of an image.

Referring to FIG. 1, an electronic device 2000 according to an embodiment of the disclosure may include a camera and a display. The electronic device 2000 may be a device that captures images (still images and/or videos) through the camera and outputs the images through the display. For example, the electronic device 2000 may include, but is not limited to, a smart TV, a smartphone, a tablet personal computer (PC), a laptop PC, and the like. The electronic device 2000 may be implemented by using various sorts and types of electronic devices including a camera and a display. The electronic device 2000 may also include a speaker for outputting audio.

According to an embodiment of the disclosure, a user of the electronic device 2000 may photograph an object 100 by using the camera of the electronic device 2000. The electronic device 2000 may obtain an image 110 including at least a portion of the object 100.

In the disclosure, when there is information to be recognized on a surface of the object 100 in an image, this is referred to as a region of interest (ROI) 120. For example, a region of a surface of the object 100 (e.g., a label region attached to the surface of the object 100) may be a ROI. According to an embodiment of the disclosure, the electronic device 2000 may extract information related to the object 100 from the ROI 120 of the object 100.

In the disclosure, removal of distortion of a 'surface (e.g., label)' of a product will be described as an example of the ROI 120. Here, the label is made of paper, sticker, fabric, or the like and attached to a product, and a trademark or product name of the product may be printed on the label. The surface (e.g., label) of the product may include various pieces of information related to the product, for example, ingredients, a usage method, a usage amount, precautions for handling, a price, a volume, a capacity, and the like of the product. In the disclosure, the surface (e.g., label) is just an example of a region on the surface of the object 100. For example, those texts, images, logos, and other textual/visual elements may be printed, engraved, or etched on the surface of the object 100 without using the label. For example, embodiments of the disclosure may be applicable to any texts, images, logos, and other textual/visual elements on the surface of the object 100.

In the disclosure, the electronic device 2000 may identify an area corresponding to at least one surface (e.g., label) included in the object 100 as the ROI 120 and may obtain information related to the object 100 from the area corresponding to the at least one surface (e.g., label). When the object 100 has a 3D shape, the shape of the surface (e.g., label) of the object 100 may be distorted in the image 110, which is two-dimensional (2D). Accordingly, the accuracy of information (e.g., a logo, an icon, or text) obtained by the electronic device 200 from the surface (e.g., label) of the object 100 may deteriorate. In order to extract accurate information from the ROI 120 (e.g., at least one surface (e.g., label)), the electronic device 2000 according to an embodiment of the disclosure may obtain a distortion-free image 130 by using the image 110 of the object 100. The distortion-free image 130 refers to an image in which distortion of the ROI 120 of the object 100 is reduced and/or removed. For example, the distortion-free image 130 may be a flattened image obtained by reducing or eliminating bending distortion of a surface (e.g., label) area. In the disclosure, the distortion-free image 130 may also be referred to as a flat surface (e.g., label) image.

The electronic device 2000 according to an embodiment of the disclosure may estimate 3D information of the object 100 in order to generate the distortion-free image 130. The electronic device 2000 may obtain the distortion-free image 130 by transforming the ROI 120 into a plane, based on the 3D information of the object 100. The 3D information of the object 100 may include 3D parameters related to the 3D shape of the object 100 or 3D parameters related to a camera that photographs an object. The 3D shape may include, but is not limited to, a sphere, a cube, a cylinder, and the like.

In the disclosure, the 3D parameters refer to elements representing geometric characteristics related to the 3D shape of the object 100. The 3D parameters may include, for example, height and radius information (or horizontal and vertical information) of the object 100, translation and rotation information for 3D geometric transformation on a 3D space of the object 100, and focal length information of the camera of the electronic device 2000 that has photographed the object 100, but embodiments of the disclosure are not limited thereto. The 3D parameters are variables, and the 3D shape may also change as a value of any one of the 3D parameters is changed. 3D parameter elements may be gathered to constitute a 3D parameter set. Information capable of representing the 3D shape of the object 100, which is determined according to the 3D parameter set, is referred to as '3D information' in the disclosure.

In the disclosure, '3D information of the object 100' refers to a set of 3D parameter values (e.g., a horizontal value, a vertical value, a height value, and a radius value) to represent the 3D shape of the object 100 included in the image 110. The 3D information of the object 100 does not necessarily include 3D parameters representing values such as the absolute width, height, height, radius, etc. of the object 100, and may be composed of 3D parameters representing relative values representing the 3D ratio of the object 100. In other words, when there is 3D information of the object 100, the electronic device 2000 may render the object 100 in the 3D shape having the same ratio as the object 100.

In order to perform an image processing operation of removing distortion of the ROI 120, the electronic device 2000 according to an embodiment of the disclosure may identify the ROI 120 from the image 110 including at least a portion of the object 100, identify a 3D shape type of the object 100, and estimate 3D information of the object 100, based on the ROI 120 of the object 100 and the 3D shape type of the object 100. The electronic device 2000 may create the distortion-free image 130, based on the 3D information of the object 100.

According to an embodiment of the disclosure, the electronic device 2000 may extract object information 140 from the distortion-free image 130, and may provide a user with the distortion-free image 130 and/or the object information 140 extracted from the distortion-free image 130.

Detailed operations, performed by the electronic device 2000, of removing distortion of the ROI 120 or extracting information from the distortion-free image 130 through image processing operations will now be described in more detail with reference to the drawings below.

Figure 2:
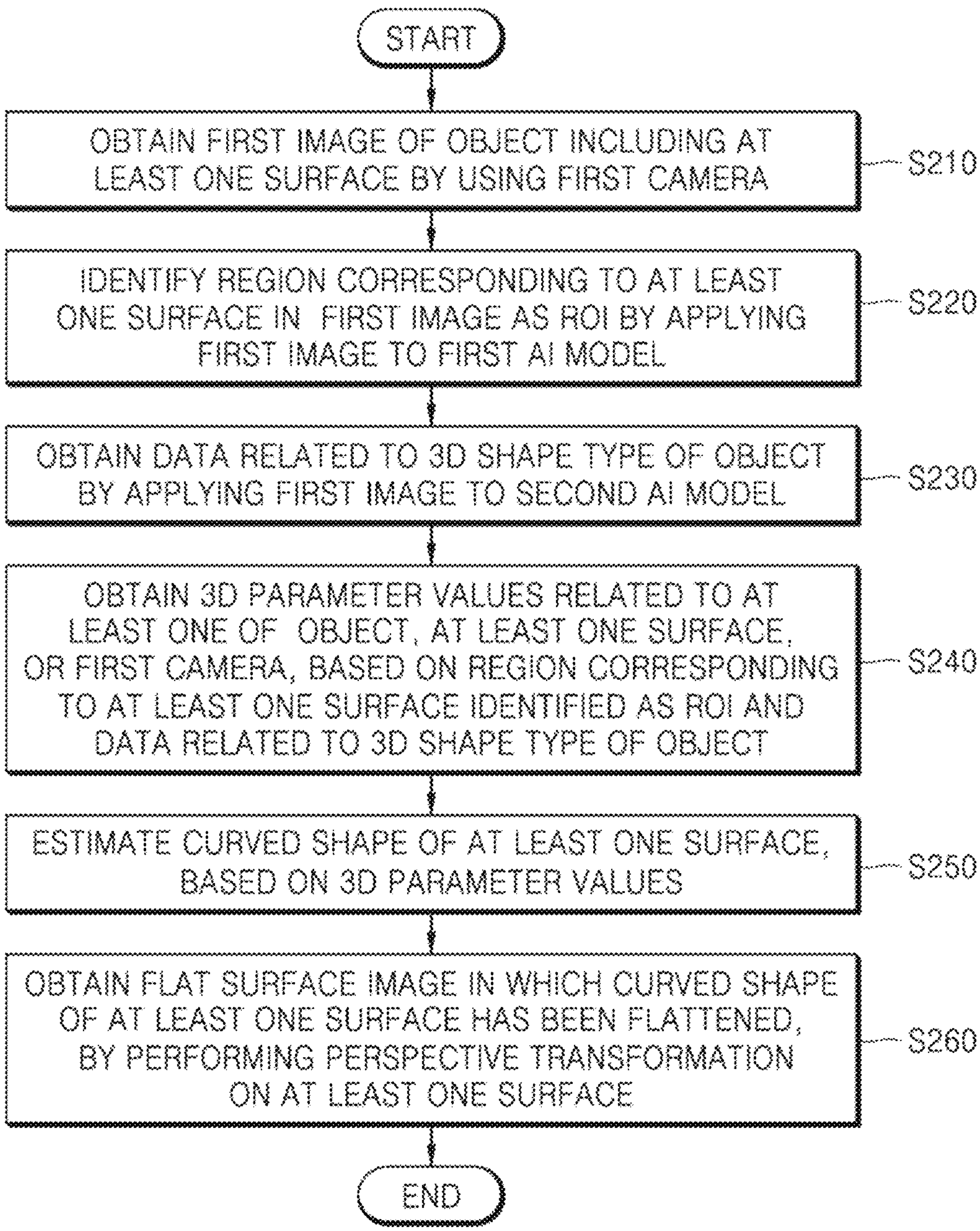
FIG. 2 illustrates a method of procession an image, which is performed by an electronic device according to an embodiment of the disclosure.

FIG. 2 is a flowchart of a method, performed by an electronic device according to an embodiment of the disclosure, of processing an image.

In operation S210, the electronic device 2000 according to an embodiment of the disclosure obtains a first image of an object including at least one surface (e.g., label) by using a first camera. The electronic device 2000 may activate the first camera through a user's manipulation. For example, the user may activate the camera of the electronic device 2000 to photograph the object in order to obtain information about the object. The user may activate the camera by touching a hardware button or icon for executing the camera, or may activate the camera through a voice command (e.g., Turn on a Hi-Bixby camera, and show the surface (e.g., label) information by capturing a Hi-Bixby picture.).

According to an embodiment of the disclosure, the first camera may be one of a telephoto camera, a wide-angle camera, and an ultra-wide-angle camera, and the first image may be one of an image captured by the telephoto camera, an image captured by the wide-angle camera, and an image captured by the ultra-wide-angle camera.

According to an embodiment of the disclosure, the electronic device 2000 may include one or more cameras. For example, the electronic device 2000 may include a multi-camera composed of a first camera and a second camera. When the electronic device 2000 includes a plurality of cameras, the plurality of cameras may have different specifications. For example, the plurality of cameras may include a telephoto camera, a wide-angle camera, and an ultra-wide-angle camera having different focal lengths and different angles of view.

However, the types of cameras included in the electronic device 2000 are not limited to the aforementioned examples. When the electronic device 2000 includes a plurality of cameras, the first image may be an image obtained by synthesizing images obtained through the plurality of cameras. The first image may be a preview image captured and stored to be displayed on the screen of the electronic device 2000, an image that has already been captured and stored in the electronic device 2000, or an image obtained from the outside of the electronic device 2000. The first image may be an image obtained by photographing a portion of an object including at least one surface (e.g., label), or may be an image obtained by photographing the entire object. According to an embodiment of the disclosure, the first image may be a panoramic image continuously captured by the first camera.

In operation S220, the electronic device 2000 according to an embodiment of the disclosure identifies a region corresponding to at least one surface (e.g., label) in the first image as an ROI by applying the first image to a first artificial intelligence (AI) model. For example, when the first image is obtained through the first camera, the electronic device 2000 may apply the first image to the first AI model. At this time, the first AI model may infer the ROI within the first image and output data related to the ROI. Applying the first image to the first AI model in the disclosure may include not only applying the entire first image itself to the first AI model, but also preprocessing the first image and applying a result of the preprocessing to the first AI model.

For example, the electronic device 2000 may apply, to the first AI model, a cropped image obtained by cropping out a partial region from the first image, an image obtained by resizing the first image, or an image obtained by cropping out and resizing a portion of the first image.

In the disclosure, the first AI model may be referred to as an ROI identification model. The ROI identification model may be trained to receive an image and output data related to an ROI of an object in the image. For example, the ROI identification model may be trained to infer a region corresponding to a surface (e.g., label) in an image as an ROI. According to some embodiments of the disclosure, the electronic device 2000 may identify an ROI (e.g., a label attached to a product) on a surface of the object by using the ROI identification model. According to some embodiments of the disclosure, the electronic device 2000 may identify keypoints representing an ROI of the object (in the disclosure, referred to as first keypoints) by using the ROI identification model. For example, the first AI model may output information about keypoints (or coordinate values) indicating an edge of at least one surface (e.g., label) in the first image. An operation, performed by the first AI model, of estimating an ROI in the first image will be described in more detail with reference to FIG. 5.

In the disclosure, a surface (e.g., label) region is exemplified as an ROI of an object, but the ROI is not limited thereto. Other regions where information to be extracted from the object may be set as ROIs by the electronic device 2000, and embodiments of the disclosure may be applied in the same/similar manner.

In operation S230, the electronic device 2000 according to an embodiment of the disclosure obtains data related to a 3D shape type of the object by applying the first image to a second AI model. For example, when the first image is obtained through the first camera, the electronic device 2000 may apply the first image to the second AI model. At this time, the second AI model may infer the 3D shape type of the object within the first image, and may output data related to the 3D shape type of the object. In the disclosure, the second AI model may be referred to as an object 3D shape identification model. The object 3D shape identification model may be trained to receive an image and output data related to a 3D shape type of an object in the image. For example, the object 3D shape identification model may be trained to infer the 3D shape type of the object in the image. According to some embodiments of the disclosure, the electronic device 2000 may identify the 3D shape type (e.g., a sphere, a cube, a cylinder, etc.) of the object included in the first image by using the object 3D shape identification model. An operation, performed by the electronic device 2000, of identifying the 3D shape type of the object by using the object 3D shape identification model will be described later with reference to FIG. 4.

When the object in the image has a 3D shape, an ROI attached to a surface of a 3D object in a 2D image may be distorted, and thus the accuracy of identification of information (e.g., a logo, an icon, text, etc.) in the ROI may be degraded. For example, when the object is a cylinder-type product, because the label of the product that sticks to the cylinder surface is attached to a curved surface of the object, the label of the product, which is an ROI, is distorted in an image of the cylinder-type product. The electronic device 2000 according to an embodiment of the disclosure may identify the 3D shape of the object, and may use data about the 3D shape type of the identified object to remove distortion of the ROI. In the disclosure, the cylinder-type product is just an example of the object. In the disclosure, the object can be any product or material having non-flat surface. Thus, the curved surface is just an example of non-flat surfaces discussed in the disclosure.

According to an embodiment of the disclosure, operation S220 of identifying a region corresponding to at least one surface (e.g., label) in the first image as an ROI by applying the first image to the first AI model, and operation S230 of obtaining data about the 3D shape type of the object included in the first image by applying the first image to the second model may be performed in parallel. For example, when the first image is obtained through the first camera, the electronic device 2000 may input the first image to each of the first AI model and the second AI model. At this time, an operation, performed by the first AI model, of inferring the region corresponding to the at least one surface (e.g., label) in the first image as an ROI, and an operation, performed by the second AI model, of inferring the 3D shape type of the object included in the first image may be performed in parallel.

According to an embodiment of the disclosure, any one of operations S220 and S230 may be performed first. For example, as a first operation, the electronic device 2000 may input the first image to the first AI model to check a result of inferring an ROI by the first AI model, and then, may input the first image to the second AI model. On the other hand, the electronic device 2000 may first input the first image to the first AI model to check a result of inferring the 3D shape type of the object included in the first image by the second AI model, and then may input the first image to the first AI model.

In operation S240, the electronic device 2000 according to an embodiment of the disclosure obtains a set of 3D parameter values related to at least one of an object, at least one surface (e.g., label), or a first camera, based on the region corresponding to the at least one surface (e.g., label) identified as the ROI and the data related to the 3D shape type of the object. According to some embodiments of the disclosure, the elements of a 3D parameter may include width, length, height, and radius information related to the 3D shape of the object.

According to some embodiments of the disclosure, the elements of the 3D parameter may include translation and rotation information for 3D geometric transformation on a 3D space of the object. The translation and rotation information may be information representing a location and angle at which the camera of the electronic device 2000 views and photographs the object.

According to some embodiments of the disclosure, the elements of the 3D parameter may include focal length information of the camera of the electronic device 2000 that has photographed the object. However, the 3D parameter is not limited to the aforementioned examples, and the electronic device 2000 may further include other pieces of information for identifying 3D geometrical characteristics of the object and removing distortion of the ROI.

According to an embodiment of the disclosure, the 3D parameter is determined to correspond to the 3D shape of the object. In other words, elements of a 3D parameter corresponding to each type of 3D shape (hereinafter, referred to as a 3D shape type) may be different.

For example, when the 3D shape is a cylinder type, a 3D parameter corresponding to the cylinder type may include a radius, but, when the 3D shape is a cube type, a 3D parameter corresponding to the cube type may not include a radius. The 3D parameter corresponding to the 3D shape type of the object obtained in operation S230 may be set as initial values used to obtain accurate 3D information of the object. The electronic device 2000 may obtain a 3D parameter representing 3D information of the object by finely adjusting parameter values so that the 3D parameter having an initial value represents the 3D information of the object.

According to an embodiment of the disclosure, when the 3D shape type of the object is a cylinder (or a bottle), the elements of the 3D parameter may include, but are not limited to, the width, length, height, and radius information of the object, the translation and rotation information on the 3D space of the object, and the focal length information of the camera of the electronic device 2000 that has photographed the object. As described above, when the 3D shape type of the object is a cuboid, the elements of the 3D parameter corresponding to the cuboid type may be different from those of the 3D parameter corresponding to the cylinder type.

According to an embodiment of the disclosure, the electronic device 2000 may obtain 3D information representing a curved shape of the at least one level. The electronic device 2000 finely adjusts the initial value of the 3D parameter to approximate to or match with a correct value of the 3D parameter of the object, so that an adjusted final value of the 3D parameter represents the 3D information of the object. Continuing the description of the case where the 3D shape type is a cylinder (or a bottle), which is the aforementioned example, the electronic device 2000 may adjust the width, length, height, and radius of the object among the values of the 3D parameter to indicate either relative percentages or absolute values of the width, length, and height of the object.

The electronic device 2000 may also adjust translation and rotation values among the values of the 3D parameter to become values representing the degrees of translation and rotation on the 3D space of the object. The electronic device 2000 may also adjust a focal length value among the values of the 3D parameter to become a value representing the focal length of the camera of the electronic device 2000 that has photographed the object.

According to an embodiment of the disclosure, the electronic device 2000 may set an arbitrary virtual object to estimate the 3D information of the object. The virtual object may be an object that has the same shape type as the 3D shape type of the object identified in operation S230 and is able to be rendered using a 3D parameter having initial parameter values. The electronic device 2000 may project a 3D virtual object in a 2D manner, and may set keypoints of the 3D virtual object (in the disclosure, referred to as second keypoints).

The electronic device 2000 may finely adjust the 3D parameter values so that the keypoints of the virtual object match the keypoints (first keypoints) of the object obtained in operation S220. As the fine-adjustment of the 3D parameters is repeatedly performed, the final values of the 3D parameter are determined, and, when the final values of the 3D parameter represent the 3D information of the object, the second keypoints obtained from the virtual object are matched with the first keypoints of the object. An operation, performed by the electronic device 2000, of changing the values of the 3D parameter to indicate the 3D information of the object through fine adjustment will be further described with reference to FIG. 6A.

The electronic device 2000 obtaining the 3D parameter values, described in operation S240, refers to obtaining the final values of the 3D parameter obtained through the above-described adjustment.

In operation S250, the electronic device 2000 according to an embodiment of the disclosure estimates the non-flat shape (e.g., curved shape) of the at least one surface (e.g., label), based on the 3D parameter values.

The 3D parameter whose values have been adjusted through the aforementioned operations indicates the 3D information of the object within the image (e.g., the width, length, height, and radius of the object, and the degree (angle) of curvature of the surface or the label attached to the surface of the object). The electronic device 2000 may generate a 2D mesh representing a surface (e.g., label), which is an ROI on the surface of the object, by using the 3D parameter. The 2D mesh data is a result of projecting surface (e.g., label) coordinates on the 3D space in a 2D manner by using the 3D parameter values, and may refer to surface (e.g., label) distortion information in the first image.

In operation S260, the electronic device 2000 according to an embodiment of the disclosure obtains a flat surface (e.g., label) image in which the non-flat shape (e.g., curved shape) of the at least one surface (e.g., label) has been flattened, by performing perspective transformation on the at least one surface (e.g., label).

The electronic device 2000 may transform the non-flat shape (e.g., curved shape) of the surface (e.g., label) into a flat shape through perspective transformation. Because an image of the flattened surface (e.g., label) is an image in which distortion or the like during photography due to the 3D shape of the object has been removed and/or reduced, the image of the flattened surface (e.g., label) may be referred to as a distortion-free image or a flat surface (e.g., label) image in the disclosure.

A distortion removal model may be used in operations S240 through S260. The distortion removal model may be trained to output a distortion-free image by receiving information of an ROI in an object and 3D parameter values related to the object. The information of the ROI may include an image of the ROI and coordinates of keypoints of the ROI. For example, the distortion removal model may obtain a flat label image including a flattened label, by receiving an image including a label attached to a surface of a 3D object including a curved surface and captured while being curved.

According to an embodiment of the disclosure, the electronic device 2000 may obtain information related to an object from the flat surface (e.g., label) image. The electronic device 2000 may identify a logo, icon, text, etc. within the ROI by using an information detection model for extracting information within the ROI. The information detection model may be stored in a memory of the electronic device 2000 or may be stored in an external server.

Through the above-described operations, the electronic device 2000 may infer the 3D information of the object in the image and may remove distortion from the ROI by performing precise perspective transformation by using the inferred 3D information of the object, thereby extracting information within the ROI with improved accuracy. An operation, performed by the electronic device 2000, of obtaining information related to the object from the flat surface (e.g., label) image by using the information detection model will be described later with reference to FIG. 7.

An operation, performed by the electronic device 2000, of obtaining a flat surface (e.g., label) image from which distortion has been removed from a first image including geometric distortion by using the first AI model (ROI identification model) and the second AI model (object 3D shape identification model) will now be described in more detail with reference to FIG. 3.

Figure 3:
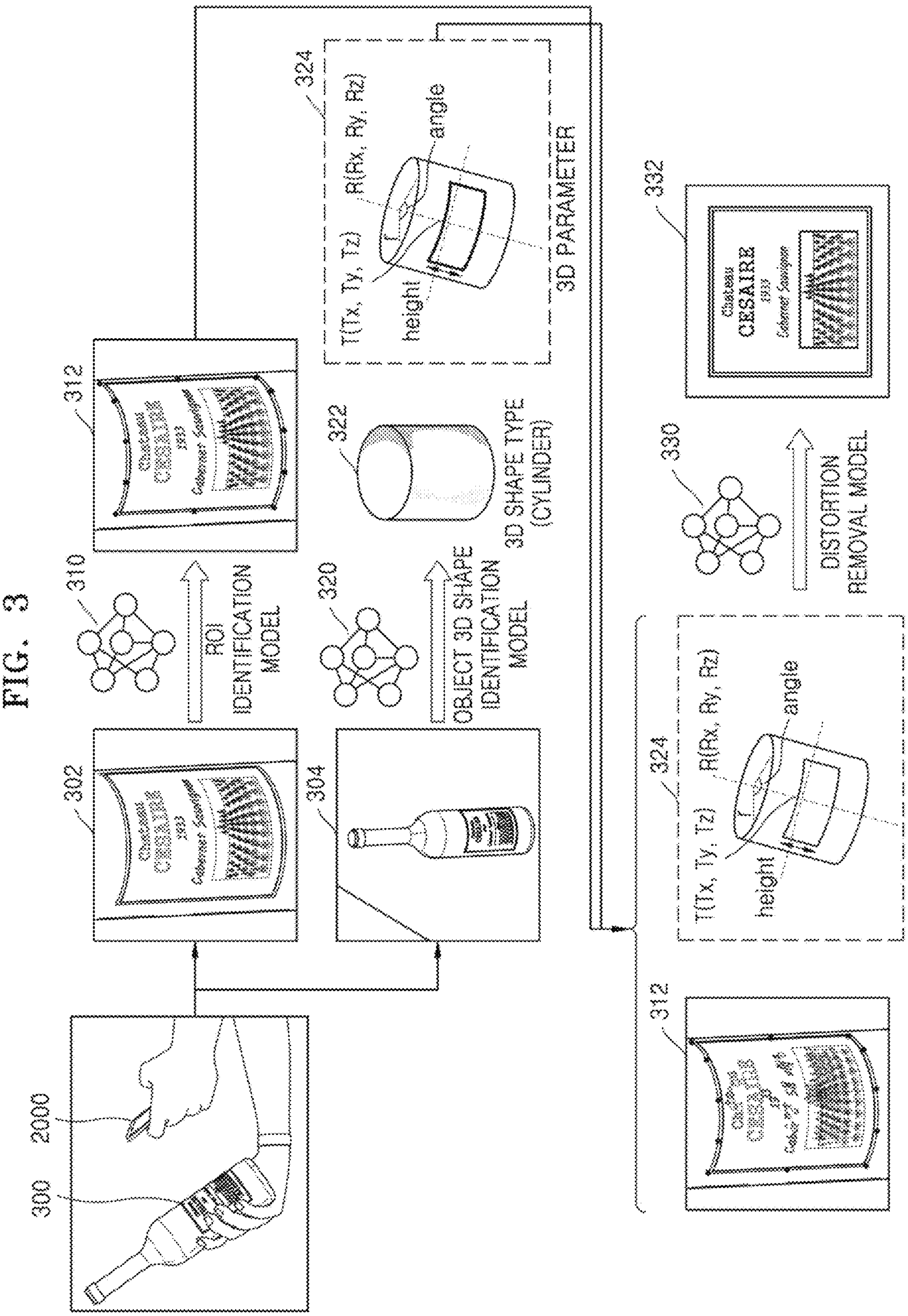
FIG. 3 illustrates an operation of processing an image, which is performed by an electronic device according to an embodiment of the disclosure.

FIG. 3 is a diagram for explaining an operation, performed by an electronic device according to an embodiment of the disclosure, of processing an image.

Referring to FIG. 3, the electronic device 2000 according to an embodiment of the disclosure may obtain an image of an object 300, hereinafter, an object image 304. The object 300 may include at least one label.

According to an embodiment of the disclosure, the electronic device 2000 may obtain the image of the object 300 by photograph the object 300 by using the camera of a user. Alternatively, the electronic device 2000 may receive an already-captured image of the object 300 from another electronic device (e.g., a server or an electronic device of another user).

According to an embodiment of the disclosure, the electronic device 2000 may identify an ROI 312 by using an ROI identification model 310. The ROI identification model 310 may be trained to receive an image and output data related to the ROI 312 of the object 300 in the image. The data related to the ROI 312 may be, for example, keypoints of the ROI 312 and/or their coordinates, but embodiments of the disclosure are not limited thereto. The data related to the ROI 312 will now be referred to as the ROI 312. In the example of FIG. 3, the ROI 312 is a label attached to the surface of the object 300. However, the type of the ROI 312 is not limited thereto.

According to an embodiment of the disclosure, the electronic device 2000 may use the object image 304 as input data of the ROI identification model 310. The electronic device 2000 may process the ROI 312 so that the ROI 312 is suitable to be identified, by applying a certain preprocessing operation to the object image 304. For example, the electronic device 2000 may use a cropped object image 302, which is obtained by cropping out a portion of the object image 304 and resizing the cropped object image 304, as input data of the ROI identification model 310. In this case, a cropped-out region of the object image 304 may be a region other than an ROI. At least a portion of the object 300 may be included in the cropped object image 302, and the ROI 312 of the object 300 may be included in the cropped object image 302.

According to an embodiment of the disclosure, the electronic device 2000 may identify a 3D shape type 322 of an object by using an object 3D shape identification model 320. The object 3D shape identification model 320 may be trained to receive an image and output data related to the 3D shape type 322 of the object 300 in the image. FIG. 3 illustrates that the 3D shape type 322 is a cylinder, but embodiments of the disclosure are not limited thereto. For example, the 3D shape type 322 may be a sphere, a cube, or the like. The data related to the 3D shape type 322 will now be referred to as the 3D shape type 322.

The electronic device 2000 may obtain initial values of 3D parameter 324, based on the 3D shape type 322. The 3D parameter 324 may be determined based on the 3D shape type 322. For example, when the 3D shape type 322 is a cylinder type, elements of the 3D parameter 324 corresponding to the cylinder type may include at least one of a height, a radius, the angle of an ROI on an object surface, translation coordinates and rotation coordinates on a 3D space, or a focal length of the camera.

According to an embodiment of the disclosure, the electronic device 2000 may obtain a distortion-free image 332 by using a distortion removal model 330. The distortion removal model 330 may be trained to receive the ROI 312, the 3D parameter 324, and the object image 304 (or the cropped object image 302) and output the distortion-free image 332. In the example of FIG. 3, because the ROI 312 is a label and the object 300 is a bottle, the distortion-free image 332 may be a flat label image in which distortion of the label attached to the surface of the bottle has been removed. However, the distortion-free image 332 is not limited to as a flat label image. The distortion-free image 332 may include all types of images obtainable according to the type of the ROI 312 and the 3D shape type 322.

According to an embodiment of the disclosure, the distortion removal model 330 may tune the initial values of the 3D parameter 324 so that final values of the 3D parameter 324 represent 3D information of the object 300. For example, relative or absolute values such as the width, length, height, and radius of the object 300 and the degree (angle) of curvature of a label attached to the surface of the object 300 may be obtained by the distortion removal model 330. The distortion removal model 330 may create the distortion-free image 332, based on the final values of the 3D parameter 324 representing the 3D information of the object 300.

For example, the distortion removal model 330 may obtain, as the distortion-free image 332, the flat label image in which distortion of the label has been removed, by transforming the curvature of the label attached to the surface of the (curved) object 300 to be flattened, based on the final values of the 3D parameter 324.

According to an embodiment of the disclosure, the electronic device 2000 may replace an operation of the distortion removal model 330 with a series of data processing/calculations. The electronic device 2000 may obtain the distortion-free image 332 by performing the series of data processing/calculations, without using the distortion removal model 330. For example, the electronic device 2000 may set an arbitrary virtual object to estimate the 3D information of the object. The arbitrary virtual object may be created based on the initial values of the 3D parameter 324. The electronic device 2000 may set an arbitrary ROI from the arbitrary virtual object and adjust the values of the 3D parameter so that the arbitrary ROI of the arbitrary virtual object matches with the ROI 312 of the object 300, thereby obtaining the final values of the 3D parameter 324. The electronic device 2000 may create the distortion-free image 332, based on the final values of the 3D parameter 324.

An operation, performed by the electronic device 2000, of setting the arbitrary virtual object to estimate the 3D information of the object will be described later in more detail with reference to FIG. 6A.

Figure 4:
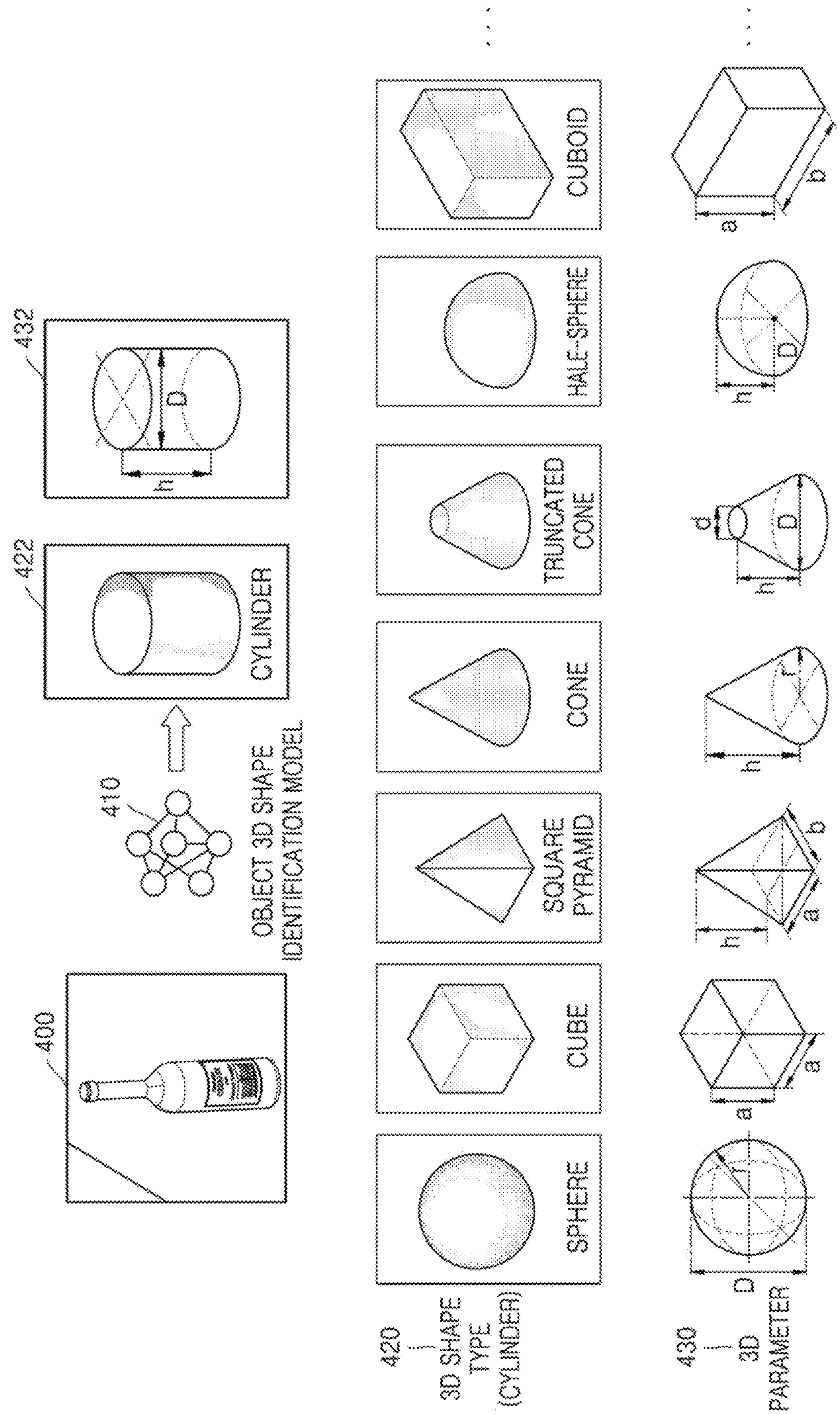
FIG. 4 illustrates an operation of identifying a three-dimensional (3D) shape of an object, which is performed by an electronic device according to an embodiment of the disclosure.

FIG. 4 is a diagram for explaining an operation, performed by an electronic device according to an embodiment of the disclosure, of identifying a 3D shape of an object.

According to an embodiment of the disclosure, the electronic device 2000 may identify a 3D shape type 420 of an object by using an object 3D shape identification model 410. The electronic device 2000 may identify the 3D shape type 420 of the object through a neural network operation of the object 3D shape identification model 410 for receiving an image 400 of the object and extracting features.

The object 3D shape identification model 410 may be trained based on a training dataset composed of various images including a 3D object. The 3D shape type 420 of the object may be labeled on the object images of the training dataset of the object 3D shape identification model 410. The 3D shape type 420 of the object may include, for example, a sphere, a cube, a pyramid, a cone, a truncated cone, a hemisphere, and a cuboid, but embodiments of the disclosure are not limited thereto.

According to an embodiment of the disclosure, the electronic device 2000 may obtain a 3D parameter 430 corresponding to the identified 3D shape type 420 of the object, based on the identified 3D shape type 420. The 3D parameter 430 refers to elements representing geometric characteristics related to the 3D shape of the object.

For example, when the 3D shape type 420 is a 'sphere', the 3D parameter 430 of a 'sphere' shape is obtained and when the 3D shape type 420 is a 'cube', the 3D parameter 430 of a 'cube' shape may be obtained. Elements constituting the 3D parameter 430 may be different for different 3D shape types 420. For example, the 3D parameter 430 of a 'sphere' shape may include elements such as a radius and/or a diameter, and the 3D parameter 430 of a 'cube' shape may include elements such as a width, a length, and a height.

The 3D parameter 430 shown in FIG. 4 includes only elements such as a width, a length, a radius, and a depth, which are geometric features, but the 3D parameter 430 is not limited thereto. The 3D parameter 430 may further include rotation coordinate information of an object on a space, translation coordinate information of the object on the space, focal length information of a camera that has photographed the object, and 3D information about an ROI of the object (e.g., a width, a length, and a curvature of the ROI). In other words, the 3D parameter 430 is only an example to aid visual understanding, and the 3D parameter 430 may further include any type of element that may be used to estimate 3D information of an object in an image other than the aforementioned examples, and some elements may be excluded from the aforementioned examples.

For example, the electronic device 2000 according to an embodiment of the disclosure applies the image 400 to the object 3D shape identification model 410 to identify the cylinder type 422, which is the 3D shape type 420 of the object in the image 400. The electronic device 2000 may obtain initial values of a 3D parameter 432 of a cylinder shape, corresponding to the cylinder type 422. The 3D parameter 432 of the cylinder shape may include, for example, a diameter D of a cylinder, a radius r of the cylinder, rotation information R of the cylinder on a 3D space, translation information T of the cylinder on the 3D space, a height h of the cylinder, a height h' of an ROI on the surface of the cylinder, an angle θ at which the ROI (e.g., the label of a product) is positioned on the surface of the cylinder, and focal length information F of a camera, but embodiments of the disclosure are not limited thereto.

According to an embodiment of the disclosure, each of the elements included in the 3D parameter 430 may have a set initial value representing 3D information of an arbitrary object. The electronic device 2000 according to an embodiment of the disclosure may match so that the 3D parameter 430 represents the 3D information of the object. For example, the electronic device 2000 may adjust the values of the 3D parameter 432 of the cylinder shape so that the values of the 3D parameter 432 of the cylinder shape represent the 3D information of the object in the image 400. In other words, the electronic device 2000 may obtain the values of the 3D parameter 430 representing the 3D information of the object in the image 400. This will be further described in the description of FIG. 6A.

The drawings of the disclosure illustrate that the object in the image 400 is 'wine' and the ROI is a 'wine label', but the disclosure is not limited thereto.

For example, in the disclosure, the 3D shape type 420 of a wine bottle is identified as the cylinder type 422. However, the wine bottle may be identified as a bottle type according to training and tuning of the object 3D shape identification model 410, and a 3D parameter obtained accordingly may be a 3D parameter corresponding to the bottle type.

For another example, the object in the image may be an object such as a sphere, a cone, or a rectangular parallelepiped, which is another type of 3D shape. In this case, the electronic device 2000 may identify the 3D shape type 420 for each object, and may obtain the 3D parameter 430.

As another example, the ROI in the image may be a region representing information related to a product (object), such as the product's ingredients, how to use the product, and how much to use the product, rather than the label of the product. In this case, the electronic device 2000 may perform distortion removal operations according to embodiments of the disclosure to accurately identify information included in the ROI of the object, and may obtain object-related information from a distortion-free image.

Figure 5:
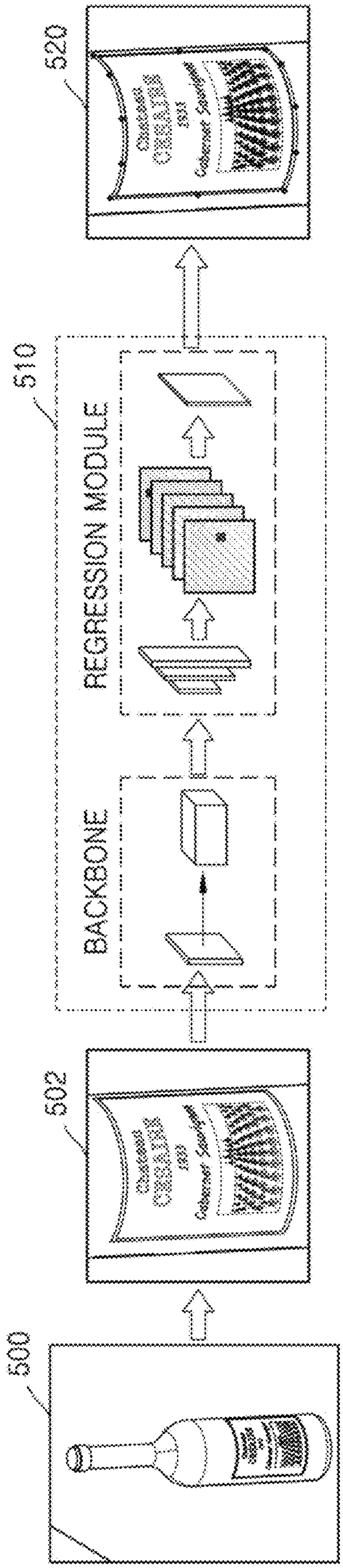
FIG. 5 illustrates an operation of identifying a region of interest (ROI) on the surface of an object, which is performed by an electronic device according to an embodiment of the disclosure.

FIG. 5 is a diagram for explaining an operation, performed by an electronic device according to an embodiment of the disclosure, of identifying an ROI on the surface of an object.

According to an embodiment of the disclosure, the electronic device 2000 may identify an ROI 520 by using an ROI identification model 510. The electronic device 2000 may identify the ROI 520 through a neural network operation of the ROI identification model 510 for receiving an object image 500 and extracting features.

According to an embodiment of the disclosure, the electronic device 2000 may pre-process the object image 500 that is to be input to the ROI identification model 510. The electronic device 2000 may use an input image 502 obtained by cropping out a portion of the object image 500 and resizing the cropped object image 500, as input data of the ROI identification model 510. According to an embodiment of the disclosure, the electronic device 2000 may obtain an image that is to be input to the ROI identification model 510, by using another camera.

For example, the electronic device 2000 may obtain a high-resolution image of an ROI by using another high-resolution camera, when a user photographs an object. In this case, an image captured by the user may have the same format as the object image 500, and an image separately stored by the electronic device 2000 to identify an ROI may have the same format as the input image 502.

The ROI identification model 510 may be trained based on a training dataset composed of various images including an ROI. Keypoints representing the ROI may be labeled on the ROI images of the training dataset of the ROI identification model 510. The ROI 520 identified by the electronic device 2000 by using the ROI identification model 510 may include, but is not limited to, an image on which the detected ROI 520 is displayed, keypoints representing the ROI 520, and/or the coordinates of the keypoints in the image.

The ROI identification model 510 may include a backbone network and a regression module. The backbone network may use known neural network (e.g., Convolutional Neural Network (CNN)) algorithms for extracting various features from the input image 502. For example, the backbone network may be a pre-trained network model, and may be changed to another type of neural network to improve the performance of the ROI identification model 510. The regression module performs a task of detecting the ROI 520. For example, the regression module may include a regression operation for performing learning such that a bounding box, keypoints, and the like representing an ROI converge to a correct answer value. The regression module may include a neural network layer and weights for detecting the ROI 520 For example, the regression module may be configured with Regions with Convolutional Neural Networks (R-CNN) features for detecting an ROI, but embodiments of the disclosure are not limited thereto. The electronic device 2000 may train the layers of the regression module by using the training dataset of the ROI identification model 510.

Figure 6A:
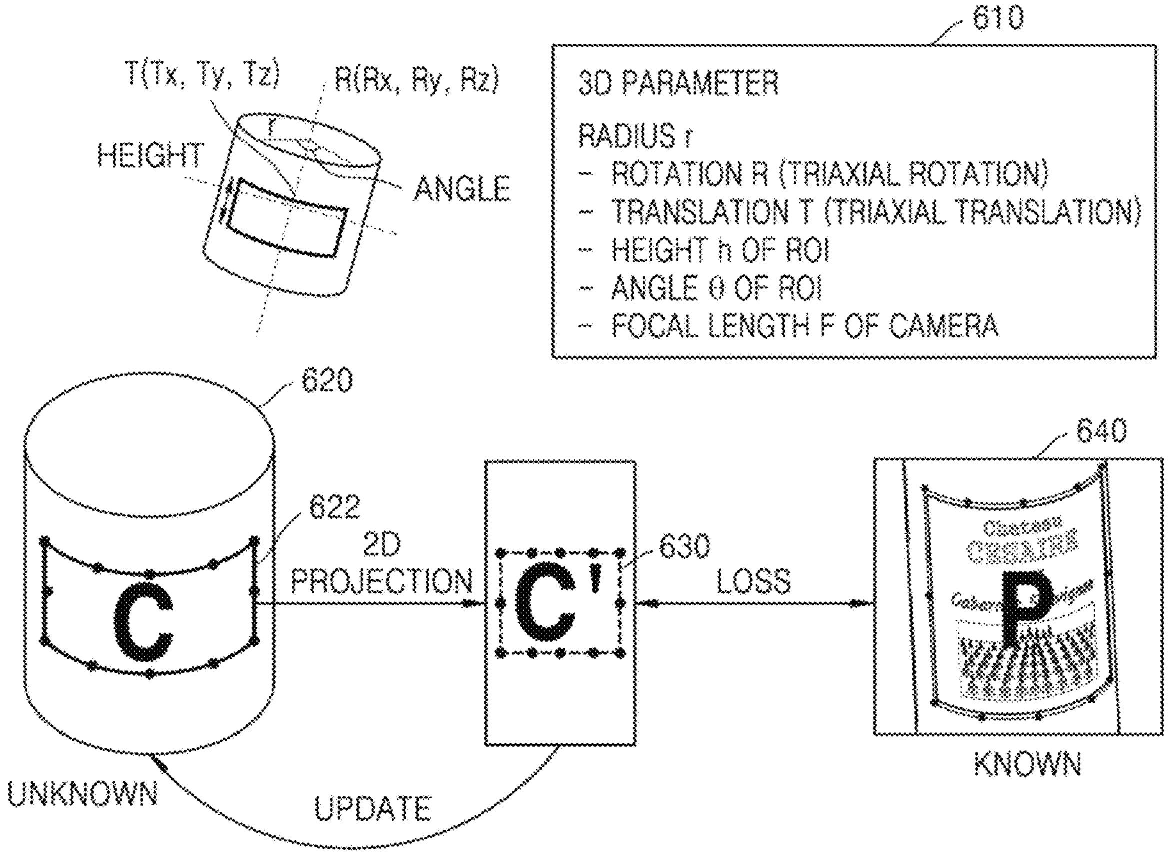
FIG. 6A illustrates an operation of obtaining 3D information of an object, which is performed by an electronic device according to an embodiment of the disclosure.

FIG. 6A is a diagram for explaining an operation, performed by an electronic device according to an embodiment of the disclosure, of obtaining 3D information of an object.

When describing FIG. 6A, a case in which a 3D shape type of an object is identified as a cylinder will be described as an example. However, the 3D shape type of the object is not limited to a cylinder, and may be applied to any 3D shape type that may represent geometrical features as a 3D parameter, including the aforementioned example.

The electronic device 2000 according to an embodiment of the disclosure may perform operations that will be described later to obtain the 3D information of the object. Because the electronic device 2000 performs perspective transformation, based on the 3D information of the object, the electronic device 2000 may remove distortion in an image more precisely than when perspective transformation is generally performed without the 3D information of the object. Distortion in the image may include distortion, etc. of an ROI due to a curved surface of the surface of a 3D object. For example, a label attached to the surface of the object may be illustrated as being distorted in a 2D image due to a curved surface of a 3D shape of the object, but embodiments of the disclosure are not limited thereto.

According to an embodiment of the disclosure, the electronic device 2000 may obtain a 3D parameter 610 corresponding to a cylinder, which is an identified 3D shape type, from among 3D parameters corresponding to various pre-stored 3D shape types (e.g., a cylinder, a sphere, and a cube). The 3D parameter 610 corresponding to the cylinder type may include, for example, a radius r of the cylinder, rotation information R of the cylinder on a 3D space, translation information T of the cylinder on the 3D space, a height h of an ROI, an angle θ at which the ROI (e.g., the label of a product) is positioned on the surface of the cylinder, and focal length information F of a camera, but embodiments of the disclosure are not limited thereto. Each of the elements included in the 3D parameter 610 may have a set initial value.

According to an embodiment of the disclosure, the electronic device 2000 may set a virtual object 620 to estimate the 3D information of the object within the image. The virtual object 620 may be an object that is set as the same shape type as the 3D shape type of the object in the image and is rendered as an initial value of the 3D parameter 610. In other words, in the example of FIG. 6A, the virtual object 620 is of a cylinder type, and is an object that uses the initial values (r, R, T, h, θ, and F) of the 3D parameter 610 as 3D information. The virtual object 620 may include an initial ROI 622 arbitrarily set for the virtual object.

The electronic device 2000 may finely adjust the values of the 3D parameter 610 so that the values of the 3D parameter 610 representing the 3D information of the virtual object 620 represent the 3D information of the object in the image.

The electronic device 2000 may project the virtual object 620 in two dimensions, and may set keypoints 630 (also, referred to as second keypoints (630)) indicating the ROI (e.g., a label) of the virtual object 620. The electronic device 2000 may finely adjust the values of the 3D parameter 610 so that the second keypoints 630 match keypoints 640 (also, referred to as first keypoints (640)) indicating the ROI of the object in the image. Because the operation, performed by the electronic device 2000, of obtaining the first keypoints 640 indicating the ROI of the object in the image has been described above, a redundant description thereof will be omitted.

The electronic device 2000 may adjust the second keypoints 630 to match with the first keypoints 640, based on a loss function. A function f may be a function including the initial values r, R, T, h, θ, and F of the 3D parameter 610 of the cylinder as variables. The electronic device 2000 may estimate the second keypoints 630 of the virtual object 620 using the function f, and may adjust the second keypoints 630 by using the loss function to minimize a difference between the second keypoints 630 and the first keypoints 640. The electronic device 2000 may change the values of the 3D parameter 610 so that the second keypoints 630 match with the first keypoints 640. The electronic device 2000 may re-create (update) the virtual object 620, based on the changed values of the 3D parameter 610, and may repeat the above-described operation.

In other words, by repeating adjustment of the values of the 3D parameter 610 and creation of a virtual object having 3D information of the adjusted values of the 3D parameter 610, the electronic device 2000 may obtain values of the 3D parameter 610 by which the difference between the second keypoints 630 obtained by projecting the virtual object 620 in two dimensions and the first keypoints 640 indicating the ROI of the object in the image is minimized. As the above-described adjustment is repeated, the initial values of the 3D parameter 610 set for the virtual object 620 may be adjusted to approximate the correct value of the 3D parameter 610 of the object. When the second keypoints 630 are matched to the first keypoints 640, the values of the 3D parameter 610 corresponding to the virtual object 620 in this case represent the 3D information of the object in the image. The electronic device 2000 may finally obtain the 3D parameter 610 representing the 3D information of the object in the image.

Figure 6B:
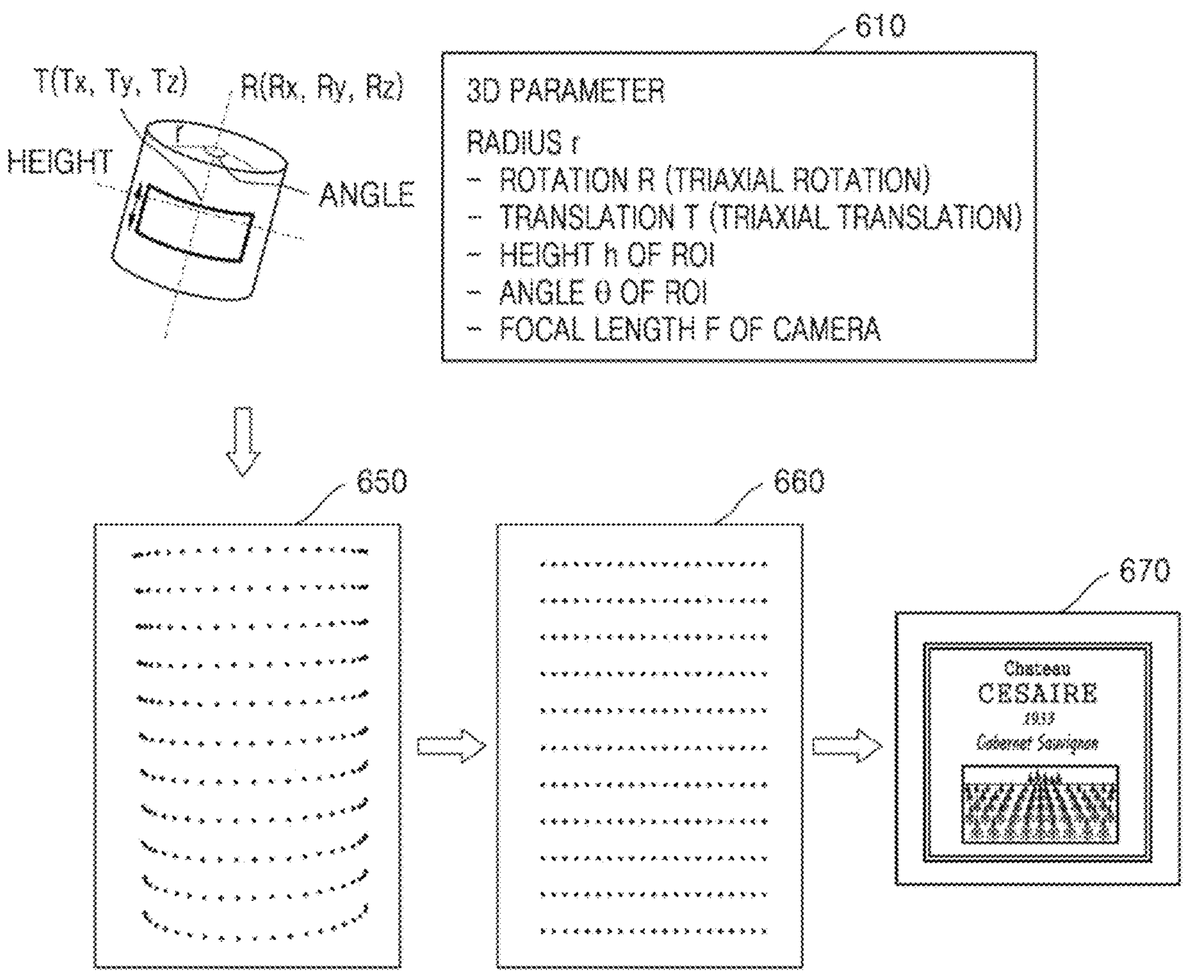
FIG. 6B illustrates an operation of removing distortion of an ROI, based on 3D information of an object, which is performed by an electronic device according to an embodiment of the disclosure.

FIG. 6B is a diagram for explaining an operation, performed by an electronic device according to an embodiment of the disclosure, of removing distortion of an ROI, based on 3D information of an object.

In the description of FIG. 6B, the contents described above as an example with reference to FIG. 6A will be continuously described. Referring to FIG. 6B, the electronic device 2000 according to an embodiment of the disclosure may obtain the values of the 3D parameter 610 values representing 3D information of an object in an image, through a process of finely adjusting the values of the 3D parameter 610.

The electronic device 2000 may create 2D mesh data 650 representing an ROI on the surface of the object within the image, by using the values of the 3D parameter 610. The 2D mesh data 650 refers to data created by projecting the coordinates of the ROI of the object on a 3D space in two dimensions, based on the obtained values of the 3D parameter 610, and includes distortion information of the ROI of the object.

For example, an ROI attached to the surface of a 'wine bottle', which is a 3D object having a curved shape, may be a 'wine label'. In this case, the 2D mesh data 650 is a result of 2D projection of coordinates on the 3D space of a wine label attached to the surface of a wine bottle, and may represent distortion information of the wine label, which is an ROI within an image including the wine bottle.

The electronic device 2000 may convert the 2D mesh data 650 in which bending distortion has been reflected into flat data 660. In this case, various operations for data conversion may be applied. For example, the electronic device 2000 may use, but is not limited to, a perspective transformation operation.

The electronic device 2000 according to an embodiment of the disclosure may obtain a distortion-free image 670 corresponding to the flat data 660 by creating the flat data 660. For example, the distortion-free image 670 may be, but is not limited to, an image in which a wine label having a curved shape and attached to the curved surface of the wine bottle is flattened. According to some embodiments of the disclosure, the electronic device 2000 may perform inter-pixel interpolation when obtaining the distortion-free image 670, thereby improving an image quality.

The electronic device 2000 may extract information within the ROI by using the distortion-free image 670 of the ROI. Because the distortion-free image 670 is created based on a result of inferring accurate 3D information of the object, a logo, an icon, text, etc. within the ROI may be more accurately detected even when a general information detection model (e.g., an optical character recognition (OCR) model) for extracting the information within the image is used.

In other words, even when an information detection model is not separately trained by reflecting the distortion in the image to extract information from a distorted image, accurate information extraction may be performed even through a general information detection model. However, the general information detection model described above is only an example, and the electronic device 2000 may also use a detection model trained by including distorted training data in logos, icons, text, and the like.

Figure 7:
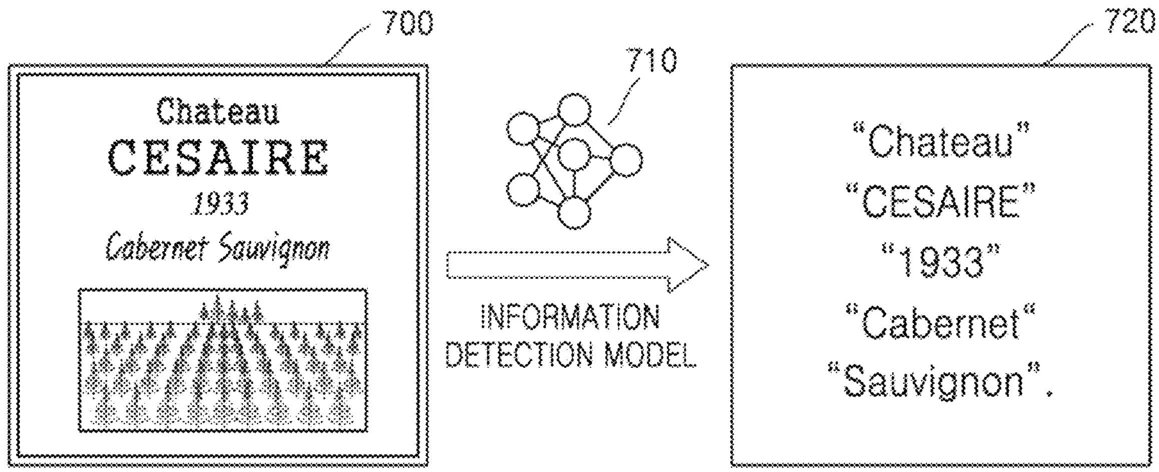
FIG. 7 illustrates an operation of extracting information in an ROI, which is performed by an electronic device according to an embodiment of the disclosure.

FIG. 7 is a view for explaining an operation, performed by an electronic device according to an embodiment of the disclosure, of extracting information in an ROI.

FIG. 7 will be explained on the premise that, according to the above-described embodiments, an object is included in an image, at least a portion of the entire area of the object is an ROI, and the electronic device 2000 obtains a distortion-free image 700 of the ROI. In detail, the distortion-free image 700 may be a flat label image from which distortion of a product label (e.g., distortion due to curvature) has been removed.

According to an embodiment of the disclosure, the electronic device 2000 may extract in-ROI information 720 from the distortion-free image 700 of the ROI by using an information detection model 710. The in-ROI information 720 may be information related to the object. For example, the electronic device 2000 may obtain the distortion-free image 700 of the product label included in the object, and may obtain the in-ROI information 720 related to the object included in the product label.

According to an embodiment of the disclosure, because the information detection model 710 extracts information by using the distortion-free image 700, known detection models used for information extraction may be used. For example, the information detection model 710 may be an OCR model. The electronic device 2000 may detect texts within the ROI by using the OCR model. The OCR model may recognize general characters, special characters, symbols, etc.

However, the in-ROI information 720 is not limited thereto, and various detection models for detecting logos, icons, images, and the like within the ROI may be used. In detail, a logo detection model, an icon detection model, an image detection model, an object detection model, and the like may be included.

According to an embodiment of the disclosure, the information detection model 710 may be trained based on the distortion-free image 700. In order to secure the precision of information extraction from the distortion-free image 700 obtained according to the above-described embodiments, the electronic device 2000 may further train the information detection model 710 by including the distortion-free image 700 and the in-ROI information 720 in a training dataset.

In this case, the electronic device 2000 may use known detection models as a pre-trained model to train the information detection model 710 so that the in-ROI information 720 is more precisely extracted. According to some embodiments of the disclosure, the electronic device 2000 may use one or more information detection models 710. For example, the electronic device 2000 may independently display/provide information obtained from each of two or more information detection models 710, or may create new secondary information by combining and/or processing the information obtained from each of the two or more information detection models 710 and display/provide the created secondary information.

Figure 8A:
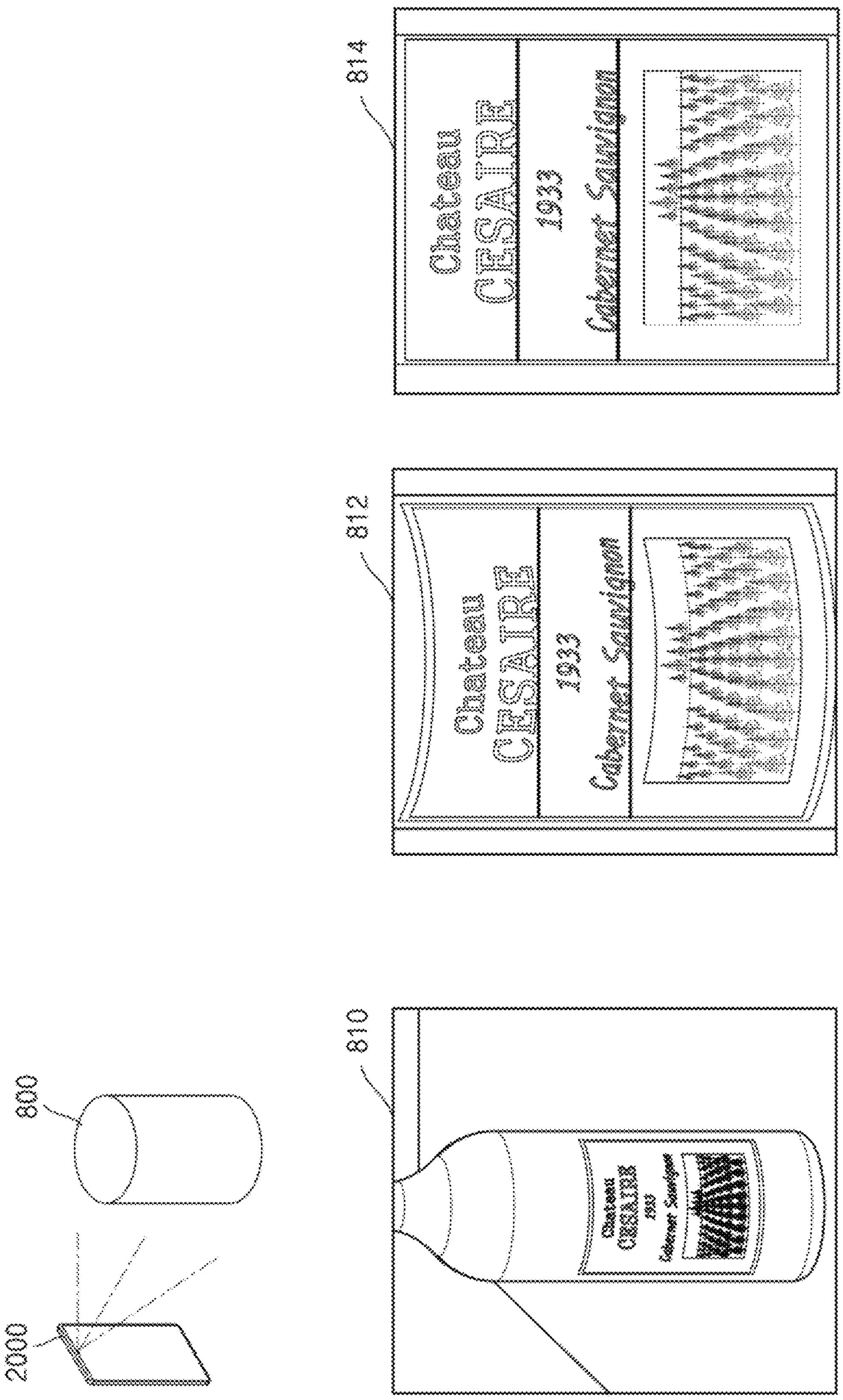
FIG. 8A illustrates a first example in which an electronic device according to an embodiment of the disclosure obtains a distortion-free image by obtaining 3D information.

FIG. 8A is a view for explaining a first example in which an electronic device according to an embodiment of the disclosure obtains a distortion-free image by obtaining 3D information.

Figure 8B:
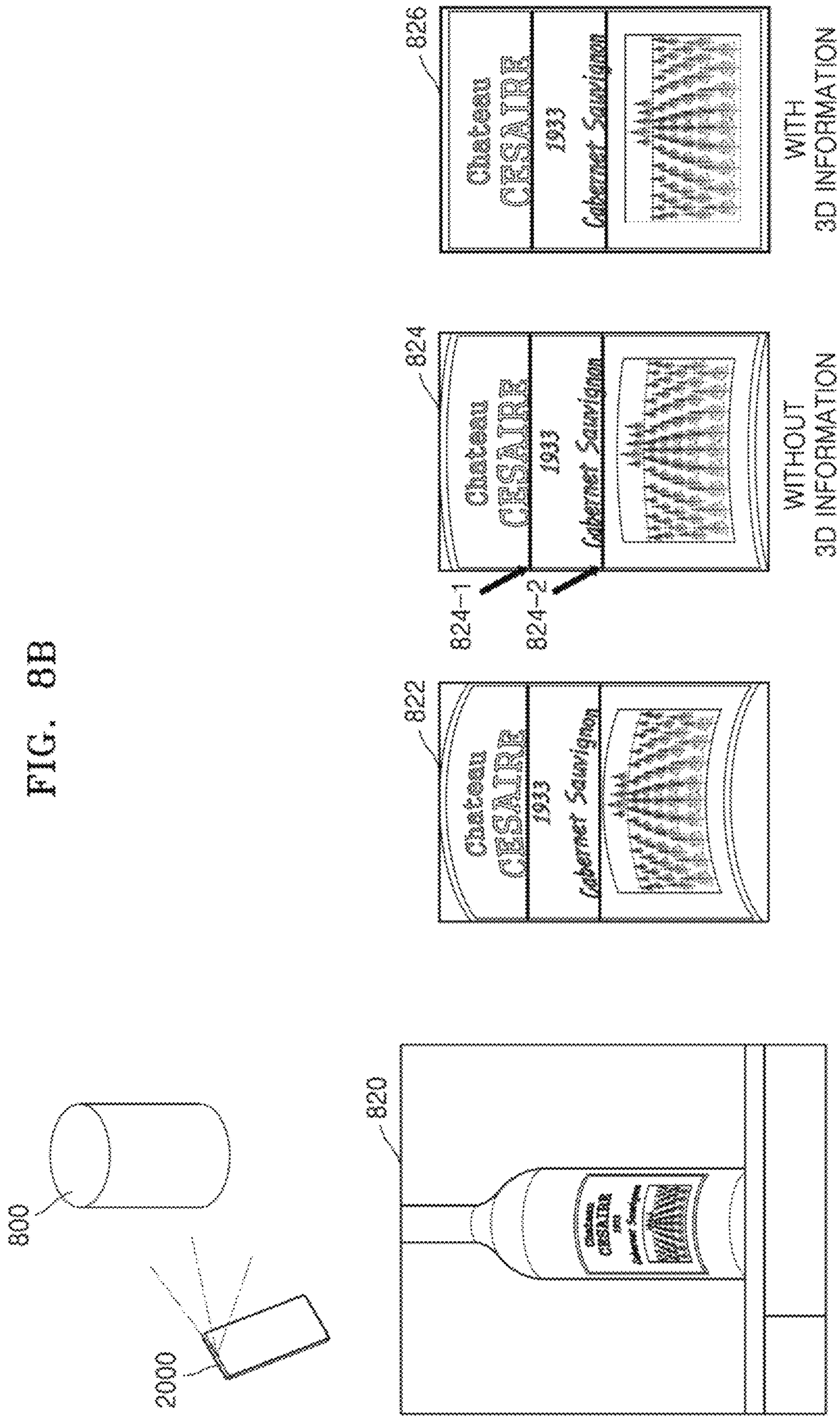
FIG. 8B illustrates a second example in which an electronic device according to an embodiment of the disclosure obtains a distortion-free image by obtaining 3D information.
Figure 8C:
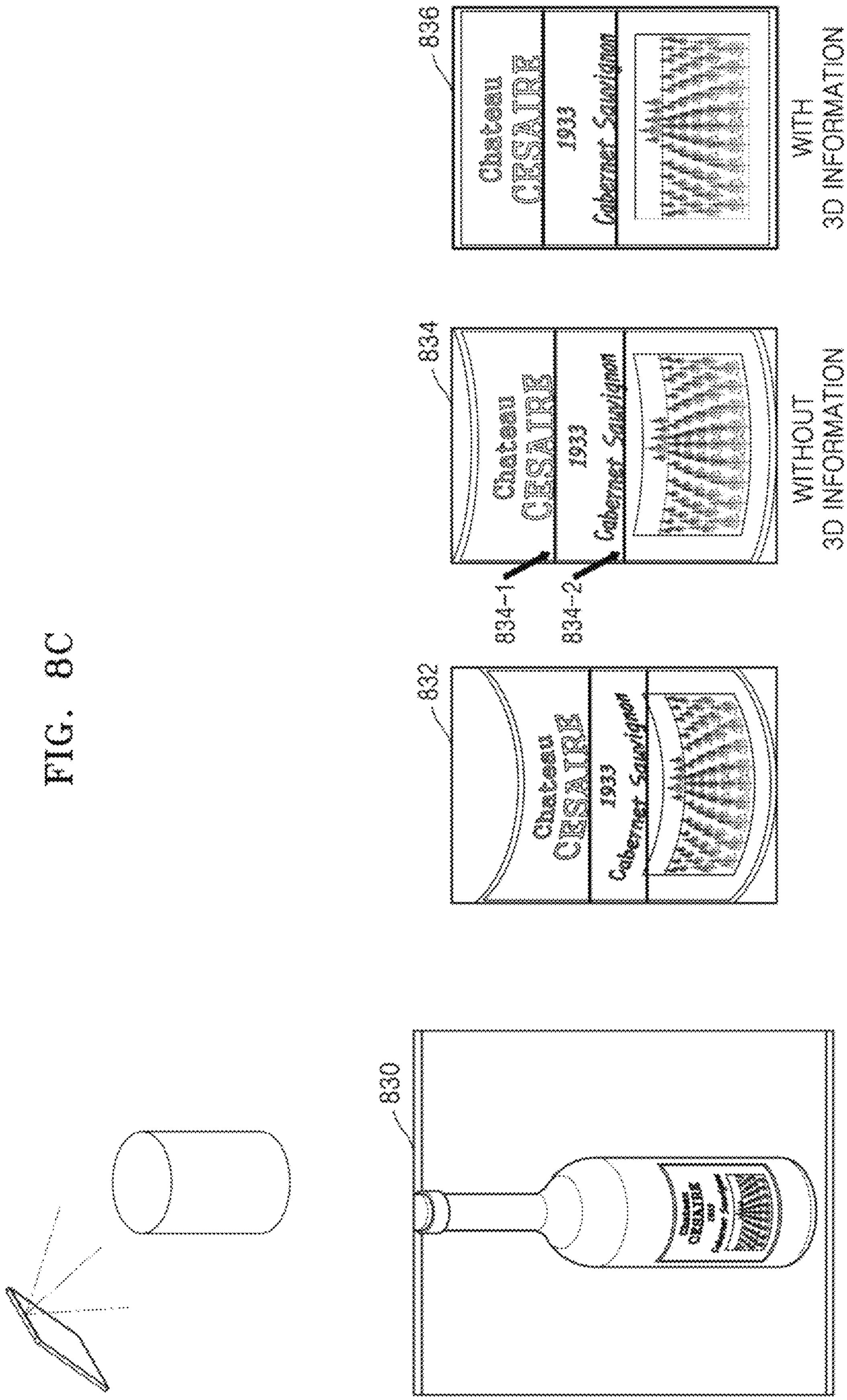
FIG. 8C illustrates a third example in which an electronic device according to an embodiment of the disclosure obtains a distortion-free image by obtaining 3D information.

In FIGS. 8A through 8C, a viewpoint is a term arbitrarily selected to indicate a direction in which and/or an angle at which the camera of the electronic device 2000 views an object 800.

Referring to FIG. 8A, the electronic device 2000 according to an embodiment of the disclosure may identify an ROI 812 from an object image 810 obtained by photographing the object 800 at a first viewpoint, and may obtain a distortion-free image 814 (for example, a flat label image).

According to an embodiment of the disclosure, the first viewpoint may be a direction in which the camera of the electronic device 2000 views the object 800 from the front. In this case, even when the electronic device 2000 photographs the object 800 from the front, because an image obtained by photographing an object in a 3D shape is 2D, a surface of the object 800 or a label attached to the object 800 may have distortion due to a curved surface existing in the object 800.

The electronic device 2000 according to an embodiment of the disclosure may crop the ROI 812 from the object image 810, and may obtain the distortion-free image 814 including the ROI 812. The electronic device 2000 may use 3D information of the object 800 in order to obtain the distortion-free image 814. The 3D information may be composed of 3D parameter values tuned for the object 800.

For example, the 3D information may include a radius of the object 800 of a cylinder shape, rotation coordinates of the object 800 on a 3D space, translation coordinates of the object 800 on the 3D space, an angle at which the ROI 812 is positioned on the surface of the object 800 (i.e., an angle from a central axis of the cylinder shape, which is a 3D shape of the object 800, to both ends of the ROI 812), and a focal length of the camera when the electronic device 2000 captures the object image 810.

Based on the 3D information, the electronic device 2000 may perform perspective transformation so that the ROI 812 may be expressed on a 2D plane without distortion. Because detailed operations for this perspective transformation have been described above, redundant descriptions thereof will be omitted.

As a viewpoint at which the electronic device 2000 views the object 800 changes, the degree of distortion occurring in the ROI 812 may vary. The electronic device 2000 according to an embodiment of the disclosure may perform robust distortion removal regardless of the degree of distortion by utilizing the 3D information. This will now be described in greater detail with reference to FIGS. 8B and 8C.

FIG. 8B is a view for explaining a second example in which an electronic device according to an embodiment of the disclosure obtains a distortion-free image by obtaining 3D information.

Referring to FIG. 8B, the electronic device 2000 according to an embodiment of the disclosure may identify an ROI 822 from an object image 820 obtained by photographing the object 800 at a second viewpoint, and may obtain a distortion-free image 826 (for example, a flat label image).

According to an embodiment of the disclosure, the second viewpoint may be a direction in which the camera of the electronic device 2000 is inclined in a vertically upward direction to view the object 800. In this case, not only distortion due to the 3D shape of the object 800 but also distortion due to the viewpoint of the camera of the electronic device 2000 may exist in the ROI 822 included in the object image 820. The electronic device 2000 may obtain a distortion-free image 826 from which distortion due to the 3D shape of the object 800 and distortion due to the viewpoint of the camera of the electronic device 2000 have been removed, by using the 3D information of the object 800.

For example, a transformed image 824 is an image created by performing perspective transformation on the ROI 822 to achieve flattening. Because a known perspective transformation operation may be used for perspective transformation, a detailed description thereof will be omitted. Referring to the transformed image 824, even when the ROI 822 is transformed to be flattened, distortion due to the 3D shape of the object 800 and/or distortions 824-1 and 824-2 due to the viewpoint of the camera may remain. (The distortions 824-1 and 824-2 in FIG. 8B exemplarily represent distortions in which characters are bent in curved lines in comparison to a reference straight line.)

According to an embodiment of the disclosure, the 3D information may be composed of 3D parameter values tuned to represent the object 800. For example, the 3D information may include the radius of the object 800, the rotation coordinates of the object 800 on the 3D space, the translation coordinates of the object 800 on the 3D space, the angle at which the ROI 812 is positioned on the surface of the object 800 (i.e., the angle from the central axis of the cylinder shape, which is the 3D shape of the object 800, to both ends of the ROI 812), and a focal length of the camera when the electronic device 2000 captures the object image 820. The electronic device 2000 according to an embodiment of the disclosure may obtain the distortion-free image 826 from which the distortion due to the 3D shape of the object 800 and the distortion due to the photographing viewpoint of the camera of the electronic device 2000, by precisely performing perspective transformation by using the 3D information.

FIG. 8C is a view for explaining a third example in which an electronic device according to an embodiment of the disclosure obtains a distortion-free image by obtaining 3D information.

Referring to FIG. 8C, the electronic device 2000 according to an embodiment of the disclosure may identify an ROI 832 from an object image 830 obtained by photographing the object 800 at a third viewpoint, and may obtain a distortion-free image 836 (for example, a flat label image).

According to an embodiment of the disclosure, the third viewpoint may be a direction in which the camera of the electronic device 2000 is tilted in a vertically downward direction to view the object 800. In this case, not only distortion due to the 3D shape of the object 800 but also distortion due to the viewpoint of the camera of the electronic device 2000 may exist in the ROI 832 included in an image of the object 800.

For example, a transformed image 834 is an image created by performing perspective transformation on the ROI 832 to achieve flattening. Referring to the transformed image 834, even when the ROI 832 is transformed to be flattened, distortion due to the 3D shape of the object 800 and/or distortions 834-1 and 834-2 due to the viewpoint of the camera may remain. (The distortions 834-1 and 834-2 in FIG. 8C exemplarily represent distortions in which characters are bent in curved lines in comparison to a reference straight line.)

By using the 3D information of the object 800, the electronic device 2000 may obtain the distortion-free image 836 from which the distortion has been precisely removed. This has already been described above with reference to FIG. 8B, and thus redundant descriptions thereof will be omitted.

According to an embodiment of the disclosure, a 3D parameter included in the 3D information may include the rotation coordinates of the object 800 on the 3D space, the translation coordinates of the object 800 on the 3D space, and the like. Accordingly, when creating the distortion-free image 836, the electronic device 2000 may translate and rotate the ROI 832 and perform perspective transformation.

According to an embodiment of the disclosure, the 3D parameter included in the 3D information may include a focal length of the camera when the electronic device 2000 captures the object image 830. Accordingly, when creating the distortion-free image 836, the electronic device 2000 may pre-process an image including the ROI 832, based on the focal length, and may perform perspective transformation.

In other words, when creating the distortion-free image 836, the electronic device 2000 removes distortion due to the 3D shape of the object 800 and/or distortion due to the viewpoint of the camera by using the 3D information. Accordingly, the electronic device 2000 may perform robust distortion removal regardless of the degree of distortion of the ROI 832 within the image.

Figure 9A:
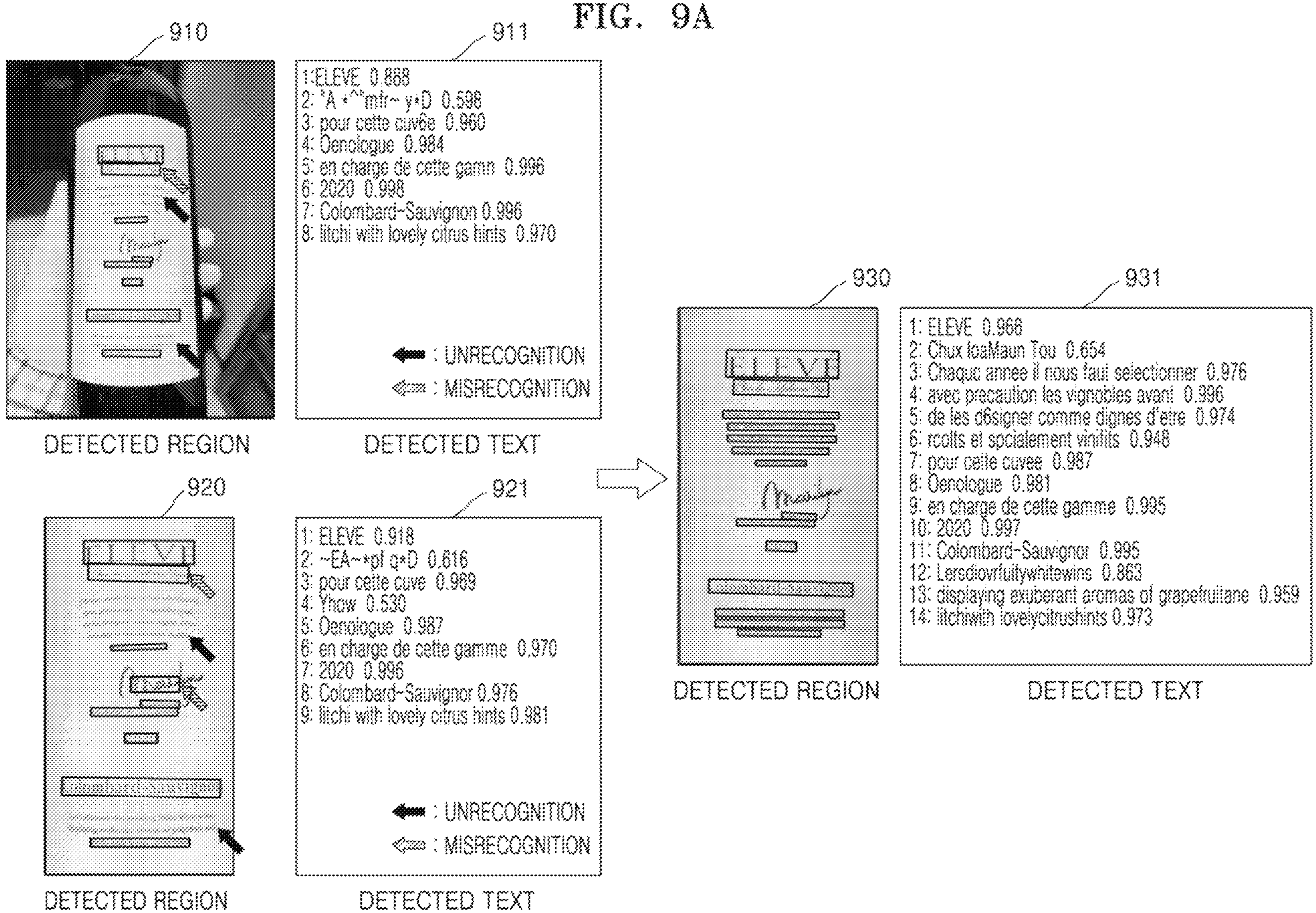
FIG. 9A illustrates a first example in which an electronic device according to an embodiment of the disclosure extracts information from a distortion-free image.

FIG. 9A is a view for explaining a first example in which an electronic device according to an embodiment of the disclosure extracts information from a distortion-free image.

Referring to FIG. 9A, an original image 910, a cropped image 920, and a distortion-free image 930 are illustrated.

According to an embodiment of the disclosure, the electronic device 2000 may extract information existing in an image by using an information detection model. When obtaining the distortion-free image 930, the electronic device 2000 may detect information within an ROI by using a general information detection model. In other words, even when the electronic device 2000 does not separately train a detection model by reflecting distortion in the image to extract information from a distorted image, the electronic device 2000 may create the distortion-free image 930 and apply a general detection model to the distortion-free image 930. Accordingly, the electronic device 2000 may save computing resources for separately training/updating an information detection model.

For example, the electronic device 2000 may detect texts existing within the image by using an OCR model. Extracting text from an image by using an OCR model by the electronic device 2000 will now be described as an example.

According to an embodiment of the disclosure, the original image 910 is a raw image obtained by the electronic device 2000 by using a camera. The original image 910 may include distortion of the ROI due to the 3D shape of the object, and may further include blank spaces other than the ROI in the image. In other words, noise pixels outside the ROI may be included. When the electronic device 2000 applies OCR to the original image 910, at least some of the texts in the ROI may be unrecognized or misrecognized due to the features of the original image 910 described above. For example, in the original image 910, a detection area of text is outlined by a square box, and detection text being misrecognized within the detection area among areas where text is detected is indicated by a hatched arrow (in case of misrecognition).

In addition, text that is present but not identified as a detection area is indicated by a black arrow (in case of unrecognition). For example, when the number of text blocks to be detected in the ROI is 14, 8 text blocks may be detected as a result of applying OCR to the original image 910 (i.e., referring to text 911 detected from the original image 910), and at least some of the 8 text blocks may provide an inaccurate text detection result.

In order to help a clearer understanding, the unrecognition case and the misrecognition case exemplarily described in the disclosure will be further described with reference to the text 911 detected from the original image 910, and an exemplary result of extracting information from the cropped image 920 and the distortion-free image 930 will be described.

According to an embodiment of the disclosure, the OCR model may detect text in an image, recognize the detected text, and output a result of the recognition, based on the fact that a confidence is equal to or greater than a threshold value (e.g., 0.5).

In the examples of the disclosure, the unrecognition case may mean that text detection and recognition results are not output from an image even through text detection and recognition are performed on the image. For example, the unrecognition case may include a case 1) where text is not detected, and a case 2) where, because text is detected and text recognition has been performed but the confidence of a result of the recognition is less than the threshold value (e.g., 0.5), the recognition result is not output.

In the examples of the disclosure, a recognition case may include a case where, because text is detected, text recognition has been performed, and the confidence of a result of the recognition is equal to or greater than the threshold value (e.g., 0.5), the recognition result is output. The recognition case may be classified into a well-recognition case and a misrecognition case. In the examples of the disclosure, the well-recognition case and the misrecognition case may be used as relative concepts.

For example, the misrecognition case may refer to a case in which the confidence of the recognition result is low (for example, the confidence is greater than or equal to 0.5 and less than 0.8), and the well recognition case may refer to a case in which the confidence of the recognition result is relatively higher than the misrecognition case (for example, the confidence is 0.8 or more). Accordingly, text recognition results corresponding to the misrecognition case may not be accurate recognition results of actual text although the recognition results are output. For example, because '2: "A*^"mfr~y*D', which represents second recognition text among recognition results of the text 911 detected from the original image 910, has a recognition result confidence of 0.598, the recognition result confidence is a relatively low value and the recognition result is also inaccurate text, and thus '2: "A*^"mfr~y*D' may be referred to as the misrecognition case.

Similarly, because '1: ELEVE', which represents first recognition text among the recognition results of the text 911 detected from the original image 910, has a recognition result confidence of 0.888, the recognition result confidence is a relatively high value and the recognition result is also accurate text, and thus '1: ELEVE' may be referred to as the well-recognition case.

Even when the confidence of a result of the text detection/recognition by the OCR model is high, the result of the text detection/recognition may not be accurate due to distortion of the image itself. For example, '3: pour cette cuv6e', which represents third recognition text among the recognition results of the text 911 detected from the original image 910, has a recognition result confidence of 0.960, but actual accurate text is 'pour cette cuvee'. This is caused due to distortion of a curved surface existing on the original image 910 itself, and may be due to the use of a general OCR model rather than separately learning features related to distortion. Because the electronic device 2000 according to an embodiment of the disclosure creates the distortion-free image 930 and performs OCR on the distortion-free image 930, accurate text may be detected even when a general OCR model is used.

An example of detecting text by using a general OCR model, with respect to the cropped image 920 and the distortion-free image 930, which are images having different features, will now be further described. The above description related to non-recognition/misrecognition may be equally applied to text 921 detected from the cropped image 920 and text 931 detected from the distortion-free image 930, which will be described later.

The above description related to non-recognition/misrecognition may also be equally applied to text 913 detected from an original image 912, text 923 detected from a cropped image 922, and text 933 detected from a distortion-free image 932, which will be described later with reference to FIG. 9B.

According to an embodiment of the disclosure, the cropped image 920 is an image obtained by detecting an ROI from the original image 910 and cropping out only the ROI. The cropped image 920 may include distortion of the ROI due to the 3D shape of the object. When the electronic device 2000 applies OCR to the cropped image 920, at least some of the texts in the ROI may be unrecognized or misrecognized due to the features of the cropped image 920 described above. For example, when the number of text blocks to be detected in the ROI is 14, 9 text blocks may be detected as a result of applying OCR to the cropped image 920 (i.e., referring to text 921 detected from the cropped image 920), and at least some of the 9 text blocks may provide an inaccurate text detection result.

According to an embodiment of the disclosure, the distortion-free image 930 is obtained by the electronic device 2000 identifying the 3D shape of the object, identifying the ROI, obtaining 3D parameter values representing the 3D information of the object, and performing perspective transformation based on the 3D parameter values, according to the above-described embodiments. Because the distortion-free image 930 is a precisely 2D perspective-transformed image obtained based on the 3D information, the electronic device 2000 may obtain a more accurate text detection result. When the electronic device 2000 applies OCR to the distortion-free image 930, texts within the ROI may be accurately detected. For example, when the number of text blocks to be detected in the ROI is 14, 14 text blocks may be detected as a result of applying OCR to the distortion-free image 930 (i.e., referring to text 931 detected from the distortion-free image 930), and an accurate text detection result may be obtained.

The above-described number of text blocks to be detected, the unrecognized text blocks, and the misrecognized text blocks are only examples, and are not intended to determine a text recognition result. In other words, it should be understood that these are intended to explain that a result of detecting text with respect to the distortion-free image 930 is relatively more accurate than results of detecting text with respect to the original image 910 and the cropped image 920.

Figure 9B:
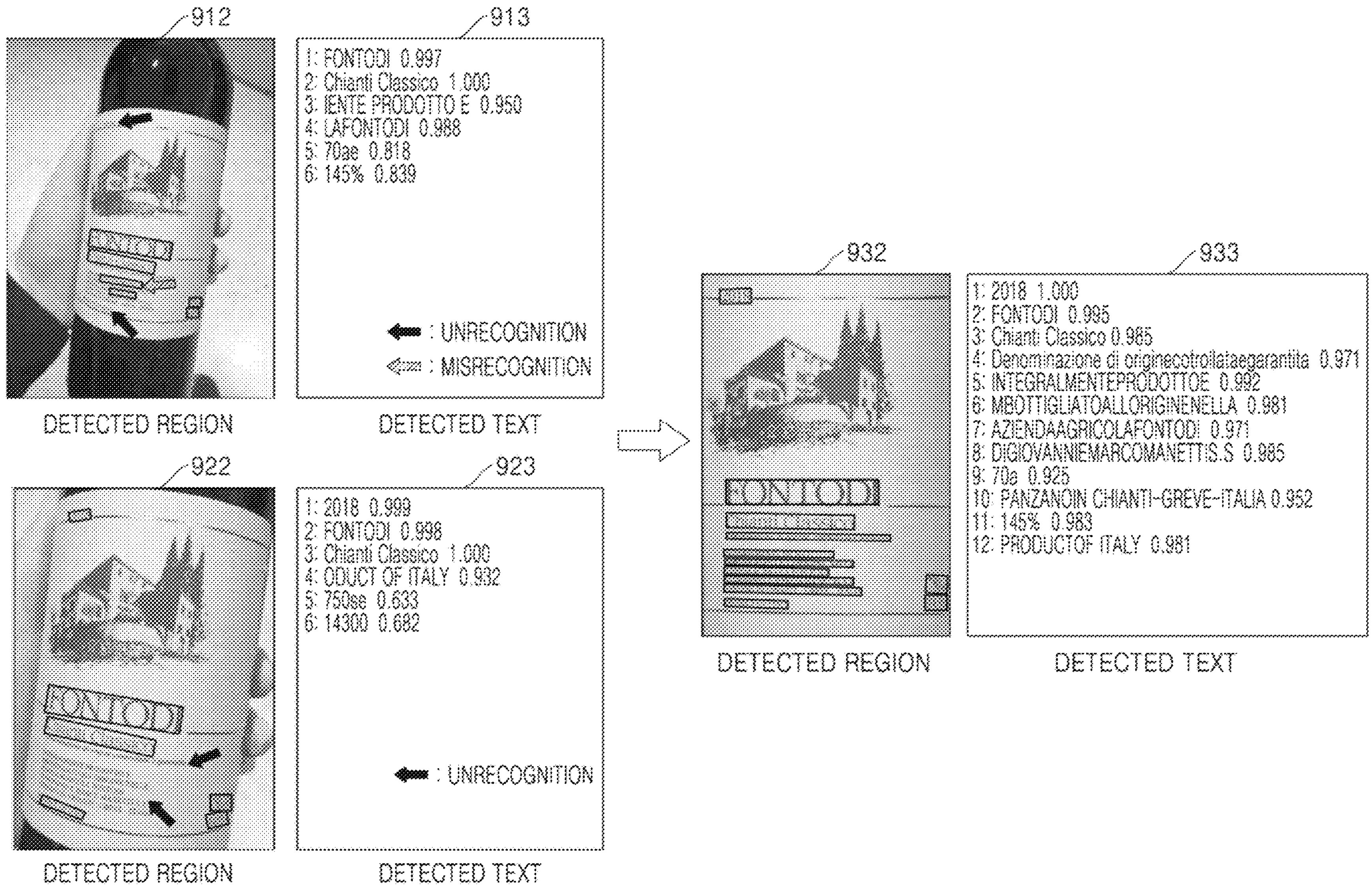
FIG. 9B illustrates a second example in which an electronic device according to an embodiment of the disclosure extracts information from a distortion-free image.

FIG. 9B is a view for explaining a second example in which an electronic device according to an embodiment of the disclosure extracts information from a distortion-free image.

Referring to FIG. 9B, the original image 912, the cropped image 922, and the distortion-free image 932 are illustrated.

According to an embodiment of the disclosure, the original image 912 and the cropped image 922 may have distortion due to a viewpoint (distance, angle, etc.) at which the electronic device 2000 has photographed the object, in addition to distortion due to the 3D shape of the object.

The electronic device 2000 may obtain the distortion-free image 930 by identifying the 3D shape of the object, identifying the ROI, obtaining 3D parameter values representing the 3D information of the object, and performing perspective transformation based on the 3D parameter values. Because the 3D parameter may include rotation coordinates of the object on a 3D space, translation coordinates of the object on the 3D space, and a focal length of a camera, the electronic device 2000 may translate and/or rotate the ROI and may perform perspective transformation.

In detail, in the original image 912, when the object is not located at the center of an image obtained by photographing the 3D space, the electronic device 2000 may move the object, based on translation information of the object on a space included in the 3D parameter. In detail, in the original image 912, when the object is rotated within the image obtained by photographing the 3D space, the electronic device 2000 may rotate the object to be horizontally/vertically arranged, based on rotation information of the object on the space included in the 3D parameter. The electronic device 2000 may supplement the degree of translation/rotation of the object by using the focal length of the camera that has captured the original image 912. According to an embodiment of the disclosure, translation/rotation of the object may be included in an operation of obtaining 3D parameter values representing the 3D information of the object in the above-described embodiments. In other words, as the electronic device 2000 performs a fine-adjustment operation for obtaining the 3D parameter values representing the 3D information of the object, translation information, rotation information, and focal distance information may be utilized.

Accordingly, as shown in FIG. 9B, even when the object in the original image 912 is photographed obliquely, the distortion-free image 932 may be obtained with the ROI arranged horizontally/vertically.

According to an embodiment of the disclosure, a result of detecting text with respect to the distortion-free image 932 is relatively more accurate than results of detecting text with respect to the original image 912 and the cropped image 922. In other words, referring to the text 913 detected from the original image 912, the text 933 detected from the cropped image 922, and the text 933 detected from the distortion-free image 932, it may be seen that the text 933 detected from the distortion-free image 932 is identified most accurately.

The unrecognized text blocks and the misrecognized text blocks are only examples for convenience of description, and are not intended to determine a text recognition result. In other words, it should be understood that these are intended to explain that a result of detecting text with respect to the distortion-free image 930 is relatively more accurate than results of detecting text with respect to the original image 910 and the cropped image 920.

Figure 10A:
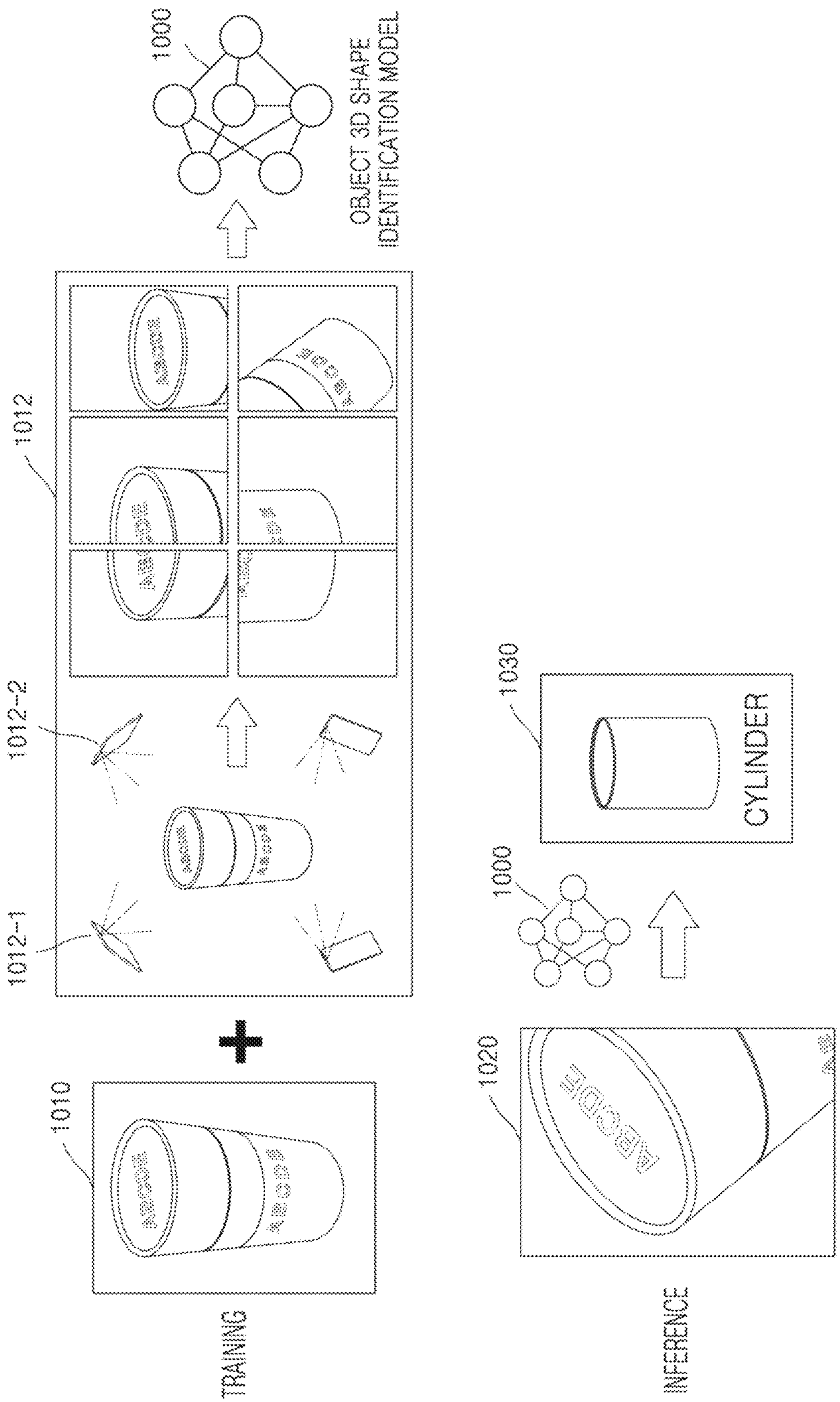
FIG. 10A illustrates an operation of training an object 3D shape identification model, which is performed by an electronic device according to an embodiment of the disclosure.

FIG. 10A is a diagram for explaining an operation, performed by an electronic device according to an embodiment of the disclosure, of training an object 3D shape identification model.

According to some embodiments of the disclosure, the electronic device 2000 may train an object 3D shape identification model 1000. The electronic device 2000 may train the object 3D shape identification model 1000 by using a training dataset composed of various images including 3D objects. The training dataset may include training image(s) 1010 including the entire 3D shape of an object.

According to an embodiment of the disclosure, the electronic device 2000 may use training images 1012 including a portion of the 3D shape of the object in order to improve the inference performance of the object 3D shape identification model 1000. The training images 1012 including a portion of the 3D shape of the object may be obtained by photographing the entirety or a portion of the object at various angles and distances. For example, an image obtained by photographing the entirety or a portion of the object in a first direction 1012-1 may be obtained, and an image obtained by photographing the entirety or portion of the object in a second direction 1012-2 may be obtained. As in the aforementioned example, images obtained by photographing the entirety or a portion of the object in all directions in which the object may be photographed may be included in the training images 1012 and used as training data.

According to some embodiments of the disclosure, the training images 1012 including a portion of the 3D shape of the object may have already been included in the training dataset. According to some embodiments of the disclosure, the electronic device 2000 may receive the training images 1012 including a part of the 3D shape of the object from an external device (e.g., a server). According to some embodiments of the disclosure, the electronic device 2000 may obtain the training images 1012 including a portion of the 3D shape of the object by using the camera. For example, the electronic device 2000 may provide an interface for guiding a user to photograph a portion of the object.

The electronic device 2000 according to an embodiment of the disclosure may infer the 3D shape of the object by using an object 3D shape identification model trained using the training image(s) 1010 including the entire 3D shape of the object and the training images 1012 including a portion of the 3D shape of the object. For example, even when only an input image 1020 obtained by photographing only a portion of the object is input, the electronic device 2000 may infer that the 3D shape type of an object in the input image 1020 is a cylinder 1030.

Figure 10B:
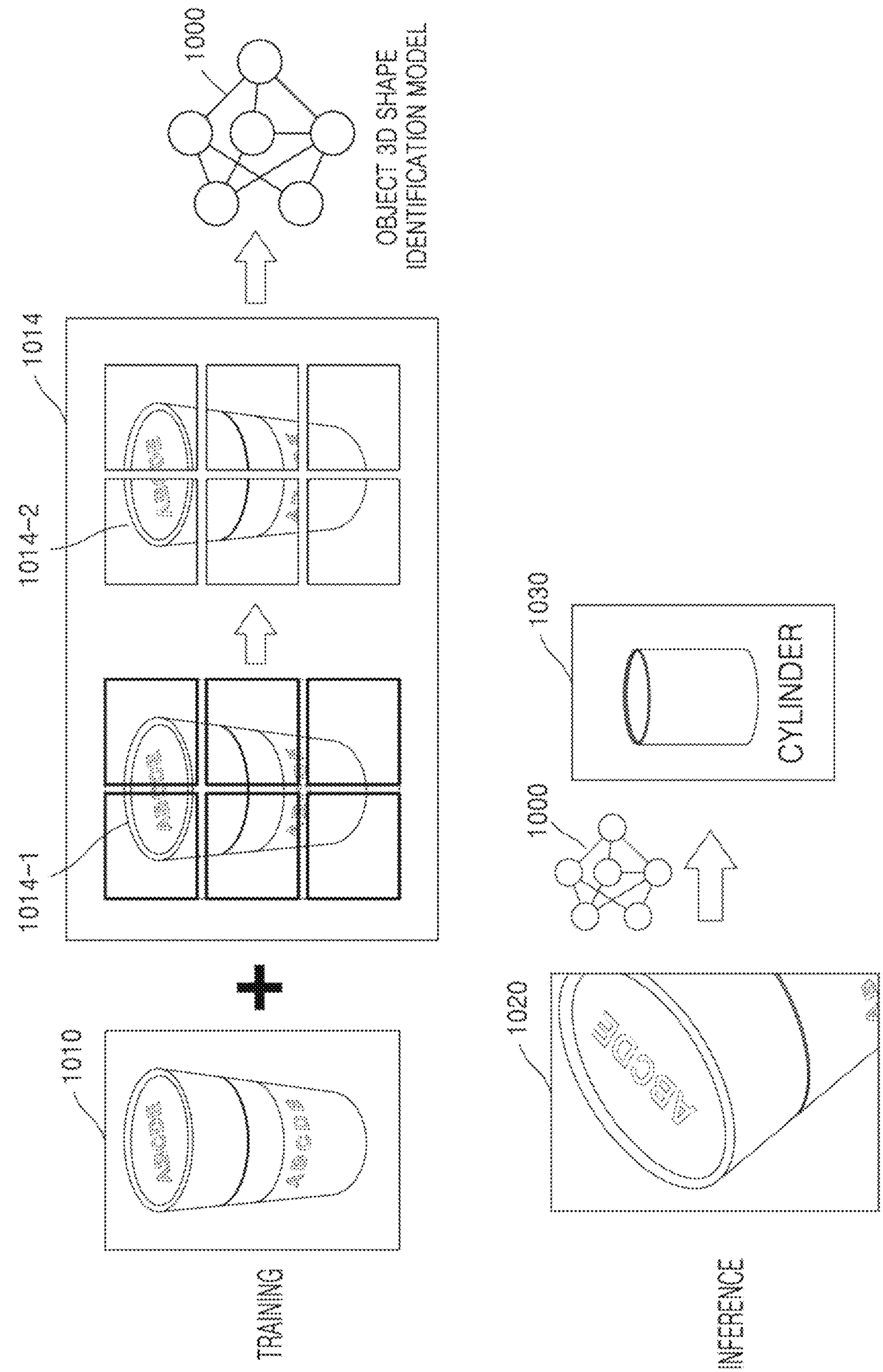
FIG. 10B illustrates another operation of training an object 3D shape identification model, which is performed by an electronic device according to an embodiment of the disclosure.

FIG. 10B is a diagram for explaining another operation, performed by an electronic device according to an embodiment of the disclosure, of training an object 3D shape identification model.

Referring to FIG. 10B, the electronic device 2000 may create training data for training the object 3D shape identification model 1000.

According to an embodiment of the disclosure, the training dataset may include the training image(s) 1010 including the entire 3D shape of the object. The electronic device 2000 may create the pieces of training data by performing a certain data augmentation operation on images included in the training dataset.

For example, the electronic device 2000 may create training images 1014 including a portion of the 3D shape of the object in order to crop the training image(s) 1010 including the entire 3D shape of the object. For example, the electronic device 2000 may split the training image(s) 1010 into six parts to augment data such that one piece of training data becomes six pieces of training data. For example, when a first area 1014-1 of the training image(s) 1010 is determined as a split area, a cropped first image 1014-2 may be used as training data. In FIG. 10B, various other data augmentation methods such as rotation and flip may be applied.

The electronic device 2000 according to an embodiment of the disclosure may infer the 3D shape of the object by using an object 3D shape identification model trained using the training image(s) 1010 including the entire 3D shape of the object and the training images 1014 including a portion of the 3D shape of the object. For example, even when only the input image 1020 obtained by photographing only a portion of the object is input, the electronic device 2000 may infer that the 3D shape type of the object in the input image 1020 is the cylinder 1030.

The electronic device 2000 may perform a certain data augmentation task also on the aforementioned pieces of training data and train the object 3D shape identification model 1000 by using augmented data, thereby improving the inference performance of the object 3D shape identification model 1000. For example, the electronic device 2000 may apply various data augmentation methods, such as cropping, rotation, and flip, with respect to the training image(s) 1010 including the entire 3D shape of the object and the training images 1012 and 1014 including a portion of the 3D shape of the object, and may include augmented data in a training dataset.

Figure 10C:
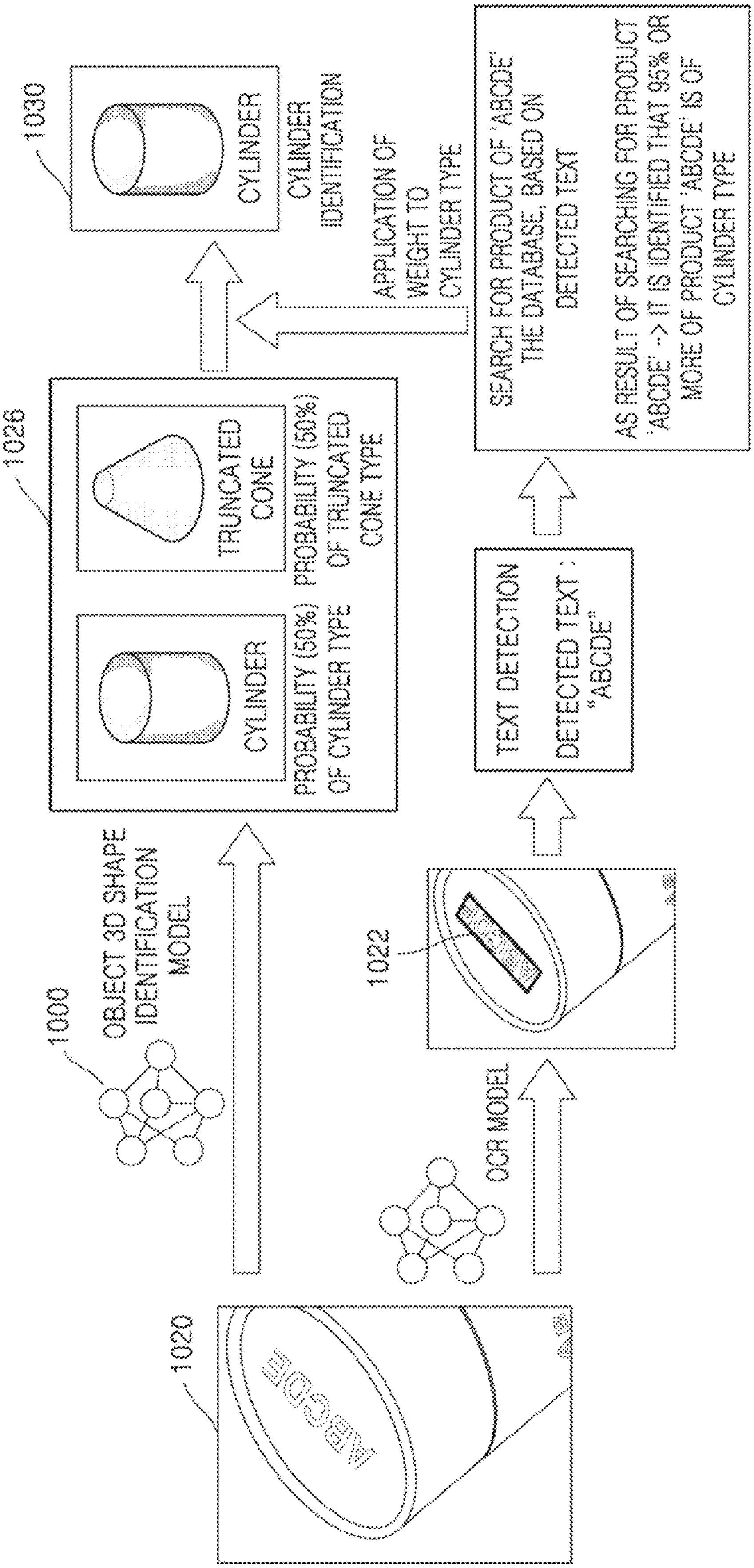
FIG. 10C illustrates an embodiment in which an electronic device according to an embodiment of the disclosure identifies a 3D shape of an object.

FIG. 10C is a diagram for explaining an embodiment in which an electronic device according to an embodiment of the disclosure identifies a 3D shape of an object.

According to an embodiment of the disclosure, the electronic device 2000 may input the input image 1020 obtained by photographing only a portion of the object (hereinafter, referred to as an input image) to the object 3D shape identification model 1000, and may obtain an object 3D shape inference result 1026. In this case, because the input image 1020 does not include the entire shape of the object, supplementation of the object 3D shape inference result 1026 may be needed. For example, the object 3D shape inference result 1026 may be a probability (50%) of being a cylinder type and a probability (50%) of being a truncated cone type. And, a threshold value for the object 3D shape identification model 1000 to determine an object 3D shape may be a probability value: 80% or more. In this case, because neither the probability (50%) of being a cylinder type nor the probability (50%) of being a cone type do not exceed the threshold value (80%) for determining an object 3D shape, the electronic device 2000 may supplement the object 3D shape inference result 1026.

According to an embodiment of the disclosure, the electronic device 2000 may perform an information detection operation for supplementing the object 3D shape inference result 1026, based on the fact that a value of the object 3D shape inference result 1026 is less than a preset threshold value. The information detection operation may be, for example, detection of a logo, icon, text, etc., but embodiments of the disclosure are not limited thereto.

For example, the electronic device 2000 may perform OCR on the input image 1020 to detect text in the input image 1020. In this case, the detected text may be 'ABCDE', which is a product name. The electronic device 2000 may search for a product from a database or through an external server, based on the detected text. For example, the electronic device 2000 may search for a product of 'ABCDE' from the database. The electronic device 2000 may determine the weight of the 3D shape type, based on a result of the product search. For example, as a result of searching for the product 'ABCDE', it may be identified that 95% or more of the product 'ABCDE' on the market is of a cylinder type. In this case, the electronic device 2000 may determine that a weight is to be applied to the cylinder type. The electronic device 2000 may apply the determined weight to the object 3D shape inference result 1026. As a result of applying the weight, it may be determined that a finally determined 3D shape type of the object is the cylinder 1030.

According to an embodiment of the disclosure, the electronic device 2000 may perform an information detection operation in parallel with inputting the input image 1020 to the object 3D shape identification model 1000. For example, the electronic device 2000 may perform OCR on the input image 1020. The electronic device 2000 may determine the weight that is to be applied to the object 3D shape inference result 1026, based on a result of OCR performed in parallel.

Figure 10D:
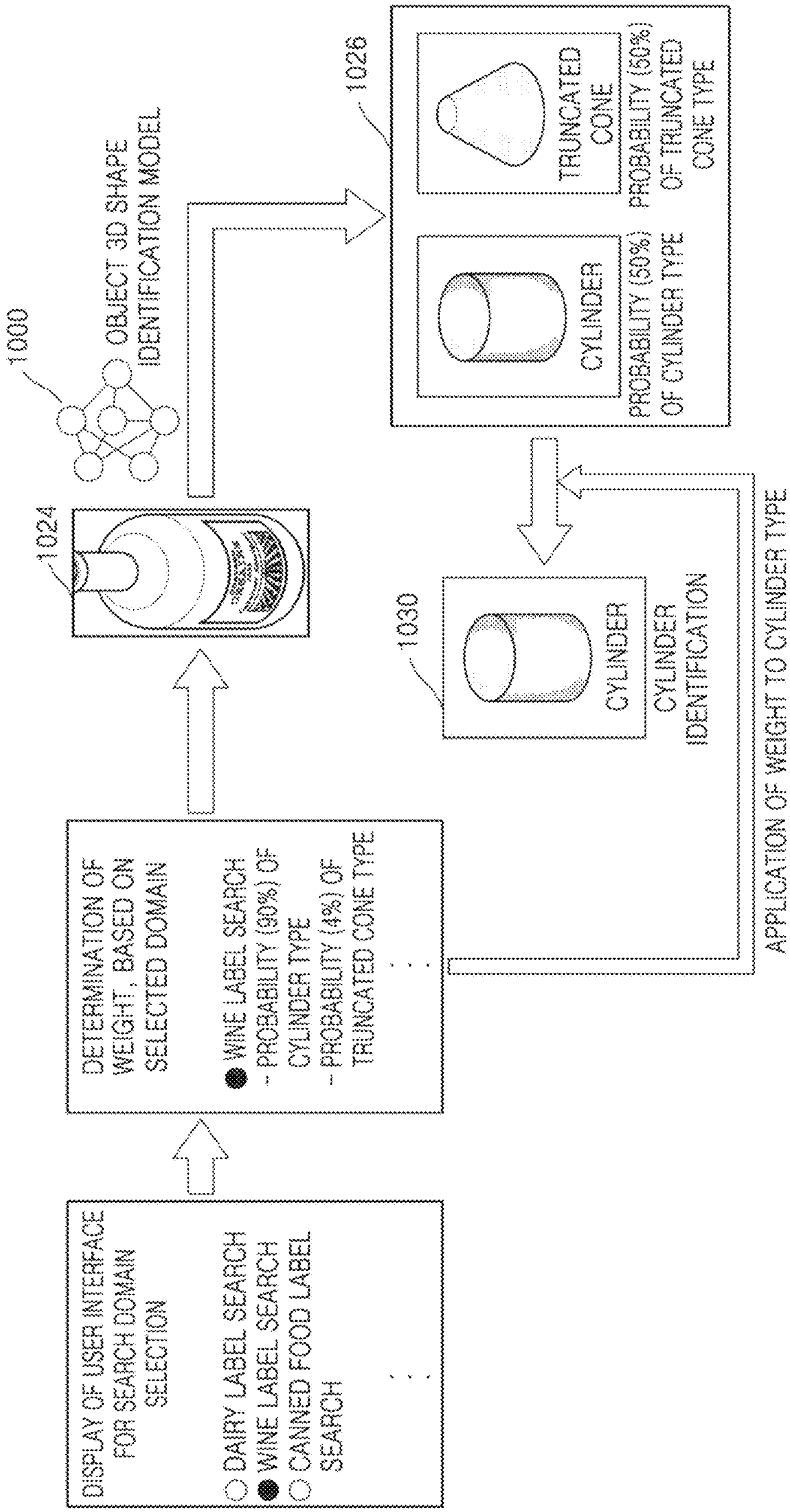
FIG. 10D illustrates an embodiment in which an electronic device according to an embodiment of the disclosure identifies a 3D shape of an object.

FIG. 10D is a diagram for explaining an embodiment in which an electronic device according to an embodiment of the disclosure identifies a 3D shape of an object.

According to an embodiment of the disclosure, the electronic device 2000 may input an input image 1024 to the object 3D shape identification model 1000, and may obtain the object 3D shape inference result 1026.

The electronic device 2000 may display a user interface for selecting an object search domain, before applying the input image 1024 to the object 3D shape identification model 1000. For example, the electronic device 2000 may display selectable domains, such as dairy, wine, and canned food, and may receive a user input for selecting a domain.

The electronic device 2000 may determine the weight of the 3D shape type, based on a user input for selecting a search domain. For example, when a user selects a wine label search, it may be identified that 95% or more of a wine product on the market is of a cylinder type. In this case, the electronic device 2000 may determine that a weight is to be applied to the cylinder type. The electronic device 2000 may apply the determined weight to the object 3D shape inference result 1026. As a result of applying the weight, it may be determined that a finally determined 3D shape type of the object is the cylinder 1030.

Figure 11:
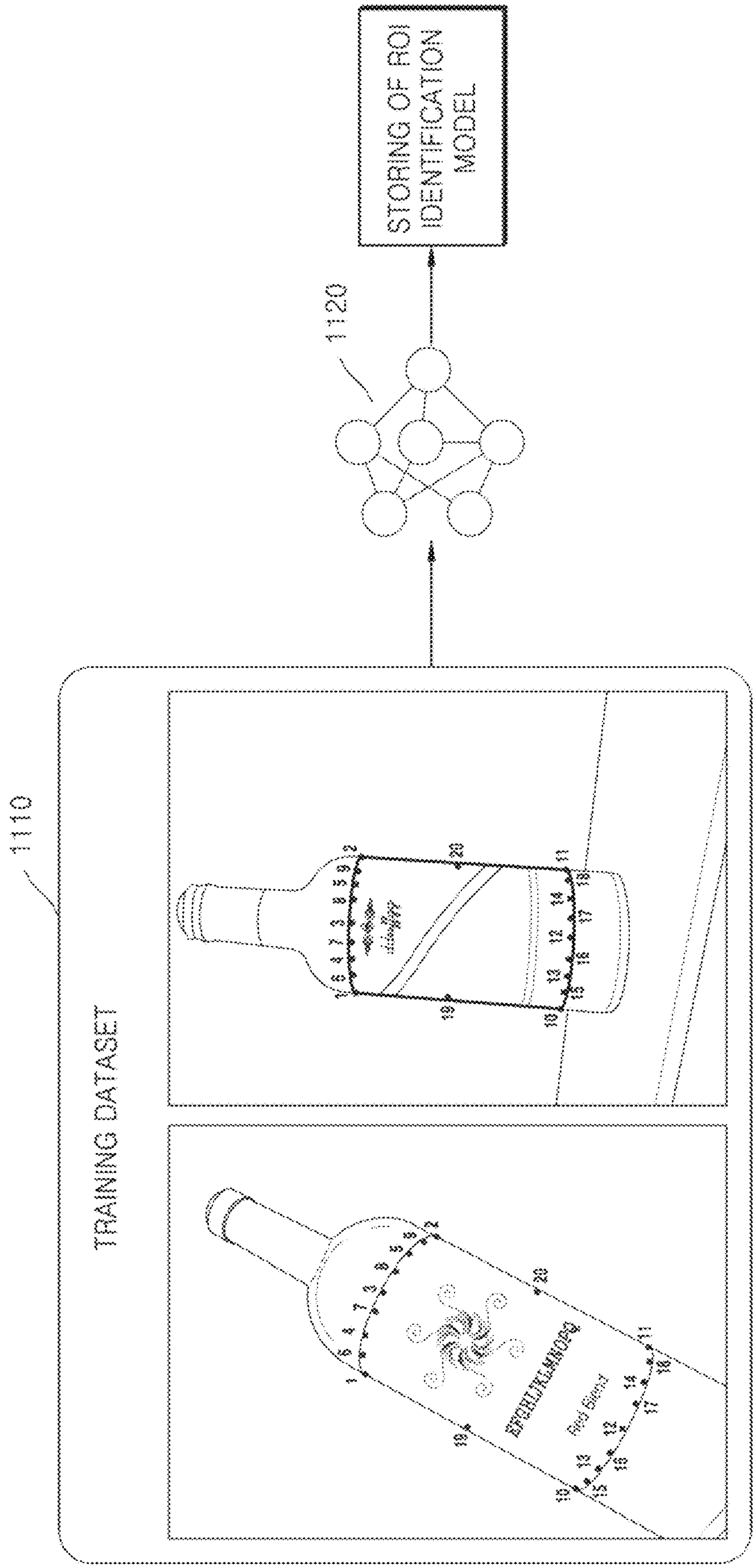
FIG. 11 illustrates an operation of training an ROI identification model, which is performed by an electronic device according to an embodiment of the disclosure.

FIG. 11 is a diagram for explaining an operation, performed by an electronic device according to an embodiment of the disclosure, of training an ROI identification model.

According to an embodiment of the disclosure, the electronic device 2000 may train an ROI identification model 1120. The electronic device 2000 may train the ROI identification model 1120, based on a training dataset 1110 composed of various images including ROIs. Keypoints representing the ROI may be labeled on ROI images of the training dataset 1110. The ROI identified by the electronic device 2000 by using the ROI identification model 1120 may include, but is not limited to, an image on which the detected ROI is displayed, keypoints representing the ROI, and/or the coordinates of the keypoints in the image.

According to an embodiment of the disclosure, the electronic device 2000 may store the trained ROI identification model 1120. The electronic device 2000 may execute the trained ROI identification model 1120, when the electronic device 2000 performs operations of removing distortion in the image according to the above-described embodiments. According to an embodiment of the disclosure, the electronic device 2000 may upload the trained ROI identification model 1120 in an external server.

Figure 12:
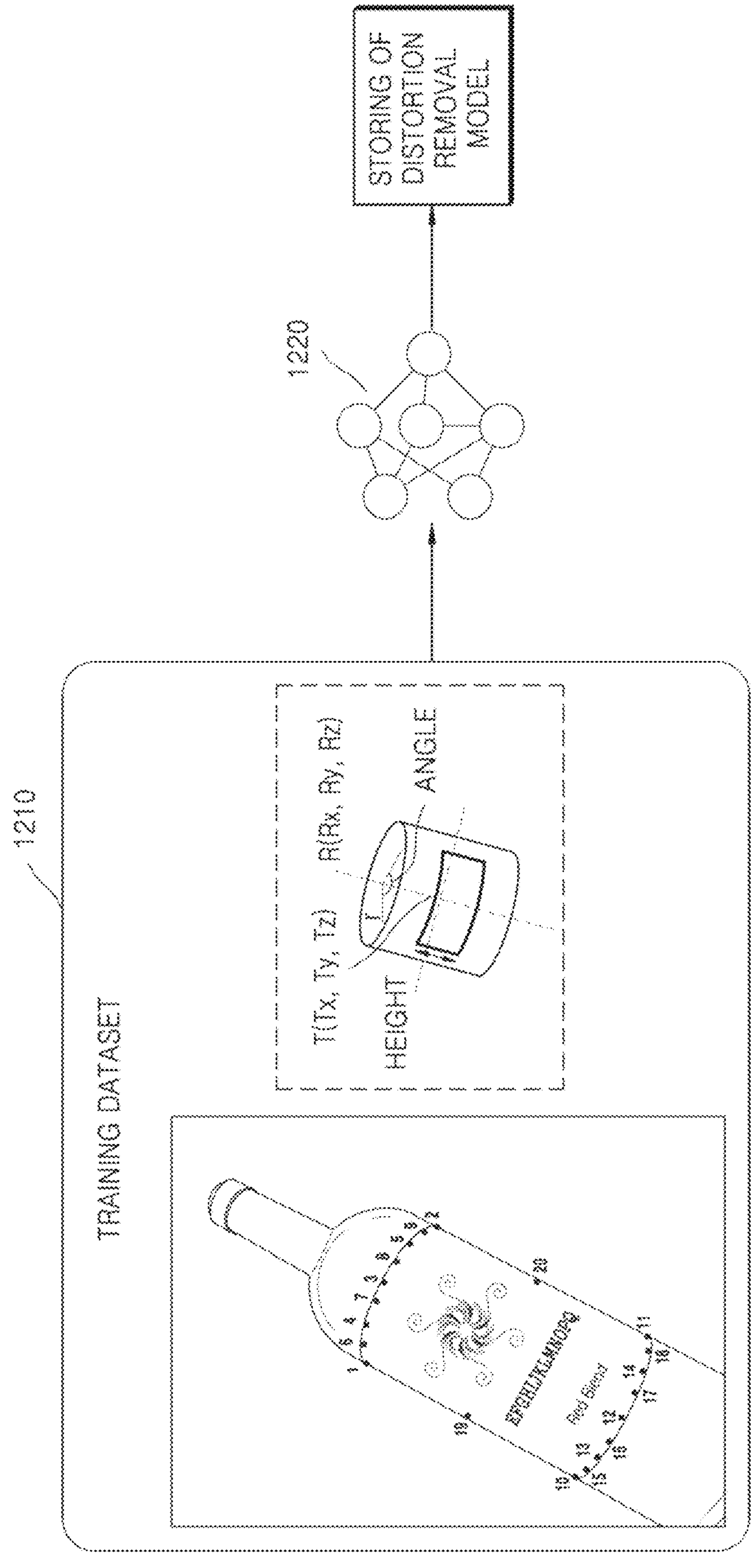
FIG. 12 illustrates an operation of training a distortion removal model, which is performed by an electronic device according to an embodiment of the disclosure.

FIG. 12 is a diagram for explaining an operation, performed by an electronic device according to an embodiment of the disclosure, of training a distortion removal model.

According to an embodiment of the disclosure, the electronic device 2000 may train a distortion removal model 1220. A training dataset 1210 for training the distortion removal model 1220 may include ROI data and 3D parameter data. The ROI data may include, for example, an image including the ROI and keypoints representing the ROI, but embodiments of the disclosure are not limited thereto. The 3D parameter data may include, for example, width, length, height, and radius information of the object, translation and rotation information for 3D geometric transformation on the 3D space of the object 100, and focal length information of the camera of the electronic device 2000 that has photographed the object, but embodiments of the disclosure are not limited thereto.

According to an embodiment of the disclosure, the distortion removal model 1210 may receive the ROI data and the 3D parameter data, and may output a distortion-free image. Therefore, the distortion removal model 1220 may use a neural network to learn, for an object having a specific 3D shape, which portion of the object is an ROI and what values 3D information of the object is.

According to an embodiment of the disclosure, the electronic device 2000 may store the trained distortion removal model 1220. The electronic device 2000 may execute the trained distortion removal model 1220, when the electronic device 2000 performs operations of removing distortion in the image according to the above-described embodiments. According to an embodiment of the disclosure, the electronic device 2000 may upload the trained distortion removal model 1220 in an external server.

Figure 13:
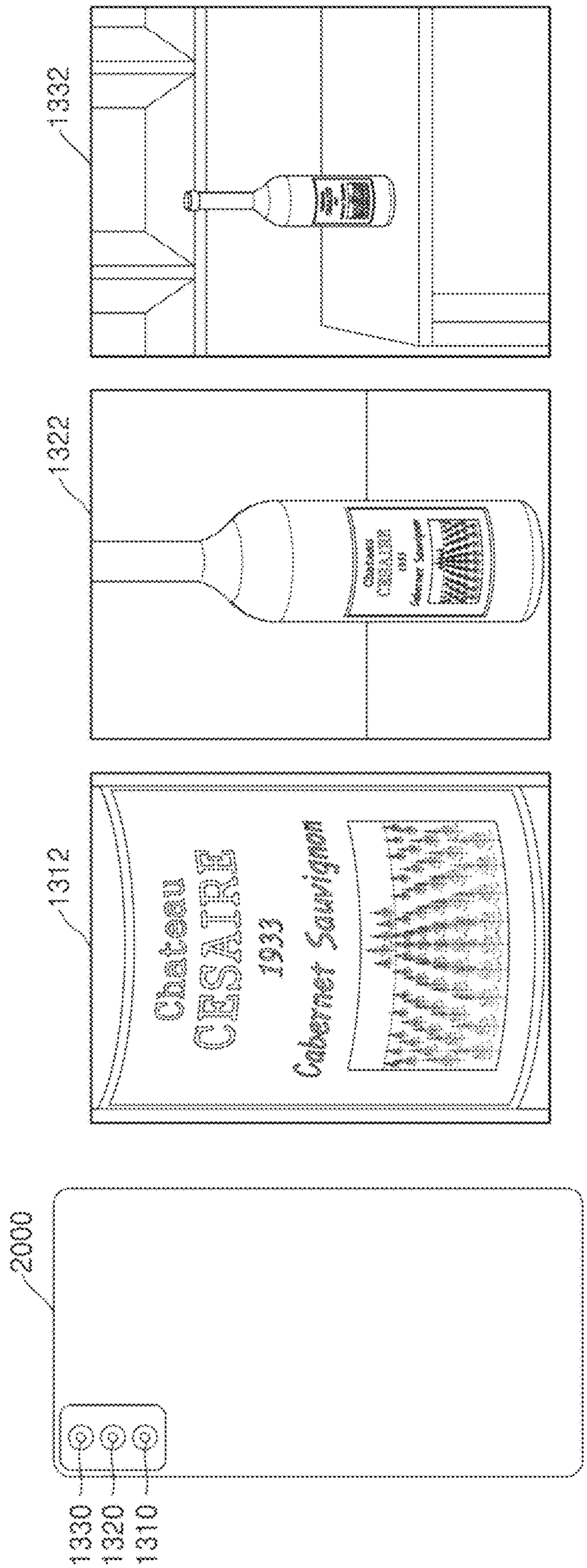
FIG. 13 illustrates multiple cameras included in an electronic device according to an embodiment of the disclosure.

FIG. 13 is a diagram for explaining multiple cameras in an electronic device according to an embodiment of the disclosure.

According to an embodiment of the disclosure, the electronic device 2000 may include multiple cameras. For example, the electronic device 2000 may include a first camera 1310, a second camera 1320, and a third camera 1330. In one embodiment, the multiple cameras refer to two or more cameras.

The respective specifications of the multiple cameras may be different from one another. For example, the first camera 1310 may be a telephoto camera, the second camera 1320 may be a wide-angle camera, and the third camera 1330 may be an ultra-wide-angle camera. However, the types of cameras are not limited thereto, and a standard camera, etc. may be included.

The multiple cameras may obtain images of different characteristics. For example, a first image 1312 obtained by the first camera 1310 may be an image including a portion of an object by enlarging and photographing the object. A second image 1322 obtained by the second camera 1320 may be an image including the entire object by photographing the object at a wider angle of view than the first camera 1310. A third image 1332 obtained by the third camera 1330 may be an image including the entire object and a wide area of a scene by photographing the object at a wider angle of view than the first camera 1310 and the second camera 1320.

According to an embodiment of the disclosure, because images obtained by the multiple cameras included in the electronic device 2000 have different features, results of the electronic device 2000 extracting information from the object in the image according to the above-described operations may also be different from one another according to which cameras are used to obtain images that are to be used. In order to recognize the object included in the image and extract information from the ROI of the object, the electronic device 2000 may determine which camera among the multiple cameras is to be activated.

According to an embodiment of the disclosure, the electronic device 2000 may obtain the first image 1312 by activating the first camera 1310 and photographing the object by using the first camera 1310. The electronic device 2000 may identify the 3D shape type of the object in the image and the ROI of the object by using the first image 1312. According to some embodiments of the disclosure, in the above example, the first image 1312 may be an image obtained using the first camera 1310, which is a telephoto camera.

In this case, because the first image 1312 includes only a portion of the object, the ROI of the object in the first image 1312 may be identified with sufficient confidence (e.g., a predetermined value or greater), but the 3D shape type of the object in the first image 1312 may be identified with insufficient confidence. The electronic device 2000 may activate the second camera 1320 and/or the third camera 1330 to obtain the second image 1322 and/or the third image 1332 both including the entirety of the object, and may identify the 3D shape type of the object by using the second image 1322 and/or the third image 1332. In other words, the electronic device 2000 may selectively use an image suitable for identifying the ROI and the 3D shape type of the object.

According to an embodiment of the disclosure, the electronic device 2000 may obtain the first image 1312 and the second image 1322 by activating the first camera 1310 and the second camera 1320 and photographing the object by using the first camera 1310 and the second camera 1320. The electronic device 2000 may identify the ROI of the object by using the first image 1312 including a portion of the object, and may identify the 3D shape type of the object by using the second image 1322 and/or the third image 1332.

An operation, performed by the electronic device 2000 according to an embodiment of the disclosure, of activating a camera is not limited to the above-described example. The electronic device 2000 may use all possible combinations of the multiple cameras. For example, the electronic device 2000 may activate only the second camera 1320 and the third camera 1330, or may activate all of the first camera 1310, the second camera 1320, and the third camera 1330.

The operations, performed by the electronic device 2000 according to an embodiment of the disclosure, of identifying the ROI of the object, identifying the 3D shape type of the object, and removing distortion of the ROI may use the above-described AI models (e.g., an object 3D object shape identification model, an ROI identification model, and a distortion removal model). Redundant descriptions thereof will be omitted.

Detailed operations, performed by the electronic device 2000, of processing an image by using multiple cameras and removing distortion will be described in more detail in the drawings and their descriptions, which will be described later.

Figure 14A:
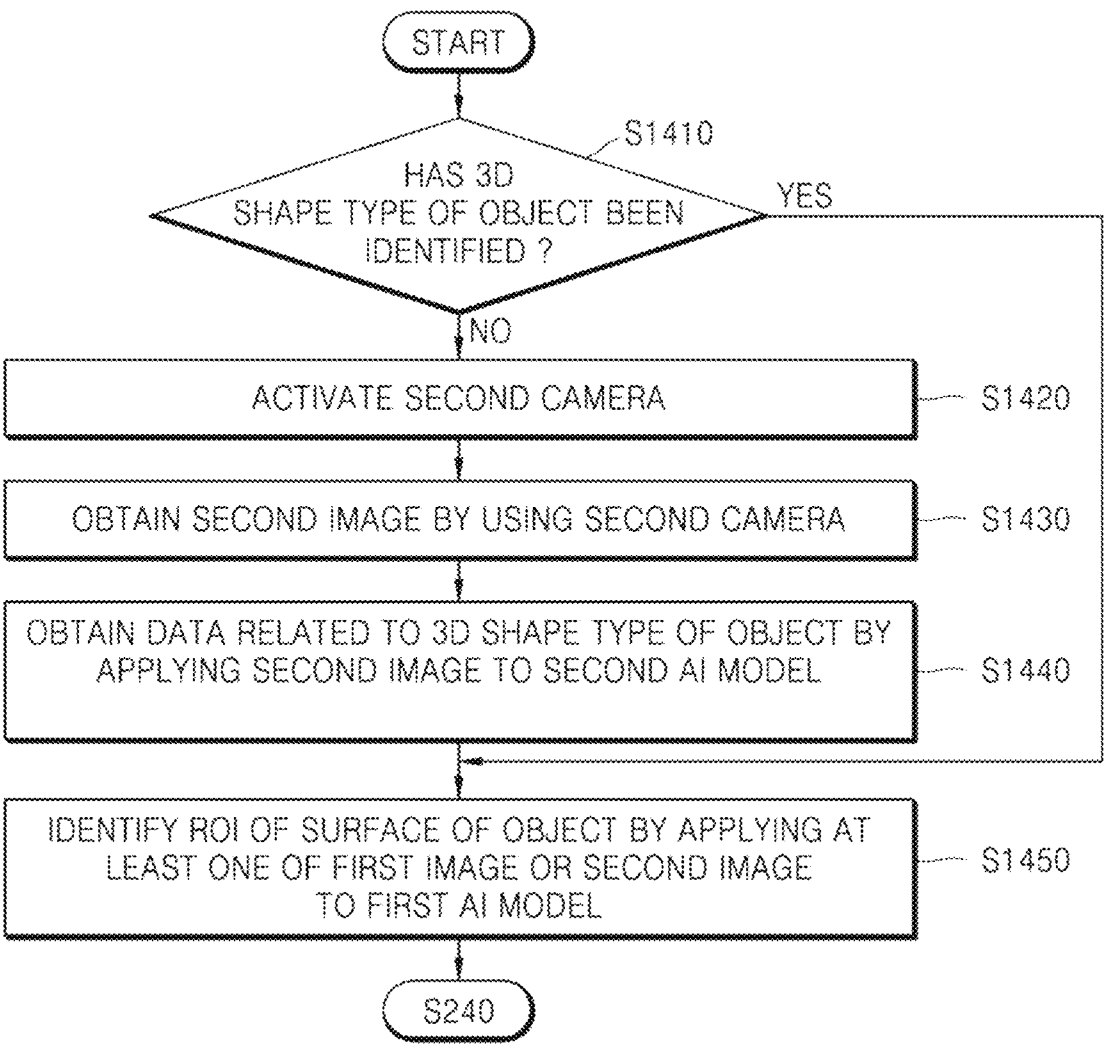
FIG. 14A illustrates an operation of using multiple cameras, which is performed by an electronic device according to an embodiment of the disclosure.

FIG. 14A is a flowchart of an operation, performed by an electronic device according to an embodiment of the disclosure, of using multiple cameras.

As in operation S210 of FIG. 2, the electronic device 2000 according to an embodiment of the disclosure may obtain a first image of an object including at least one surface (e.g., label) by using a first camera. Because the operation, performed by the electronic device 2000, of obtaining the first image of the object has been described above in detail, duplicate descriptions thereof will be omitted. Operation S230 may be performed after operation S210, and may be followed by operation S1410.

In operation S1410, the electronic device 2000 according to an embodiment of the disclosure checks whether the 3D shape type of the object has been identified from the first image of the object obtained using the first camera. For example, when the first image obtained using the first camera includes only a portion of the object, the second AI model may accurately infer the 3D shape type of the object even when the electronic device 2000 inputs the first image to the second AI model. At this time, the second AI model may output a result indicating that the 3D shape type of the object is unable to be inferred or output a low confidence value for inferring the 3D shape type. The electronic device 2000 may determine that the 3D shape type of the object has not been identified from the first image, when a result having a confidence value equal to or less than a threshold is output from the second AI model.

According to an embodiment of the disclosure, the electronic device 2000 may perform operation S1420, when the 3D shape type of the object has not been identified from the first image. Operation S1420 may be selectively or redundantly applied together with the operation, performed by the electronic device 2000, of determining the weight for the 3D shape type and identifying the 3D shape by applying the weight, described above with reference to FIGS. 10C and 10D. When the 3D shape type of the object is identified, the electronic device 2000 may perform operation S1450 to continue a distortion removal operation.

In operation S1420, the electronic device 2000 according to an embodiment of the disclosure activates a second camera. The second camera may have a wider angle of view than the first camera. The second camera may be, for example, a wide-angle camera or an ultra-wide-angle camera, but embodiments of the disclosure are not limited thereto.

In operation S1430, the electronic device 2000 according to an embodiment of the disclosure obtains a second image by using the second camera. Because the second camera has a wider angle of view than the first camera, even when the first image obtained using the first camera includes only the 3D shape of a portion of the object, the second image obtained using the second camera may be included in the entire 3D shape of the object.

In operation S1440, the electronic device 2000 according to an embodiment of the disclosure obtains data related to the 3D shape type of the object by applying the second image to the second AI model. The second image may include the entire 3D shape of the object. Since operation S1440 is the same as operation S230 of FIG. 2, a detailed description thereof will be omitted.

In operation S1450, the electronic device 2000 according to an embodiment of the disclosure identifies the 3D shape of the object by applying at least one of the first image or the second image to the first AI model.

According to an embodiment of the disclosure, even when only the 3D shape of a portion of the object is included in the first image, the ROI may be fully included. The electronic device 2000 may identify a region corresponding to at least one surface (e.g., label) in the first image as an ROI by applying the first image to the first AI model (ROI identification model).

According to an embodiment of the disclosure, because the entire 3D shape of the object is included in the second image, the ROI may also be fully included. The electronic device 2000 may identify a region corresponding to at least one surface (e.g., label) in the second image as an ROI by applying the second image to the first AI model (ROI identification model).

According to an embodiment of the disclosure, the electronic device 2000 may identify the ROI by applying the first and second images to the first AI model (ROI identification model) and selecting or combining ROI identification results respectively obtained from the first and second images. After performing operation S1450, the electronic device 2000 may perform operation S240 of FIG. 2. In this case, operations/data related to the first camera in operations S240 through S270 of FIG. 2 may also be equally applied to the second camera.

Figure 14B:
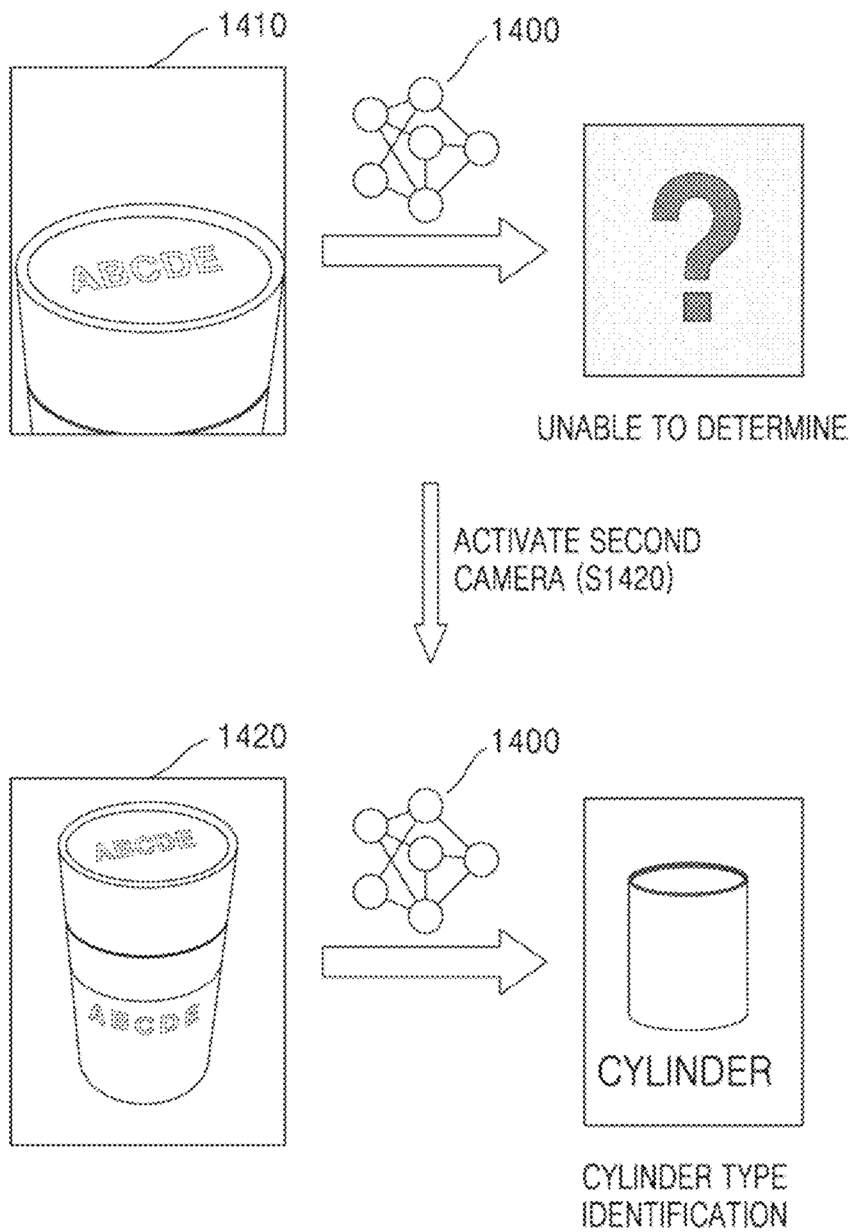
FIG. 14B is a diagram for further explanation supplementary to the flowchart of FIG. 14A.

FIG. 14B is a diagram for further explanation supplementary to the flowchart of FIG. 14A.

According to an embodiment of the disclosure, a first image 1410 obtained by the electronic device 2000 by using the first camera may include only a portion of an object. In this case, an object 3D shape identification model 1400 may not be able to identify the 3D shape type of the object from the first image 1410. In this case, the electronic device 2000 may perform operation S1420 to activate the second camera having a wider angle of view than the first camera, and may obtain a second image 1420 by using the activated second camera. The electronic device 2000 may input the second image 1420 to the object 3D shape identification model 1400, to identify the 3D shape type of the object.

The operation, performed by the electronic device 2000, of identifying the 3D shape type of the object by using the second image, may be selectively or redundantly applied together with the operation, performed by the electronic device 2000, of determining the weight for the 3D shape type and identifying the 3D shape by applying the weight, described above with reference to FIGS. 10C and 10D.

Figure 15A:
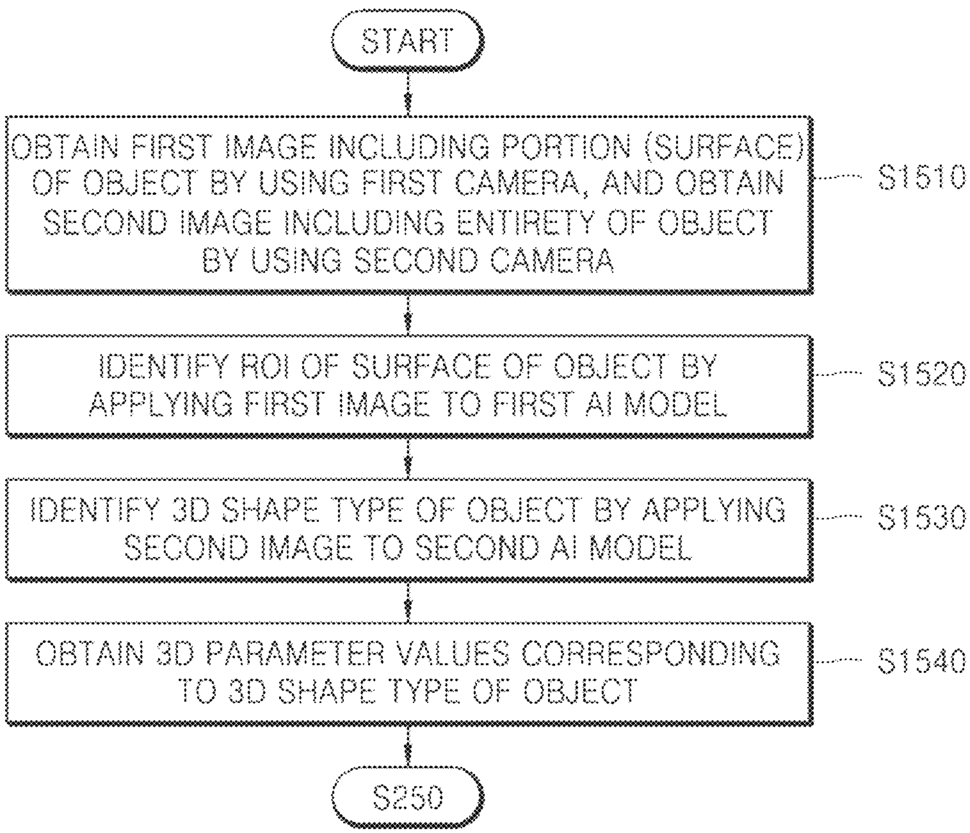
FIG. 15A illustrates an operation of using multiple cameras, which is performed by an electronic device according to an embodiment of the disclosure.

FIG. 15A is a flowchart of an operation, performed by an electronic device according to an embodiment of the disclosure, of using multiple cameras.

In operation S1510, the electronic device 2000 according to an embodiment of the disclosure obtains a first image including a portion (e.g., a surface or a label) of an object using a first camera, and obtains a second image including the entirety of the object by using a second camera. The second camera may have a wider angle of view than the first camera. For example, the first camera may be a telephoto camera, and the second camera may be a wide-angle camera or an ultra-wide-angle camera, but embodiments of the disclosure are not limited thereto. According to an embodiment of the disclosure, a camera of the electronic device 2000 may be activated to photograph the object. A user may activate the camera by touching a hardware button or icon for executing the camera, or may activate the camera through a voice command.

When the user adjusts the position of the electronic device 2000 so that the surface (e.g., label) generally appears on a preview area corresponding to the first camera in order to extract information from the surface (e.g., label) of the object, the surface (e.g., label) of the object may clearly appear on the first image obtained by the electronic device 2000 using the first camera, but the entire shape of the object may not appear. However, the entire shape of the object may appear on the second image obtained using the second camera having a wider field of view than the first camera.

In operation S1520, the electronic device 2000 according to an embodiment of the disclosure applies the first image to the first AI model (ROI identification model) to identify the ROI (e.g., a region corresponding to at least one label) of the surface of the object). Because the first image is an image on which the ROI is focused, the ROI may be accurately identified by applying the first image to the first AI model. Since operation S1520 corresponds to operation S220 of FIG. 2, a detailed description thereof will be omitted.

In operation S1530, the electronic device 2000 according to an embodiment of the disclosure identifies the 3D shape type of the object by applying the second image to the second AI model. Since operation S1530 corresponds to operation S230 of FIG. 2 except that the second image is used, a redundant description thereof will be omitted.

In operation S1540, the electronic device 2000 according to an embodiment of the disclosure obtains 3D parameter values corresponding to the 3D shape type of the object. Since operation S1540 corresponds to operation S240 of FIG. 2, a detailed description thereof will be omitted.

Figure 15B:
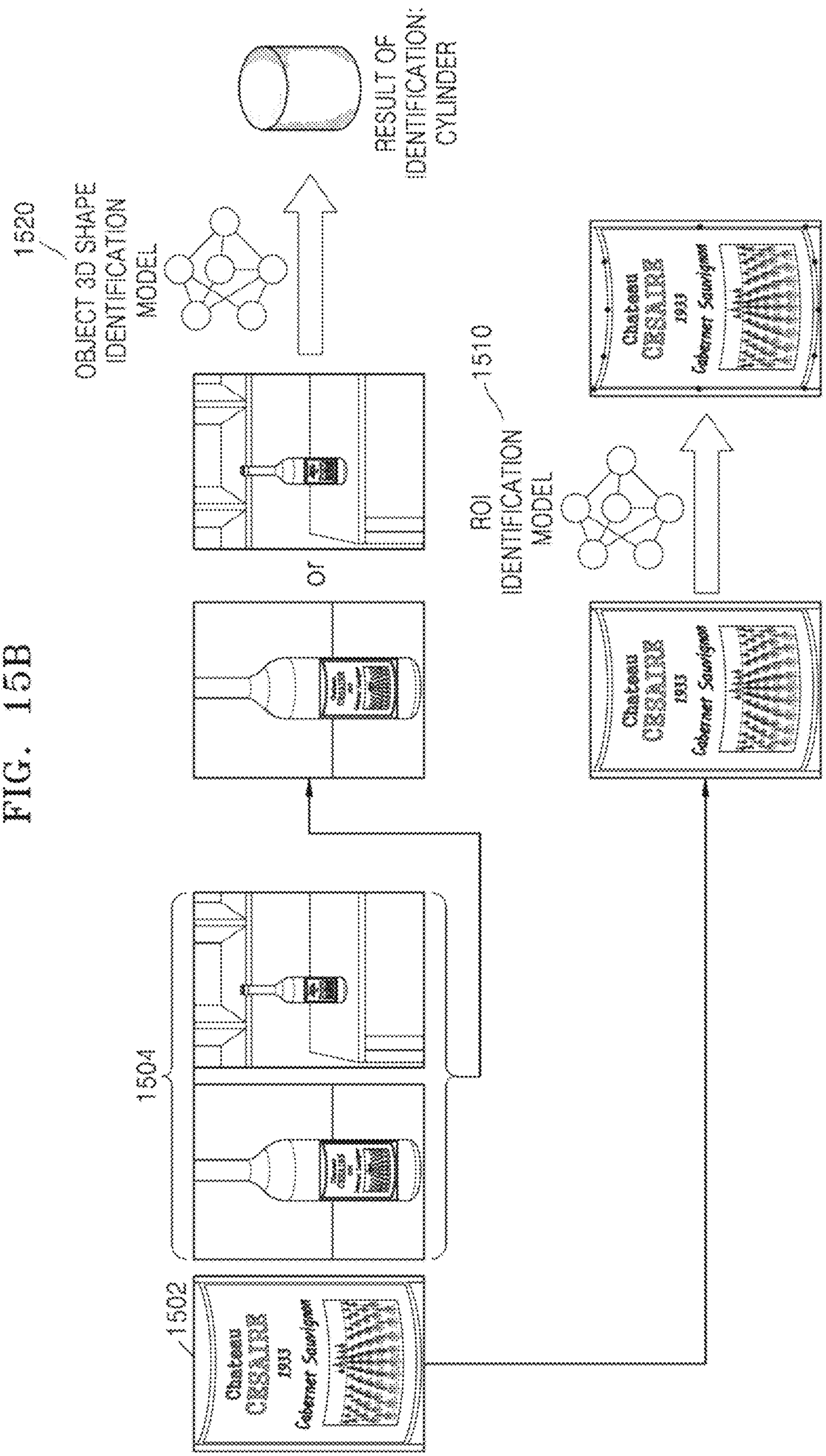
FIG. 15B is a diagram for further explanation supplementary to the flowchart of FIG. 15A.

FIG. 15B is a diagram for further explanation supplementary to the flowchart of FIG. 15A.

According to an embodiment of the disclosure, a first image 1502 obtained by the electronic device 2000 by using the first camera may be an image obtained using a telephoto camera. Because the first image 1502 does not include the entire 3D shape of the object but includes an enlarged ROI, the first image 1502 may be an image suitable for identifying the ROI. In this case, the electronic device 2000 may identify a region corresponding to at least one surface (e.g., label) in the first image as an ROI by inputting the first image 1502 to an ROI identification model 1510.

According to an embodiment of the disclosure, a second image 1504 obtained by the electronic device 2000 by using the second camera may be an image obtained using a wide-angle camera and/or an ultra-wide-angle camera. Because the second image 1504 includes the entire 3D shape of the object, the second image 1504 may be an image suitable for identifying the 3D shape of the object. In this case, the electronic device 2000 may input the second image 1504 to an object 3D shape identification model 1520 to identify the 3D shape type of an object within the second image 1504.

Figure 16A:
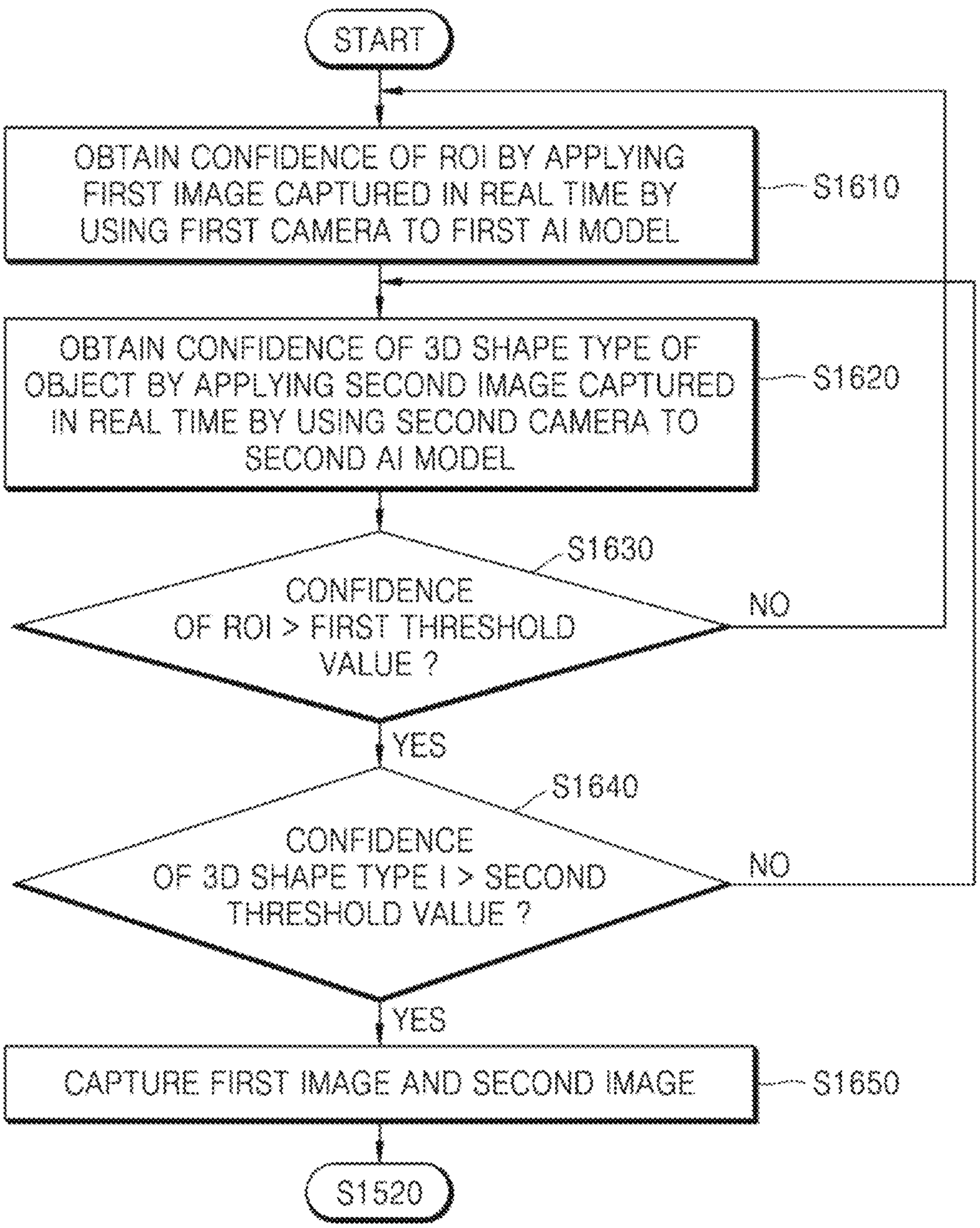
FIG. 16A illustrates an operation of using multiple cameras, which is performed by an electronic device according to an embodiment of the disclosure.

FIG. 16A is a flowchart of an operation, performed by an electronic device according to an embodiment of the disclosure, of using multiple cameras.

In operation S1610, the electronic device 2000 according to an embodiment of the disclosure applies a first image captured in real time by using a first camera to a first AI model (ROI identification model) to obtain confidence of an ROI. The first camera may be a telephoto camera.

According to an embodiment of the disclosure, when a user of the electronic device 2000 wants to recognize an object (e.g., when the user wants to search for a label of a product), the user may activate a camera application. The user may continuously adjust the field of view of a camera so that the camera gazes at the object while viewing a preview image or the like displayed on the screen of the electronic device 2000. The electronic device 2000 may input each of first image frames obtained in real time through the first camera to an ROI identification model.

The electronic device 2000 may obtain the confidence of the ROI, indicating the accuracy of identifying the ROI for each of the first image frames.

In operation S1620, the electronic device 2000 according to an embodiment of the disclosure obtains confidence of the 3D shape type of the object by applying a second image captured in real time by using a second camera to a second AI model. The second camera may be a wide-angle camera or an ultra-wide-angle camera.

According to an embodiment of the disclosure, the electronic device 2000 may input each of second image frames obtained in real time through the second camera to an object 3D shape estimation model. The electronic device 2000 may obtain the confidence of the 3D shape type of the object, indicating the accuracy of estimating an object 3D shape for each of the second image frames.

In operation S1630, the electronic device 2000 according to an embodiment of the disclosure determines whether the confidence of the ROI exceeds a first threshold value. The first threshold value may be a preset threshold value for the ROI. When the confidence of the ROI is equal to or less than the first threshold value, the electronic device 2000 may continue to perform operation S1610 until a confidence exceeding the first threshold value is obtained.

In operation S1640, the electronic device 2000 according to an embodiment of the disclosure determines whether the confidence of the 3D shape type of the object exceeds a second threshold value. The second threshold value may be a preset threshold value for the 3D shape of the object. When the confidence of the 3D shape type of the object is equal to or less than the second threshold value, the electronic device 2000 may continue to perform operation S1620 until a confidence exceeding the second threshold value is obtained.

In operation S1650, the electronic device 2000 according to an embodiment of the disclosure captures a first image and a second image.

According to an embodiment of the disclosure, a condition under which operation S1650 is performed is an AND condition in which the confidence of the ROI exceeds the first threshold value and the confidence of the 3D shape type exceeds the second threshold value. The electronic device 2000 may capture and store the first image and the second image, and may perform operation S1520 and its subsequent operations. In this case, the electronic device 2000 may identify the ROI of the surface of the object by applying the first image to the ROI identification model, and may identify the 3D shape of the object by applying the second image to the object 3D shape identification model. Because detailed operations thereof have been described above, redundant descriptions thereof will be omitted.

Figure 16B:
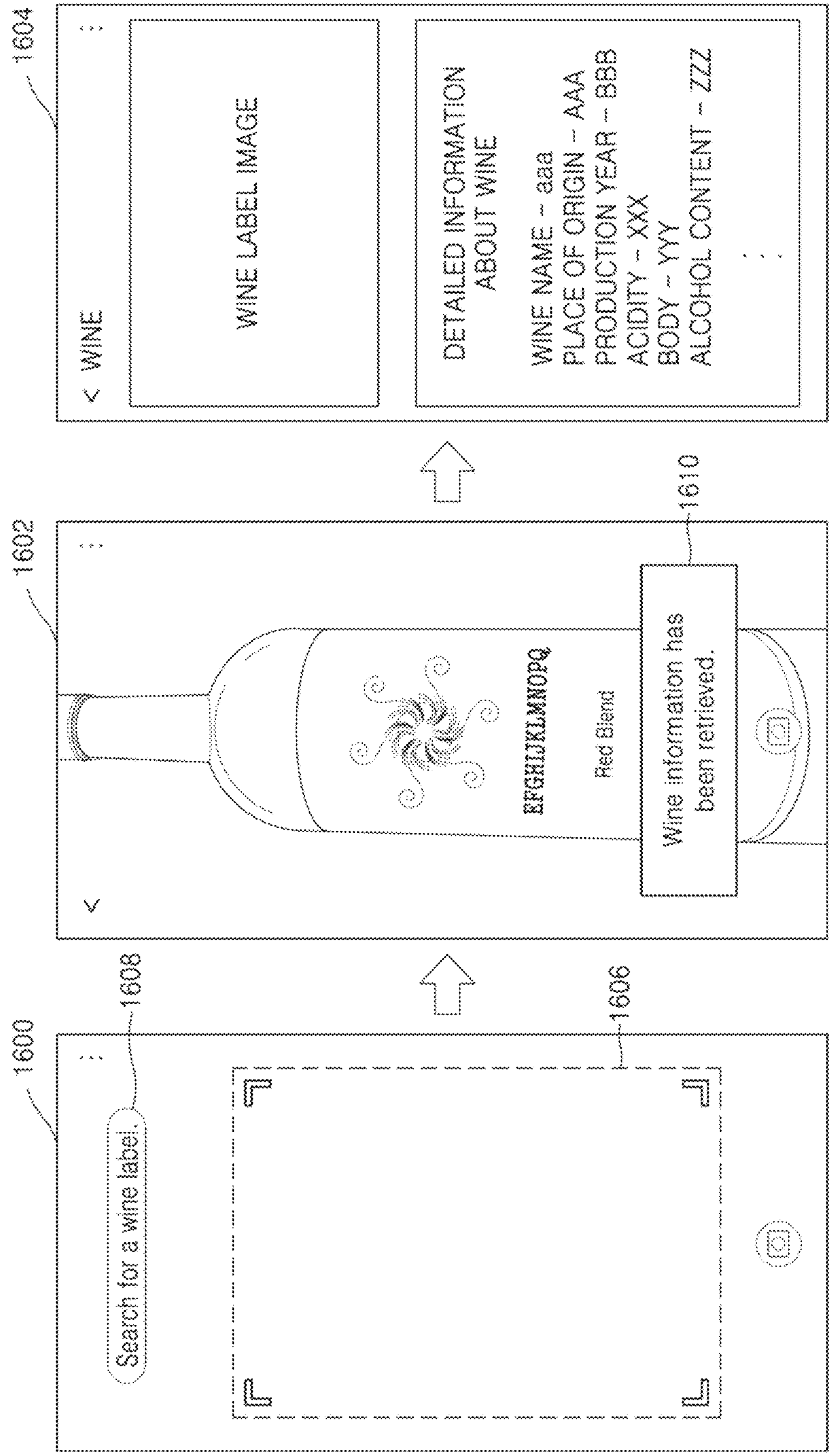
FIG. 16B is a diagram for further explanation supplementary to the flowchart of FIG. 16A.

FIG. 16B is a diagram for further explanation supplementary to the flowchart of FIG. 16A.

In describing FIGS. 16B and 16C, a case where the user wants to recognize a wine label will be described as an example.

Referring to FIG. 16B, the electronic device 2000 according to an embodiment of the disclosure may display a first screen image 1600 for object recognition. The first screen image 1600 may include an interface for guiding the user of the electronic device 2000 to perform object recognition. For example, the electronic device 2000 may display a rectangular box 1606 for guiding the ROI of the object to be included in the first screen image 1600 (however, the rectangular box 1606 is not limited to a rectangle and has another shape capable of performing a similar function, such as a circle), and may display a guide such as 'Search for a wine label (indicated by 1608)'. According to some embodiments of the disclosure, when the object is not recognized from an image displayed on the first screen 1600, the electronic device 2000 may display a guide such as 'Please view a product through a camera'.

According to an embodiment of the disclosure, the electronic device 2000 may display a second screen image 1602 representing a preview image obtained by the camera. While the user is viewing the second screen image 1602, the user may adjust the camera's field of view so that the object is completely included in the image. The electronic device 2000 may calculate the confidence of the ROI and the 3D shape type of the object while the second screen image 1602, which is the preview image of the camera, is being displayed. Because this has already been described above, a redundant description thereof will be omitted.

When the confidence of the ROI exceeds the first threshold value and the confidence of the 3D shape type of the object exceeds the second threshold value, the electronic device 2000 may obtain 3D parameter values related to the object, based on the region corresponding to the at least one surface (e.g., label) identified as the ROI and the data related to the 3D shape type of the object. The electronic device 2000 may obtain a flat surface (e.g., label) image in which a curved shape of the at least one surface (e.g., label) has been flattened, by estimating the curved shape of at least one surface (e.g., label) by using the 3D parameter values related to the object and performing perspective transformation. When a flat surface (e.g., label) image is obtained and information related to the object is extracted from the flat surface (e.g., label) image (i.e., when a product is recognized), the electronic device 2000 may output a notification such as 'Wine information has been retrieved (indicated by 1610)' to the preview image. The electronic device 2000 may output information 1604 related to the object extracted from the flat surface (e.g., label) image. For example, the electronic device 2000 may output a wine label image and detailed information about wine.

Figure 16C:
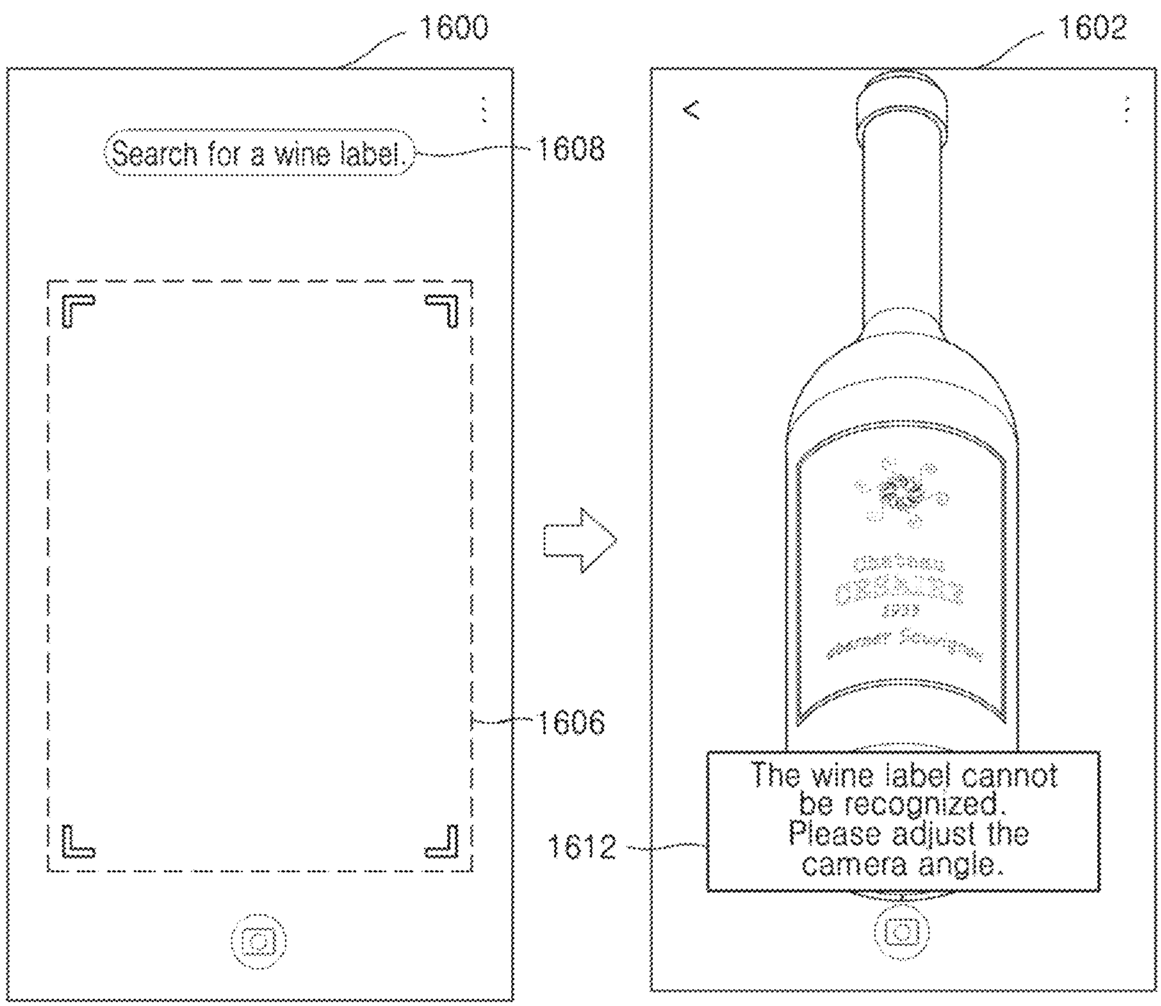
FIG. 16C is a diagram for further explanation supplementary to the flowchart of FIG. 16A.

FIG. 16C is a diagram for further explanation supplementary to the flowchart of FIG. 16A.

Referring to FIG. 16C, the electronic device 2000 according to an embodiment of the disclosure may display the first screen image 1600 for object recognition. The first screen image 1600 may include an interface for guiding the user of the electronic device 2000 to perform object recognition. For example, the electronic device 2000 may display a rectangular box 1606 for guiding the ROI of the object to be included in the first screen image 1600 (however, the rectangular box 1606 is not limited to a rectangle and has another shape capable of performing a similar function, such as a circle), and may display a guide such as 'Search for a wine label (indicated by 1608)'. According to some embodiments of the disclosure, when the object is not recognized from an image displayed on the first screen 1600, the electronic device 2000 may display a guide such as 'Please view a product through a camera'.

According to an embodiment of the disclosure, the electronic device 2000 may calculate the confidence of the ROI and the 3D shape type of the object while the second screen image 1602, which is the preview image of the camera, is being displayed. The electronic device 2000 performs subsequent operations for removing distortion from the image only when the confidence of the ROI exceeds the first threshold value and the confidence of the 3D shape type of the object exceeds the second threshold value. Accordingly, when the confidence of the ROI is less than or equal to the first threshold and/or the confidence of the 3D shape type of the object is less than or equal to the second threshold, the electronic device 2000 may output a notification for guiding the user to adjust a camera field of view in order to obtain the first image and the second image. For example, the electronic device 2000 may display, on a screen, or output, as audio, a notification such as 'The wine label cannot be recognized. Please adjust the camera angle (indicated by 1612)'.

Figure 17:
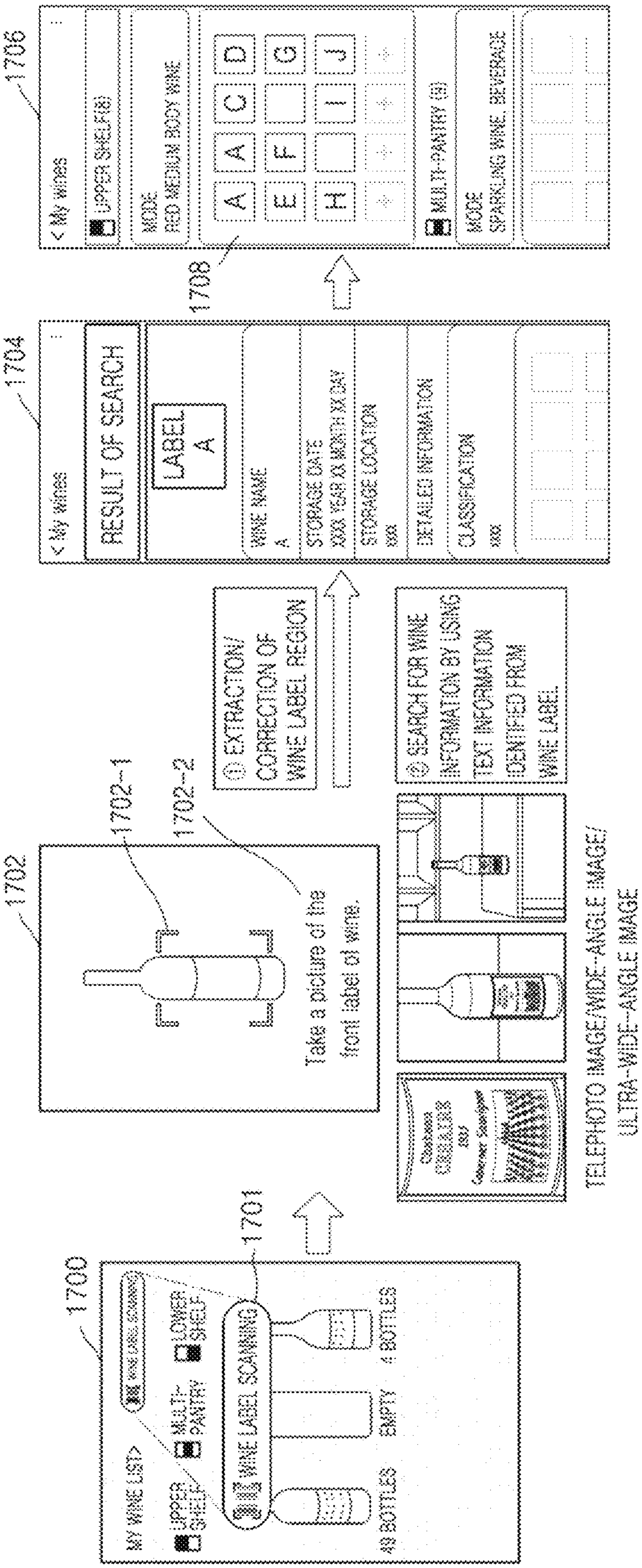
FIG. 17 illustrates an operation of processing an image and providing extracted information, which is performed by an electronic device according to an embodiment of the disclosure.

FIG. 17 is a diagram for explaining an operation, performed by an electronic device according to an embodiment of the disclosure, of processing an image and providing extracted information.

According to an embodiment of the disclosure, the electronic device 2000 may create a flat surface (e.g., label) image, which is a distortion-free image, extract information related to an object from the flat surface (e.g., label) image, and provide the extracted information to a user.

According to an embodiment of the disclosure, the electronic device 2000 may display a first screen image 1700 for starting object recognition. The first screen image 1700 may include a user interface such as a 'wine label scan 1701'. A user of the electronic device 2000 may start an object recognition operation through the user interface.

According to an embodiment of the disclosure, the electronic device 2000 may display a second screen image 1702 for performing object recognition. The second screen image 1702 may include an interface for guiding the user of the electronic device 2000 to perform object recognition. For example, the electronic device 2000 may display a guide area 1702-1 guiding an ROI of the object to be included in the second screen image 1702, and may display a guide phrase such as 'Take a picture of the front label of wine' (1702-2).

The electronic device 2000 may obtain a plurality of images (e.g., a telephoto image, a wide-angle image, and an ultra-wide-angle image) through multiple cameras, and may perform distortion removal operations based on 3D information according to the above-described embodiments. In other words, the electronic device 2000 creates a distortion-free wine label image by extracting a wine label region from the image and performing correction to remove the distortion. The electronic device 2000 may extract pieces of wine-related information by applying OCR to the distortion-free wine label image. The electronic device 2000 may search for wine information by using text information identified from the wine label.

According to an embodiment of the disclosure, when the electronic device 2000 extracts/corrects the wine label region and searches wine information by using text information identified from the wine label, the electronic device 2000 may display a third screen image 1704 indicating object recognition and a search result. A distortion-free image created by the electronic device 2000 according to the above-described embodiments may be displayed on the third screen image 1704. The distortion-free image in the example of FIG. 17 may be a wine label image. The wine label image may be a flat surface (e.g., label) image obtained by transforming a wine label attached to a wine bottle in a curved shape into a flat wine label.

Object-related information obtained by the electronic device 2000 according to the above-described embodiments may be displayed on the third screen image 1704. The object-related information in the example of FIG. 17 may be wine detailed information. In this case, a wine name, a place of origin, a production year, etc., which are results of performing OCR on the wine label image, may be displayed.

According to an embodiment of the disclosure, additional information related to the object obtained from a server or from the database of the electronic device 2000 may be further displayed on the third screen image 1704, in addition to the object-related information obtained from the wine label image. For example, acidity, body, and alcohol content of wine, which may not be obtained from the wine label image, may be displayed.

According to an embodiment of the disclosure, information obtained from another electronic device and/or information obtained based on a user input may be further displayed on the third screen image 1704. For example, the wine's nickname, storage date, storage location, and the like may be displayed.

However, the information obtainable from the wine label image and the information obtained from a path other than the wine label image have been described by way of example, and are not limited to the above description.

According to an embodiment of the disclosure, the electronic device 2000 may display a fourth screen image 1706 in which the object recognition and search results are made into a database. In this case, the electronic device 2000 may display flat surface (e.g., label) images, which are distortion-free images, in a preview form 1708. When each of the flat surface (e.g., label) images is selected, pieces of wine information corresponding to the selected flat surface (e.g., label) image may be displayed again, as in the third screen image 1704.

Figure 18:
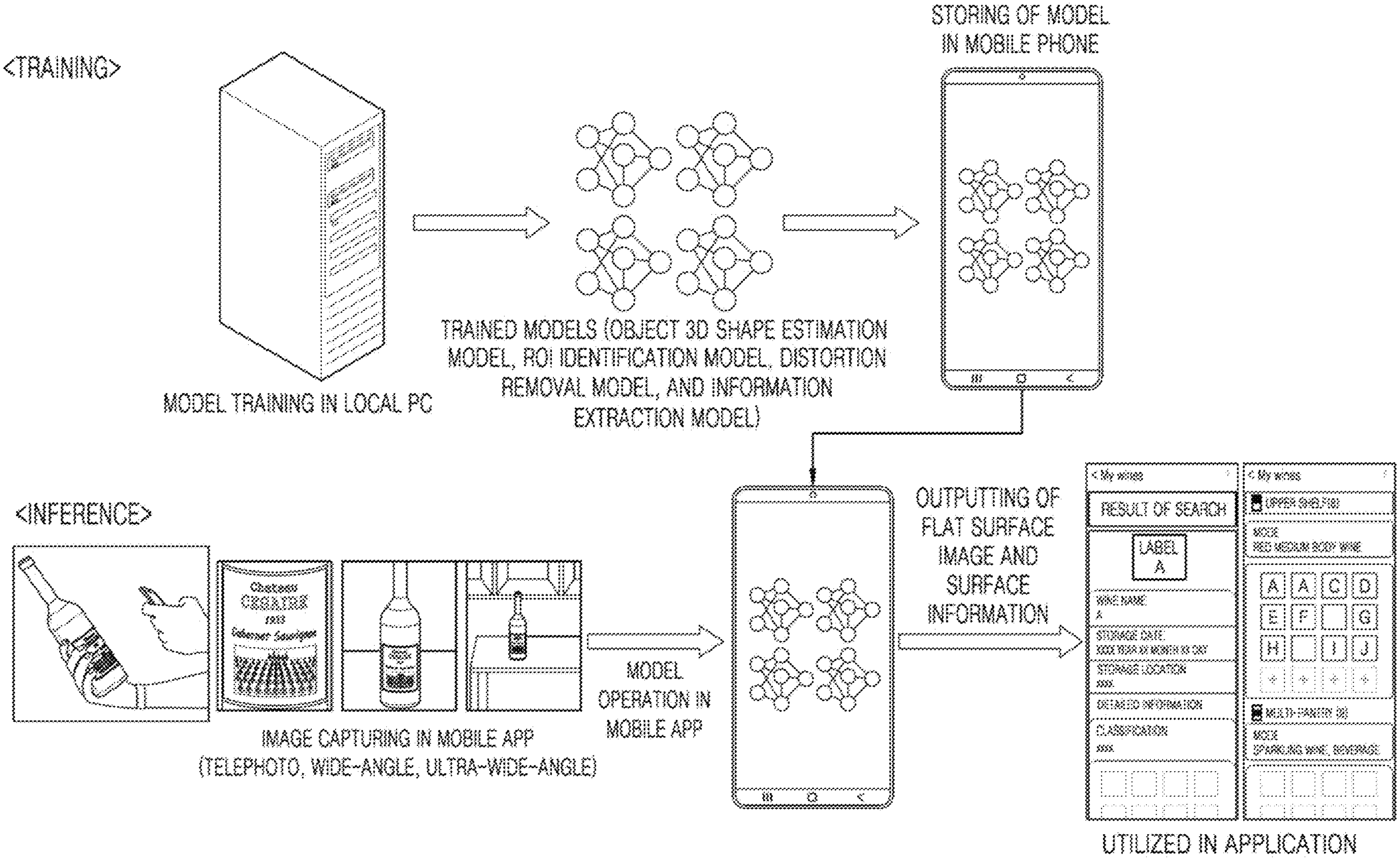
FIG. 18 illustrates an example of a system related to an operation of processing an image, which is performed by an electronic device according to an embodiment of the disclosure.

FIG. 18 is a diagram for explaining an example of a system related to an operation, performed by an electronic device according to an embodiment of the disclosure, of processing an image.

According to an embodiment of the disclosure, models used by the electronic device 2000 may be trained in another electronic device (e.g., a local personal computer (PC)) suitable for performing a neural network calculation. For example, an object 3D shape estimation model, an ROI identification model, a distortion removal model, an information extraction model, etc. may be trained by another electronic device and stored in a trained state.

According to an embodiment of the disclosure, the electronic device 2000 may receive trained models stored in the other electronic device. The electronic device 2000 may perform the above-described image processing operations, based on the received models. In this case, the electronic device 2000 may execute an inference operation by executing the trained models, and may create a flat surface (e.g., label) image and surface (e.g., label) information. The created flat surface (e.g., label) image and the created surface (e.g., label) information may be provided to a user through an application or the like. In FIG. 18, it has been described that a model is stored and used in a mobile phone as an example of the electronic device 2000. However, embodiments of the disclosure are not limited thereto. The electronic device 2000 may include any electronic device capable of executing applications and equipped with a display and a camera, such as a TV, a tablet PC, and a smart refrigerator.

As described above in the description of the previous drawings, models used by the electronic device 2000 may be trained using computing resources of the electronic device 2000. Because this has been described above in detail, a redundant description thereof will be omitted.

Figure 19:
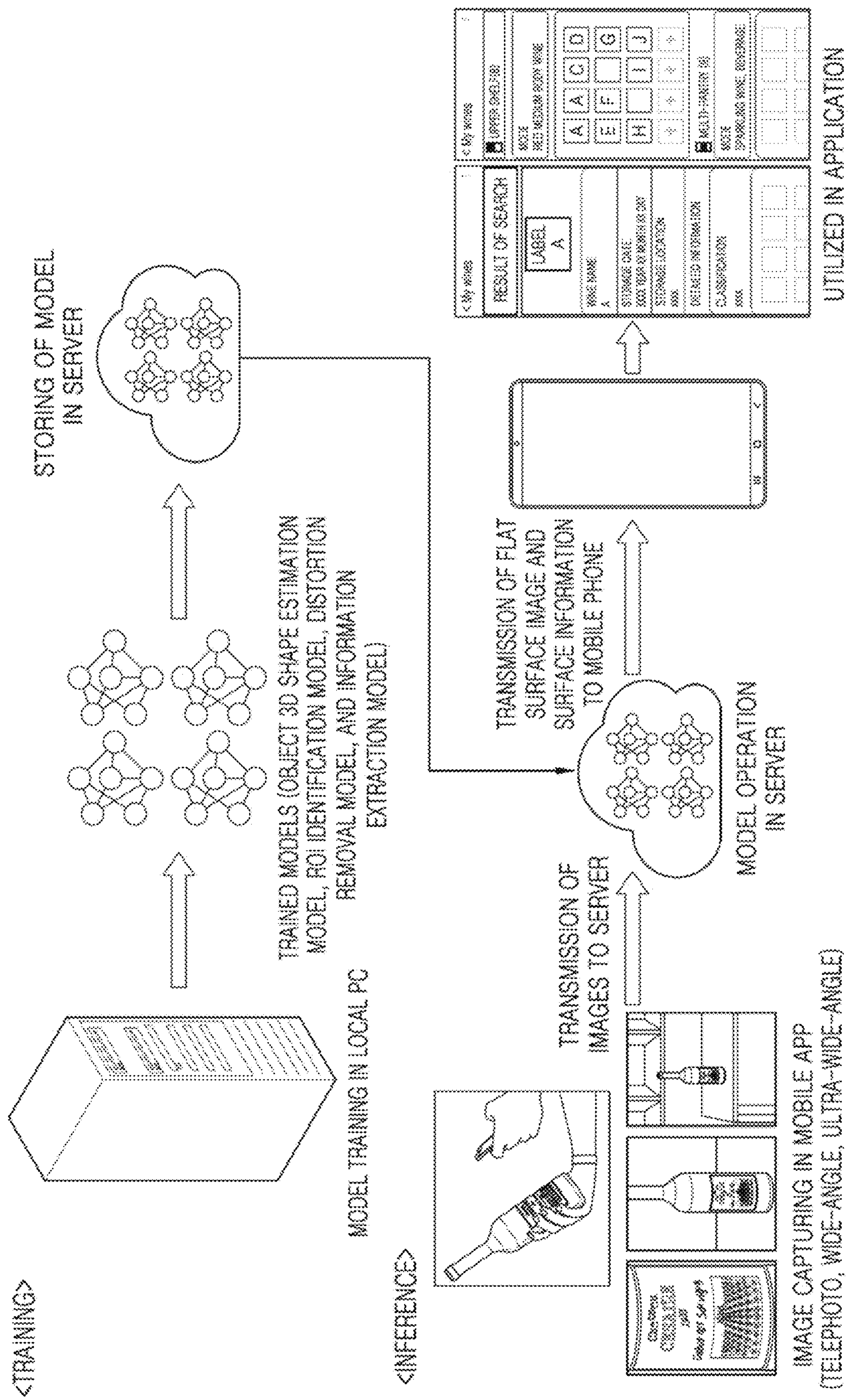
FIG. 19 illustrates an example of a system related to an operation of processing an image by using a server, which is performed by an electronic device according to an embodiment of the disclosure.

FIG. 19 is a diagram for explaining an example of a system related to an operation, performed by an electronic device according to an embodiment of the disclosure, of processing an image by using a server.

According to an embodiment of the disclosure, the models used by the electronic device 2000 may be trained in another electronic device (e.g., a local PC) suitable for performing a neural network calculation. For example, an object 3D shape estimation model, an ROI identification model, a distortion removal model, an information extraction model, etc. may be trained by another electronic device and stored in a trained state. Models trained in another electronic device (e.g., a local PC) may be transmitted to and stored in another electronic device (e.g., a server).

According to an embodiment of the disclosure, the electronic device 2000 may perform image processing operations by using the server. The electronic device 2000 may capture object images (e.g., a telephoto image, a wide-angle image, and an ultra-wide-angle image) by using a camera, and may transmit the object images to the server. In this case, the server may execute an inference operation by executing the trained models, and may create a flat surface (e.g., label) image and surface (e.g., label) information. The electronic device 2000 may receive the flat surface (e.g., label) image and the surface (e.g., label) information from the server. The received flat surface (e.g., label) image and the received surface (e.g., label) information may be provided to a user through an application or the like. In FIG. 19, it has been described that a model is stored and used in a mobile phone as an example of the electronic device 2000. However, embodiments of the disclosure are not limited thereto. The electronic device 2000 may include any electronic device capable of executing applications and equipped with a display and a camera, such as a TV, a tablet PC, and a smart refrigerator.

As described above in the description of the previous drawings, models used by the electronic device 2000 may be trained using computing resources of the electronic device 2000. Because this has been described above in detail, a redundant description thereof will be omitted.

Figure 20:
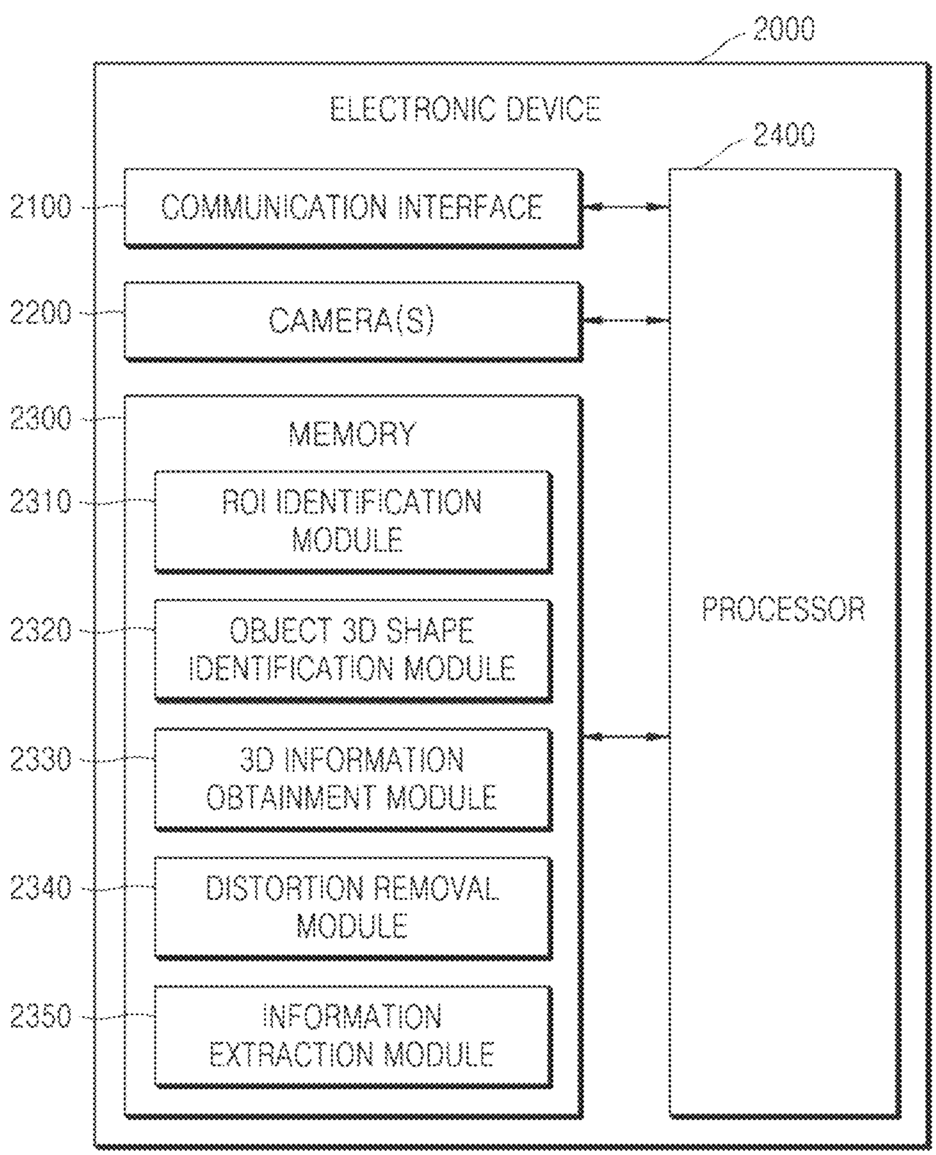
FIG. 20 illustrates an electronic device according to an embodiment of the disclosure.

FIG. 20 is a block diagram of the electronic device 2000 according to an embodiment of the disclosure.

The electronic device 2000 according to an embodiment of the disclosure may include a communication interface 2100, a camera(s) 2200, a memory 2300, and a processor 2400.

The communication interface 2100 may perform data communication with other electronic devices under a control by the processor 2400.

The communication interface 2100 may include a communication circuit. The communication interface 2100 may include a communication circuit capable of performing data communication between the electronic device 2000 and other electronic devices, by using at least one of data communication methods including, for example, a wired Local Area Network (LAN), a wireless LAN, Wi-Fi, Bluetooth, Zigbee, Wi-Fi Direct (WFD), infrared communication (IrDA), Bluetooth Low Energy (BLE), Near Field Communication (NFC), Wireless Broadband Internet (Wibro), World Interoperability for Microwave Access (WiMAX), a shared wireless access protocol (SWAP), Wireless Gigabit Alliances (WiGig), and Radio Frequency (RF) communication.

The communication interface 2100 may transmit/receive data for performing an image processing operation of the electronic device 2000 to/from an external electronic device. For example, the communication interface 2100 may transmit/receive AI models used by the electronic device 2000, or transmit/receive training datasets of AI models to/from a server or the like. The electronic device 2000 may obtain, from a server or the like, an image from which distortion is to be removed. The electronic device 2000 may transmit and receive data to and from the server or the like in order to search for information related to an object.

The camera(s) 2200 may obtain video and/or an image by photographing the object. The camera(s) 2200 may be included as one or more. The camera(s) 220 may include, for example, an RGB camera, a telephoto camera, a wide-angle camera, and an ultra-wide-angle camera, but embodiments of the disclosure are not limited thereto. The camera(s) 2200 may obtain video including a plurality of frames. Specific types and detailed functions of the camera(s) 2200 may be clearly inferred by one of ordinary skill in the art, and thus descriptions thereof are omitted.

Instructions, a data structure, and program code readable by the processor 2400 may be stored in the memory 2300. The memory 2300 may be included as one or more. According to disclosed embodiments, operations performed by the processor 2400 may be implemented by executing the instructions or codes of a program stored in the memory 2300.

The memory 2300 may include a flash memory type, a hard disk type, a multimedia card micro type, and a card type memory (for example, a secure digital (SD) or extreme digital (XD) memory), and may include a non-volatile memory including at least one of a read-only memory (ROM), an electrically erasable programmable ROM (EEPROM), a programmable ROM (PROM), magnetic memory, a magnetic disk, or an optical disk, and a volatile memory such as a random access memory (RAM) or a static random access memory (SRAM).

The memory 2300 according to an embodiment of the disclosure may store one or more instructions and/or programs for causing the electronic device 2000 to operate to remove distortion in an image. For example, the memory 2300 may store an ROI identification module 2310, an object 3D shape identification module 2320, a 3D information obtainment module 2330, a distortion removal module 2340, and an information extraction module 2350.

The processor 2400 may control overall operations of the electronic device 2000. For example, the processor 2400 may control overall operations of the electronic device 2000 for removing distortion from the image, by executing the one or more instructions of the program stored in the memory 2300. The processor 2400 may be included as one or more.

The one or more processors 2400 according to the disclosure may include at least one of a central processing unit (CPU), a graphics processing unit (GPU), an accelerated processing unit (APU), a many integrated core (MIC), a digital signal processor (DSP), or a neural processing unit (NPU). The one or more processors 2400 may be implemented in the form of an integrated system on a chip (SoC) including one or more electronic components. Each of the one or more processors 2400 may be implemented as separate hardware (H/W).

In this case, the processor 2400 may identify a region corresponding to at least one surface (e.g., label) in the image as an ROI by executing the ROI identification model 2310. The ROI identification module 2310 may include an ROI identification model. Since specific operations related to the ROI identification module 2310 have been described in detail with reference to the previous drawings, redundant descriptions thereof will be omitted.

The processor 2400 executes the object 3D shape identification module 2320 to obtain data related to the 3D shape type of the object in the image. The object 3D shape identification module 2320 may include an object 3D shape identification model. Since specific operations related to the object 3D shape identification module 2320 have been described in detail with reference to the previous drawings, redundant descriptions thereof will be omitted.

The processor 2400 may infer 3D information of the object in the image by executing the 3D information obtainment module 2330. The processor 2400 obtains 3D parameter values related to at least one of the object, the at least one surface (e.g., label), or a first camera, based on the ROI and the data related to the 3D shape type of the object. Obtaining the 3D parameter values may be representing the 3D information of the object by finely adjusting initial values of 3D parameters corresponding to the 3D shape of the object. Since specific operations related to the 3D shape obtainment module 2330 have been described in detail with reference to the previous drawings, redundant descriptions thereof will be omitted.

The processor 2400 may remove distortion from the image by executing the distortion removal module 2340. The distortion removal module 2340 may include a distortion removal model. The processor 2400 may estimate a curved shape of the at least one surface (e.g., label), based on the 3D parameters. The processor 2400 may obtain a flat surface (e.g., label) image in which the curved shape of the surface (e.g., label) has been flattened, by performing perspective transformation on the at least one surface (e.g., label). Since specific operations related to the distortion removal module 2340 have been described in detail with reference to the previous drawings, redundant descriptions thereof will be omitted.

The processor 2400 may extract information from a distortion-free image by executing the information extraction module 2350. The information extraction module 2350 may include an information extraction model. The processor 2400 may extract information within the ROI by using the information extraction module 2350, and may identify, for example, logos, icons, and text within the ROI. Since specific operations related to the information extraction module 2350 have been described in detail with reference to the previous drawings, redundant descriptions thereof will be omitted.

The modules stored in the memory 2300 are for convenience of description, but embodiments of the disclosure are not limited thereto. Other modules may be added to implement the above-described embodiments, and some of the above-described modules may be implemented as one module.

When a method according to an embodiment of the disclosure includes a plurality of operations, the plurality of operations may be performed by one processor or by a plurality of processors. For example, when a first operation, a second operation, and a third operation are performed by the method according to an embodiment of the disclosure, the first operation, the second operation, and the third operation may all be performed by a first processor, or the first operation and the second operation may be performed by a first processor (e.g., a general-purpose processor) and the third operation may be performed by a second processor (e.g., an AI processor). An AI dedicated processor, which is an example of the second processor, may perform operations for training/inference of an AI model. However, embodiments of the disclosure are not limited thereto.

One or more processors according to the disclosure may be implemented as a single-core processor or as a multi-core processor.

When the method according to an embodiment of the disclosure includes a plurality of operations, the plurality of operations may be performed by one core or by a plurality of cores included in one or more processors.

In FIG. 20, the electronic device 2000 may further include a user interface. The user interface may include an input interface for receiving a user's input and an output interface for outputting information.

The output interface is provided to output an audio signal or a video signal. The output interface may include a display, a sound output interface, a vibration motor, and the like. When the display forms a layer structure together with a touch pad to construct a touch screen, the display may be used as an input device as well as an output device. The display may include at least one selected from a liquid crystal display (LCD), a thin film transistor-liquid crystal display (TFT-LCD), a light-emitting diode (LED), an organic light-emitting diode (OLED), a flexible display, a 3D display, and an electrophoretic display. According to embodiments of the electronic device 2000, the electronic device 2000 may include at least two displays.

The audio output interface may output an audio signal that is received from the communication interface 2100 or stored in the memory 2300. The sound output interface may output sound signals related to functions performed by the electronic device 2000. The audio output interface may include, for example, a speaker and a buzzer.

The input interface is for receiving an input from a user. The input interface may include, but is not limited to, at least one of a key pad, a dome switch, a touch pad (e.g., a capacitive overlay type, a resistive overlay type, an infrared beam type, an integral strain gauge type, a surface acoustic wave type, a piezoelectric type, or the like), a jog wheel, or a jog switch.

The input interface may include a voice recognition module. For example, the electronic device 2000 may receive a speech signal, which is an analog signal, through a microphone, and convert the speech signal into computer-readable text by using an automatic speech recognition (ASR) model. The electronic device 2000 may also obtain a user's utterance intention by interpreting the converted text using a Natural Language Understanding (NLU) model. The ASR model or the NLU model may be an AI model. Linguistic understanding is a technology that recognizes and applies/processes human language/character, and thus includes natural language processing, machine translation, a dialog system, question answering, and speech recognition/speech recognition/synthesis, etc.

Figure 21:
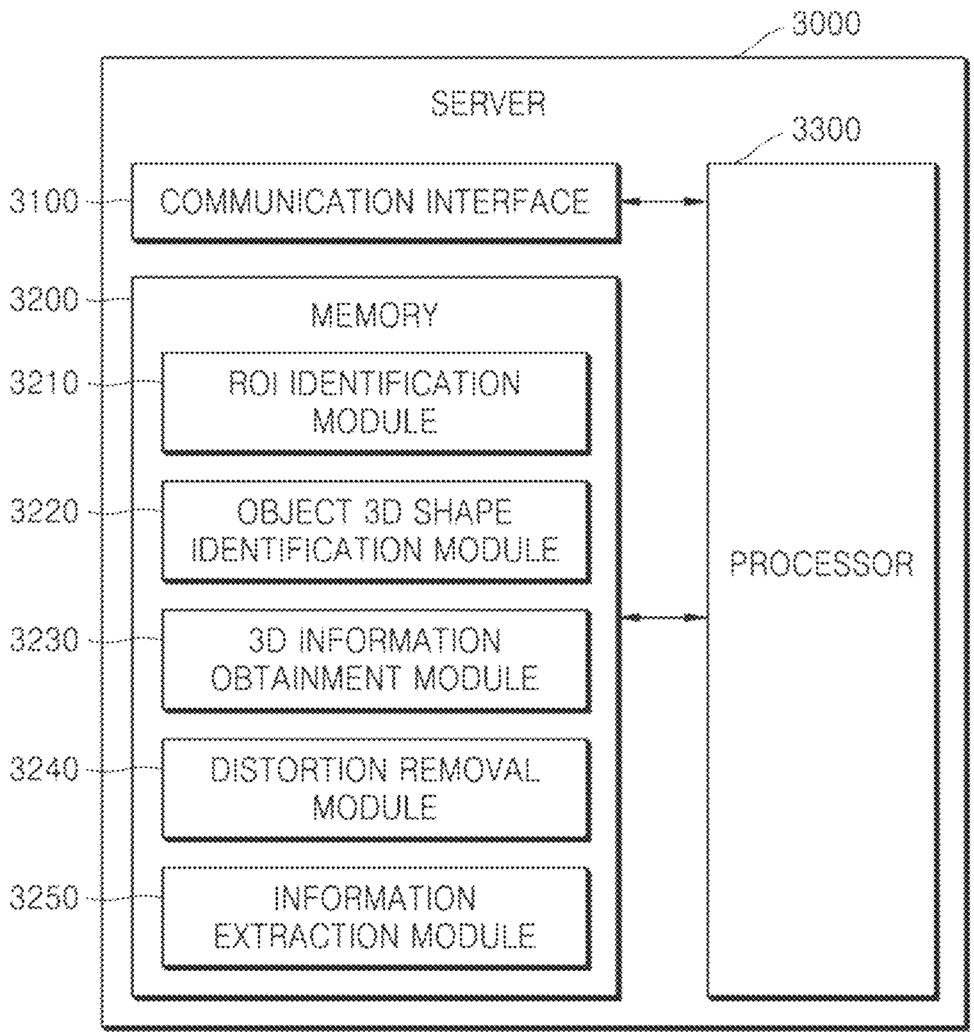
FIG. 21 illustrates a structure of a server according to an embodiment of the disclosure.

FIG. 21 is a block diagram of a structure of a server according to an embodiment of the disclosure.

According to an embodiment of the disclosure, operations of the electronic device 2000 may be performed by a server 3000.

The server 3000 according to an embodiment of the disclosure may include a communication interface 3100, a memory 3200, and a processor 3300. The communication interface 3100, the memory 3200, and the processor 3300 of the server 3000 correspond to the communication interface 2100, the memory 2300, and the processor 2400 of the electronic device 2000 of FIG. 20, respectively, and thus redundant descriptions thereof will be omitted.

The server 3000 according to an embodiment of the disclosure may have a higher computing performance than the electronic device 2000 to enable it to perform a calculation with a greater amount of computation than the electronic device 2000. The server 3000 may perform training of an AI model, which requires a relatively large amount of computation compared to inference. The server 3000 may perform interference by using the AI model and transmit a result of the interference to the electronic device 2000.

The disclosure intends to propose, in an image distortion removal method using 3D information, an image processing method for inferring 3D information of an object by using an operation and removing distortion in an image, without hardware such as a sensor for obtaining 3D information.

Additional aspects will be set forth in part in the description which follows and, in part, will be apparent from the description, or may be learned by practice of the presented embodiments.

According an aspect of the disclosure, provided is a method, performed by the electronic device 2000, of processing an image. The method may include obtaining a first image of a three-dimensional (3D) object including at least one surface (e.g., label) by using a first camera. The method may include identifying a region corresponding to the at least one surface (e.g., label) in the first image as an ROI by applying the first image to a first AI model. The method may include obtaining data related to a 3D shape type of the object by applying the first image to a second AI model. The method may include obtaining a set of 3D parameter values related to at least one of the object, the at least one surface (e.g., label), or the first camera, based on the region corresponding to the at least one surface (e.g., label) identified as the ROI and the data related to the 3D shape type of the object. The method may include estimating a non-flat shape of the at least one surface (e.g., label), based on the values of the 3D parameter. The method may include obtaining a flat surface (e.g., label) image in which the non-flat shape of the at least one surface (e.g., label) has been flattened, by performing perspective transformation on the at least one surface (e.g., label).

The set of values of the 3D parameter may include at least one of a width value, a length value, a height value, and a radius value related to a 3D shape of the object, an angle value of an ROI of a surface of the object, a translation value and a rotation value for 3D geometric transformation, or a focal length value of a camera.

The first AI model may be trained to infer a region corresponding to a surface (e.g., label) in an image as an ROI. The second AI model may be trained to infer the 3D shape type of the object in the image.

The obtaining of the data related to the 3D shape type of the object may include receiving a user input related to the 3D shape type of the object from a user. The obtaining of the data related to the 3D shape type of the object may further include identifying the 3D shape type of the object by applying a weight to a 3D shape type corresponding to the user input among a plurality of 3D shape types.

The identifying of the region corresponding to the at least one surface (e.g., label) as the ROI may include identifying first keypoints representing the region corresponding to the at least one surface (e.g., label). The obtaining of the set of values of the 3D parameter may include obtaining a virtual object corresponding to the 3D shape type of the object and set of initial values of a 3D parameter of the virtual object. The obtaining of the values of the 3D parameter may further include adjusting the set of initial values of the 3D parameter of the virtual object, based on the first keypoints. The obtaining of the values of the 3D parameter may further include obtaining the adjusted set of initial values of the 3D parameter of the virtual object as the set of values of the 3D parameter related to at least one of the object, the at least one surface, or the camera.

The adjusting of the initial values of the 3D parameter of the virtual object, based on the first keypoints, may include setting second keypoints representing the region corresponding to a virtual surface (e.g., label) of the virtual object. The adjusting of the initial values of the 3D parameter of the virtual object, based on the first keypoints, may include adjusting the second keypoints to match the first keypoints so that the set of initial values of the 3D parameter of the virtual object approximates ground truth of the set of values of the 3D parameter of the object.

The obtaining of the information related to the object from the flat surface (e.g., label) image may include applying OCR to the flat surface (e.g., label) image.

The method may further include obtaining a second image of the object by using a second camera having a wider angle of view than the first camera.

The obtaining of the data related to the 3D shape type of the object may further include obtaining information related to the 3D shape type of the object by further applying the second image to the second AI model.

The method may further include obtaining confidence of the ROI by applying the first image by using the first camera to the first AI model. The method may further include obtaining confidence of the 3D shape type of the object by applying a second image by using the second camera to the second AI model. The method may further include capturing the first image and the second image, based on respective threshold values of the confidence of the 3D shape type of the object and the confidence of the ROI, respectively.

The method may further include searching for matching data in a database, based on the flat surface (e.g., label) image or the information obtained from the flat surface (e.g., label) image. The method may further include displaying a result of the searching, and the database may store other flat surface (e.g., label) images previously obtained by the electronic device and information related to other objects.

According an aspect of the disclosure, provided is an electronic device for processing an image. The electronic device may include a first camera, a memory storing one or more instructions, and one or more processors configured to execute the one or more instructions stored in the memory. The one or more processors may be configured to execute the one or more instructions to obtain a first image of a 3D object including at least one surface (e.g., label) by using the first camera. The one or more processors may be further configured to execute the one or more instructions to identify a region corresponding to the at least one surface (e.g., label) in the first image as an ROI by applying the first image to a first AI model. The one or more processors may be further configured to execute the one or more instructions to obtain data related to a 3D shape type of the object by applying the first image to a second AI model. The one or more processors may be further configured to execute the one or more instructions to obtain a set of 3D parameter related to at least one of the object, the at least one surface (e.g., label), or the first camera, based on the region corresponding to the at least one surface (e.g., label) identified as the ROI and the data related to the 3D shape type of the object. The one or more processors may be further configured to execute the one or more instructions to estimate a non-flat shape of the at least one surface (e.g., label), based on the set of values of the 3D parameter. The one or more processors may be further configured to execute the one or more instructions to obtain a flat surface (e.g., label) image in which the non-flat shape of the at least one surface (e.g., label) has been flattened, by performing perspective transformation on the at least one surface (e.g., label).

The one or more processors may be further configured to execute the one or more instructions to receive a user input related to the 3D shape type of the object from a user. The one or more processors may be further configured to execute the one or more instructions to identify the 3D shape type of the object by applying a weight to a 3D shape type corresponding to the user input among a plurality of 3D shape types.

The one or more processors may be further configured to execute the one or more instructions to identify first keypoints representing the region corresponding to the at least one surface (e.g., label). The one or more processors may be further configured to execute the one or more instructions to obtain a virtual object corresponding to the 3D shape type of the object and set of initial values of a 3D parameter of the virtual object. The one or more processors may be further configured to execute the one or more instructions to adjust the set of initial values of the 3D parameter of the virtual object, based on the first keypoints. The one or more processors may be further configured to execute the one or more instructions to obtain the adjusted set of initial values of the 3D parameter of the virtual object as the set of values of the 3D parameter related to at least one of the object, the at least one surface, or the camera.

The one or more processors may be further configured to execute the one or more instructions to set second keypoints representing the region corresponding to a virtual surface (e.g., label) of the virtual object. The one or more processors may be further configured to execute the one or more instructions to adjust the second keypoints to match the first keypoints so that the set of initial values of the 3D parameter of the virtual object approximates ground truth of the set of values of the 3D parameter of the object.

The one or more processors may be further configured to execute the one or more instructions to apply OCR to the flat surface (e.g., label) image.

The electronic device may further include a second camera having a wider angle of view than the first camera, and the one or more processors may be further configured to execute the one or more instructions to obtain a second image of the object through the second camera.

The one or more processors may be further configured to execute the one or more instructions to obtain information related to the 3D shape type of the object by applying the second image to the second AI model.

A method, performed by an electronic device according to an embodiment of the disclosure, of processing an image may include obtaining a partial image of an object including at least one surface (e.g., label) by using a first camera. The method may include identifying a region corresponding to the surface (e.g., label) of the object as an ROI by applying the partial image of the object to a first AI model. The method may include obtaining an entire image of the object by using a second camera. The method may include identifying a 3D shape type of the object by applying the entire image of the object to a second AI model. The method may include obtaining a set of values of 3D parameter corresponding to the 3D shape type of the object. The method may include obtaining a flat surface (e.g., label) image in which a curved shape of the surface (e.g., label) has been flattened, by performing perspective transformation of the surface (e.g., label), based on information about the ROI and the set of values of 3D parameter. The method may include obtaining information related to the object from the flat surface (e.g., label) image.

Embodiments of the disclosure can also be embodied as a storage medium including instructions executable by a computer such as a program module executed by the computer. A computer readable medium can be any available medium which can be accessed by the computer and includes all volatile/non-volatile and removable/non-removable media. Further, the computer readable medium may include all computer storage and communication media. The computer storage medium includes all volatile/non-volatile and removable/non-removable media embodied by a certain method or technology for storing information such as computer readable instruction code, a data structure, a program module or other data. Communication media may typically include computer readable instructions, data structures, or other data in a modulated data signal, such as program modules.

In addition, computer-readable storage media may be provided in the form of non-transitory storage media. The 'non-transitory storage medium' is a tangible device and only means that it does not contain a signal (e.g., electromagnetic waves). This term does not distinguish a case in which data is stored semi-permanently in a storage medium from a case in which data is temporarily stored. For example, the non-transitory recording medium may include a buffer in which data is temporarily stored.

According to an embodiment of the disclosure, a method according to various disclosed embodiments may be provided by being included in a computer program product. The computer program product, which is a commodity, may be traded between sellers and buyers. Computer program products are distributed in the form of device-readable storage media (e.g., compact disc read only memory (CD-ROM)), or may be distributed (e.g., downloaded or uploaded) through an application store or between two user devices (e.g., smartphones) directly and online. In the case of online distribution, at least a portion of the computer program product (e.g., a downloadable app) may be stored at least temporarily in a device-readable storage medium, such as a memory of a manufacturer's server, a server of an application store, or a relay server, or may be temporarily generated.

While the disclosure has been particularly shown and described with reference to exemplary embodiments thereof, it will be understood that various changes in form and details may be made therein without departing from the spirit and scope of the disclosure. Thus, the above-described embodiments should be considered in descriptive sense only and not for purposes of limitation. For example, each component described as a single type may be implemented in a distributed manner, and similarly, components described as being distributed may be implemented in a combined form.

The scope of the disclosure is indicated by the scope of the claims to be described later rather than the above detailed description, and all changes or modified forms derived from the meaning and scope of the claims and the concept of equivalents thereof should be interpreted as being included in the scope of the disclosure.

What is claimed is:

1. A method, performed by an electronic device, of processing an image, the method comprising:

obtaining a first image of a three-dimensional (3D) object comprising at least one surface by using a first camera, the at least one surface having a non-flat shape;

identifying a region of interest (ROI) within the first image of the 3D object, which corresponds to the at least one surface, by applying the first image of the 3D object to a first artificial intelligence (AI) model;

identifying first keypoints representing the ROI;

obtaining data about a 3D shape type of the 3D object by applying the first image of the 3D object to a second AI model;

obtaining a virtual object corresponding to the 3D shape type of the 3D object and obtaining a set of initial values of a 3D parameter of the virtual object;

adjusting the set of initial values of the 3D parameter of the virtual object, based on the first keypoints;

obtaining the adjusted set of initial values of the 3D parameter of the virtual object as a set of values of a 3D parameter related to at least one of the 3D object, the at least one surface, or the first camera;

estimating the non-flat shape of the at least one surface, based on the set of values of the 3D parameter; and obtaining a flat surface image in which the non-flat shape of the at least one surface is flattened, by performing a perspective transformation on the at least one surface.

2. The method of claim 1, wherein the set of values of the 3D parameter comprises at least one of:

a height value related to a 3D shape of the 3D object, a radius value related to the 3D shape of the 3D object, an angle value of the ROI of the at least one surface of the 3D object, a translation value for 3D geometric transformation, a rotation value for the 3D geometric transformation, or a focal length value of the first camera.

3. The method of claim 1, wherein the first AI model is trained to infer a region corresponding to a surface in an image as an ROI, and wherein the second AI model trained to infer the 3D shape type of the 3D object in the image.

4. The method of claim 1, wherein the obtaining of the data about the 3D shape type of the 3D object comprises:

receiving an user's input related to the 3D shape type of the 3D object from the user; and identifying the 3D shape type of the 3D object by applying a weight to a 3D shape type corresponding to the user's input among a plurality of 3D shape types.

5. The method of claim 1, wherein the adjusting of the set of initial values of the 3D parameter of the virtual object, based on the first keypoints, comprises:

setting second keypoints representing a region corresponding to a virtual surface of the virtual object; and adjusting the second keypoints to match the first keypoints so that the set of initial values of the 3D parameter of the virtual object approximates ground truth of the set of values of the 3D parameter of the 3D object.

6. The method of claim 1, further comprising obtaining information related to the 3D object from the flat surface image, wherein the obtaining of information related to the 3D object from the flat surface image comprises applying optical character recognition (OCR) to the flat surface image.

7. The method of claim 1, further comprising obtaining a second image of the 3D object by using a second camera having a wider angle of view than the first camera.

8. The method of claim 7, wherein the obtaining of the data about the 3D shape type of the 3D object comprises obtaining information related to the 3D shape type of the 3D object by applying the second image to the second AI model.

9. The method of claim 7, further comprising:

obtaining confidence of the ROI by applying the first image by using the first camera to the first AI model;

obtaining confidence of the 3D shape type of the 3D object by applying the second image by using the second camera to the second AI model; and capturing the first image and the second image, based on respective threshold values of the confidence of the 3D shape type of the 3D object and the confidence of the ROI, respectively.

10. The method of claim 9, further comprising:

searching for matching data in a database, based on the flat surface image or information obtained from the flat surface image; and displaying a result of the searching for matching data in the database.

11. An electronic device for processing an image, the electronic device comprising:

a first camera;

a memory storing one or more instructions; and one or more processors configured to execute the one or more instructions stored in the memory, wherein the one or more processors is configured to execute the one or more instructions to:

obtain a first image of a three-dimensional (3D) object comprising at least one surface by using the first camera, the at least one surface having a non-flat shape;

identify a region of interest (ROI) within the first image of the 3D object, which corresponds to the at least one surface, by applying the first image of the 3D object to a first artificial intelligence (AI) model;

identify first keypoints representing the ROI;

obtain data about a 3D shape type of the 3D object by applying the first image of the 3D object to a second AI model;

obtain a virtual object corresponding to the 3D shape type of the 3D object and a set of initial values of a 3D parameter of the virtual object;

adjust the set of initial values of the 3D parameter of the virtual object, based on the first keypoints;

obtain the adjusted set of initial values of the 3D parameter of the virtual object as a set of values of a 3D parameter related to at least one of the 3D object, the at least one surface, or the first camera;

estimate the non-flat shape of the at least one surface, based on the set of values of the 3D parameter; and obtain a flat surface image in which the non-flat shape of the at least one surface is flattened, by performing a perspective transformation on the at least one surface.

12. The electronic device of claim 11, wherein the set of values of the 3D parameter comprises at least one of:

a height value related to a 3D shape of the 3D object, a radius value related to the 3D shape of the 3D object, an angle value of the ROI of the at least one surface of the 3D object, a translation value for 3D geometric transformation, a rotation value for the 3D geometric transformation, or a focal length value of the first camera.

13. The electronic device of claim 11, wherein the first AI model is trained to infer a region corresponding to a surface in an image as an ROI, and wherein the second AI model is trained to infer the 3D shape type of the 3D object in the image.

14. The electronic device of claim 11, wherein the one or more processors are further configured to execute the one or more instructions to:

receive a user's input related to the 3D shape type of the 3D object from the user; and identify the 3D shape type of the 3D object by applying a weight to a 3D shape type corresponding to the user's input among a plurality of 3D shape types.

15. The electronic device of claim 11, wherein the one or more processors are further configured to execute the one or more instructions to:

set second keypoints representing a region corresponding to a virtual surface of the virtual object; and adjust the second keypoints to match the first keypoints so that the set of initial values of the 3D parameter of the virtual object approximates ground truth of the set of values of the 3D parameter of the 3D object.

16. The electronic device of claim 11, wherein the one or more processors are further configured to execute the one or more instructions to obtain information related to the 3D object from the flat surface image, by applying optical character recognition (OCR) to the flat surface image.

17. The electronic device of claim 11, wherein the electronic device further comprises a second camera having a wider angle of view than the first camera, and wherein the one or more processors are further configured to execute the one or more instructions to:

obtain a second image of the 3D object by using the second camera; and obtain information related to the 3D shape type of the 3D object by applying the second image to the second AI model.

18. A non-transitory computer-readable recording medium having recorded thereon a computer program, which, when executed by a computer, performs the method of claim 1.

* * * * *